US012166304B2

(12) United States Patent
Cartier, Jr. et al.

(10) Patent No.: US 12,166,304 B2

(45) Date of Patent: Dec. 10, 2024

(54) HIGH SPEED ELECTRONIC SYSTEM WITH MIDBOARD CABLE CONNECTOR

(71) Applicant: Amphenol Corporation, Wallingford, CT (US)

(72) Inventors: Marc B. Cartier, Jr., Durham, NH (US); Donald A. Girard, Jr., Bedford, NH (US); Eric Leo, Nashua, NH (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 18/347,820

(22) Filed: Jul. 6, 2023

(65) Prior Publication Data

US 2023/0352866 A1 Nov. 2, 2023

Related U.S. Application Data

(63) Continuation of application No. 17/024,337, filed on Sep. 17, 2020, now Pat. No. 11,735,852.

(Continued)

(51) Int. Cl.

| | |
|---|---|
| ***H01R 12/79*** | (2011.01) |
| ***H01R 12/77*** | (2011.01) |
| ***H01R 13/6473*** | (2011.01) |

(52) U.S. Cl.

CPC ........... *H01R 12/79* (2013.01); *H01R 12/775* (2013.01); *H01R 13/6473* (2013.01)

(58) Field of Classification Search

CPC .. H01R 12/79; H01R 12/775; H01R 13/6473; H01R 12/714; H01R 13/518;

(Continued)

(56) References Cited

U.S. PATENT DOCUMENTS

| | | |
|---|---|---|
| 7,331,816 B2 | 2/2008 | Krohn et al. |
| 7,331,830 B2 | 2/2008 | Minich |

(Continued)

FOREIGN PATENT DOCUMENTS

| | | | |
|---|---|---|---|
| CA | 2800738 A1 * | 12/2011 | ........... H01R 13/516 |
| CN | 101164204 A | 4/2008 | |

(Continued)

OTHER PUBLICATIONS

International Search Report and Written Opinion for International Application No. PCT/US2020/051242, mailed Feb. 1, 2021.

(Continued)

*Primary Examiner* — Jean F Duverne

(74) *Attorney, Agent, or Firm* — Wolf, Greenfield & Sacks, P.C.

(57) ABSTRACT

Connector assemblies for making connections to a subassembly, such as a processor card, may include signal contact tips formed of a material different than that of an associated cable conductor. The signal contact tips may be formed of a super elastic material, such as nickel titanium. The connector assembly may include ground contact tips that similarly make a pressure contact to the electrical component may be electrically connected to a shield of the cable shield Housing modules that interlock or interface with a support member may be employed to manufacture connectors with any desired quantity of signal and ground contact tips in any suitable number of columns and rows. Each module may terminate a cable and provide pressure mount connections between signal conductors and the shield of the cable and conductive pads on the subassembly, and conductive or lossy grounded structures around the conductive elements carrying signals through the module.

29 Claims, 29 Drawing Sheets

Related U.S. Application Data

(60) Provisional application No. 62/902,820, filed on Sep. 19, 2019.

(58) Field of Classification Search
CPC .......... H01R 13/65918; H01R 13/6471; H01R 13/6477; H01R 13/6597; H01R 13/03; H01R 13/6456; H01R 13/6585; H01R 43/00; H01R 43/02; H01R 43/20
See application file for complete search history.

(56) References Cited

U.S. PATENT DOCUMENTS 7,335,063 B2 2/2008 Cohen et al.
7,354,274 B2 4/2008 Minich
7,354,300 B2 4/2008 Shindo
7,361,042 B2 4/2008 Hashimoto et al.
7,371,117 B2 5/2008 Gailus
7,384,275 B2 6/2008 Ngo
7,402,048 B2 7/2008 Meier et al.
7,422,483 B2 9/2008 Avery et al.
7,431,608 B2 10/2008 Sakaguchi et al.
7,445,471 B1 11/2008 Scherer et al.
7,462,942 B2 12/2008 Tan et al.
7,485,012 B2 2/2009 Daugherty et al.
7,494,383 B2 2/2009 Cohen et al.
7,497,693 B1 3/2009 Wu
7,534,142 B2 5/2009 Avery et al.
7,540,747 B2 6/2009 Ice et al.
7,540,781 B2 6/2009 Kenny et al.
7,549,897 B2 6/2009 Fedder et al.
7,553,190 B2 6/2009 Laurx et al.
7,581,990 B2 9/2009 Kirk et al.
7,588,464 B2 9/2009 Kim
7,613,011 B2 11/2009 Grundy et al.
7,621,779 B2 11/2009 Laurx et al.
7,652,381 B2 1/2010 Grundy et al.
7,654,831 B1 2/2010 Wu
7,658,654 B2 2/2010 Ohyama et al.
7,686,659 B2 3/2010 Peng
7,690,930 B2 4/2010 Chen et al.
7,713,077 B1 5/2010 McGowan et al.
7,719,843 B2 5/2010 Dunham
7,722,401 B2 5/2010 Kirk et al.
7,722,404 B2 5/2010 Neumetzler
7,731,537 B2 6/2010 Amleshi et al.
7,744,414 B2 6/2010 Scherer et al.
7,753,731 B2 7/2010 Cohen et al.
7,771,233 B2 8/2010 Gailus
7,775,802 B2 8/2010 Defibaugh et al.
7,789,676 B2 9/2010 Morgan et al.
7,794,240 B2 9/2010 Cohen et al.
7,794,278 B2 9/2010 Cohen et al.
7,811,129 B2 10/2010 Glover et al.
7,819,675 B2 10/2010 Ko et al.
7,824,197 B1 11/2010 Westman et al.
7,828,560 B2 11/2010 Wu et al.
7,857,630 B2 12/2010 Hermant et al.
7,862,344 B2 1/2011 Morgan et al.
7,871,296 B2 1/2011 Fowler et al.
7,874,873 B2 1/2011 Do et al.
7,887,371 B2 2/2011 Kenny et al.
7,906,730 B2 3/2011 Atkinson et al.
7,914,302 B1 3/2011 Zhu
7,914,304 B2 3/2011 Cartier et al.
7,976,318 B2 7/2011 Fedder et al.
7,985,097 B2 7/2011 Gulla
7,993,147 B2 8/2011 Cole et al.
8,002,581 B1 8/2011 Whiteman, Jr. et al.
8,016,616 B2 9/2011 Glover et al.
8,018,733 B2 9/2011 Jia
8,036,500 B2 10/2011 McColloch
8,057,266 B1 11/2011 Roitberg
8,057,267 B2 11/2011 Johnescu
8,083,553 B2 12/2011 Manter et al.
8,092,235 B2 1/2012 Frantum, Jr. et al.
8,092,254 B2 1/2012 Miyazaki et al.
8,100,699 B1 1/2012 Costello
8,157,573 B2 4/2012 Tanaka
8,162,675 B2 4/2012 Regnier et al.
8,167,651 B2 5/2012 Glover et al.
8,182,289 B2 5/2012 Stokoe et al.
8,192,222 B2 6/2012 Kameyama
8,197,285 B2 6/2012 Farmer
8,210,877 B2 7/2012 Droesbeke
8,215,968 B2 7/2012 Cartier et al.
8,226,441 B2 7/2012 Regnier et al.
8,251,745 B2 8/2012 Johnescu et al.
8,272,877 B2 9/2012 Stokoe et al.
8,282,402 B2 10/2012 Ngo
8,308,491 B2 11/2012 Nichols et al.
8,308,512 B2 11/2012 Ritter et al.
8,337,243 B2 12/2012 Elkhatib et al.
8,338,713 B2 12/2012 Fjelstad et al.
8,371,875 B2 2/2013 Gailus
8,371,876 B2 2/2013 Davis
8,382,524 B2 2/2013 Khilchenko et al.
8,398,433 B1 3/2013 Yang
8,419,472 B1 4/2013 Swanger et al.
8,439,704 B2 5/2013 Reed
8,449,312 B2 5/2013 Lang et al.
8,449,330 B1 5/2013 Schroll et al.
8,465,302 B2 6/2013 Regnier et al.
8,469,745 B2 6/2013 Davis et al.
8,535,065 B2 9/2013 Costello et al.
8,540,525 B2 9/2013 Regnier et al.
8,550,861 B2 10/2013 Cohen et al.
8,553,102 B2 10/2013 Yamada
8,556,657 B1 10/2013 Nichols
8,588,561 B2 11/2013 Zbinden et al.
8,588,562 B2 11/2013 Zbinden et al.
8,597,055 B2 12/2013 Regnier et al.
8,632,365 B2 1/2014 Ngo
8,651,880 B2 2/2014 Wu et al.
8,657,627 B2 2/2014 McNamara et al.
8,662,923 B2 3/2014 Wu
8,672,707 B2 3/2014 Nichols et al.
8,678,860 B2 3/2014 Minich et al.
8,690,589 B2 4/2014 Ngo
8,690,604 B2 4/2014 Davis
8,715,003 B2 5/2014 Buck et al.
8,740,644 B2 6/2014 Long
8,753,145 B2 6/2014 Lang et al.
8,758,051 B2 6/2014 Nonen et al.
8,771,016 B2 7/2014 Atkinson et al.
8,787,711 B2 7/2014 Zbinden et al.
8,804,342 B2 8/2014 Behziz et al.
8,814,595 B2 8/2014 Cohen et al.
8,845,364 B2 9/2014 Wanha et al.
8,858,243 B2 10/2014 Luo et al.
8,864,521 B2 10/2014 Atkinson et al.
8,870,471 B2 10/2014 Ito et al.
8,888,531 B2 11/2014 Jeon
8,888,533 B2 11/2014 Westman et al.
8,911,255 B2 12/2014 Scherer et al.
8,926,377 B2 1/2015 Kirk et al.
8,944,831 B2 2/2015 Stoner et al.
8,992,236 B2 3/2015 Wittig et al.
8,992,237 B2 3/2015 Regnier et al.
8,998,642 B2 4/2015 Manter et al.
9,004,942 B2 4/2015 Paniauqa
9,011,177 B2 4/2015 Lloyd et al.
9,022,806 B2 5/2015 Girard, Jr. et al.
9,028,201 B2 5/2015 Kirk et al.
9,028,281 B2 5/2015 Kirk et al.
9,035,183 B2 5/2015 Kodama et al.
9,040,824 B2 5/2015 Guetig et al.
9,071,001 B2 6/2015 Scherer et al.
9,077,118 B2 7/2015 Szu et al.
9,118,151 B2 8/2015 Tran et al.
9,119,292 B2 8/2015 Gundel
9,124,009 B2 9/2015 Atkinson et al.
9,142,921 B2 9/2015 Wanha et al.
9,203,171 B2 12/2015 Yu et al.

(56) References Cited

U.S. PATENT DOCUMENTS

| | | | |
|---|---|---|---|
| 9,214,768 | B2 | 12/2015 | Pao et al. |
| 9,219,335 | B2 | 12/2015 | Atkinson et al. |
| 9,225,085 | B2 | 12/2015 | Girard, Jr. et al. |
| 9,232,676 | B2 | 1/2016 | Sechrist et al. |
| 9,246,251 | B2 | 1/2016 | Regnier et al. |
| 9,257,778 | B2 | 2/2016 | Buck et al. |
| 9,257,794 | B2 | 2/2016 | Wanha et al. |
| 9,281,636 | B1 | 3/2016 | Schmitt |
| 9,300,067 | B2 | 3/2016 | Yokoo |
| 9,312,618 | B2 | 4/2016 | Regnier et al. |
| 9,350,108 | B2 | 5/2016 | Long |
| 9,356,401 | B1 | 5/2016 | Horning et al. |
| 9,362,678 | B2 | 6/2016 | Wanha et al. |
| 9,368,916 | B2 | 6/2016 | Heyvaert et al. |
| 9,373,917 | B2 | 6/2016 | Sypolt et al. |
| 9,374,165 | B2 | 6/2016 | Zbinden et al. |
| 9,385,455 | B2 | 7/2016 | Regnier et al. |
| 9,391,407 | B1 | 7/2016 | Bucher et al. |
| 9,413,112 | B2 | 8/2016 | Helster et al. |
| 9,450,344 | B2 | 9/2016 | Cartier, Jr. et al. |
| 9,472,900 | B1 | 10/2016 | Phillips et al. |
| 9,490,558 | B2 | 11/2016 | Wanha et al. |
| 9,509,101 | B2 | 11/2016 | Cartier, Jr. et al. |
| 9,520,680 | B2 | 12/2016 | Hsu et al. |
| 9,520,689 | B2 | 12/2016 | Cartier, Jr. et al. |
| 9,531,133 | B1 | 12/2016 | Horning et al. |
| 9,553,381 | B2 | 1/2017 | Regnier |
| 9,559,446 | B1 | 1/2017 | Wetzel et al. |
| 9,564,696 | B2 | 2/2017 | Gulla |
| 9,608,348 | B2 | 3/2017 | Wanha et al. |
| 9,651,752 | B2 | 5/2017 | Zbinden et al. |
| 9,660,364 | B2 | 5/2017 | Wig et al. |
| 9,666,961 | B2 | 5/2017 | Horning et al. |
| 9,685,724 | B2 | 6/2017 | Tojo |
| 9,685,736 | B2 | 6/2017 | Gailus et al. |
| 9,735,495 | B2 | 8/2017 | Gross |
| 9,774,144 | B2 | 9/2017 | Cartier, Jr. et al. |
| 9,801,301 | B1 | 10/2017 | Costello |
| 9,841,572 | B2 | 12/2017 | Zbinden et al. |
| 9,843,135 | B2 | 12/2017 | Guetig et al. |
| 9,929,512 | B1 | 3/2018 | Trout et al. |
| 9,985,367 | B2 | 5/2018 | Wanha et al. |
| 9,985,389 | B1 | 5/2018 | Morgan et al. |
| 10,056,706 | B2 | 8/2018 | Wanha et al. |
| 10,062,984 | B2 | 8/2018 | Regnier |
| 10,062,988 | B1 | 8/2018 | Vinther et al. |
| 10,069,225 | B2 | 9/2018 | Wanha et al. |
| 10,096,945 | B2 | 10/2018 | Cartier, Jr. et al. |
| 10,114,182 | B2 | 10/2018 | Zbinden et al. |
| 10,136,517 | B2 | 11/2018 | Shirasaki |
| 10,170,869 | B2 | 1/2019 | Gailus et al. |
| 10,181,663 | B2 | 1/2019 | Regnier |
| 10,205,286 | B2 | 2/2019 | Provencher et al. |
| 10,243,305 | B1 | 3/2019 | Pan et al. |
| 10,305,224 | B2 | 5/2019 | Girard |
| RE47,459 | E | 6/2019 | Vinther et al. |
| 10,348,007 | B2 | 7/2019 | Kataoka et al. |
| 10,367,280 | B2 | 7/2019 | Lloyd et al. |
| 10,367,308 | B2 | 7/2019 | Little et al. |
| 10,381,767 | B1 * | 8/2019 | Milbrand, Jr. ..... H01R 13/6583 |
| 10,462,904 | B2 | 10/2019 | Shirasaki |
| 10,651,606 | B2 | 5/2020 | Little |
| 10,680,364 | B2 | 6/2020 | Champion et al. |
| 10,840,622 | B2 | 11/2020 | Sasame et al. |
| 10,847,937 | B2 | 11/2020 | Cartier, Jr. et al. |
| 10,879,643 | B2 | 12/2020 | Astbury et al. |
| 10,944,215 | B2 | 3/2021 | Chua et al. |
| 10,958,005 | B1 | 3/2021 | Dube |
| 11,050,176 | B2 | 6/2021 | Yang et al. |
| 11,070,006 | B2 | 7/2021 | Gailus et al. |
| 11,101,611 | B2 | 8/2021 | Winey et al. |
| 11,189,943 | B2 | 11/2021 | Zerebilov et al. |
| 11,205,877 | B2 | 12/2021 | Diaz et al. |
| 11,309,655 | B2 | 4/2022 | Avery et al. |
| 11,437,762 | B2 | 9/2022 | Manter et al. |
| 11,509,100 | B2 | 11/2022 | Chen et al. |
| 11,637,390 | B2 | 4/2023 | Zerebilov et al. |
| 11,670,879 | B2 | 6/2023 | Zerebilov |
| 11,677,188 | B2 | 6/2023 | Diaz et al. |
| 11,715,922 | B2 | 8/2023 | Winey et al. |
| 11,735,852 | B2 | 8/2023 | Cartier et al. |
| 11,757,228 | B2 | 9/2023 | Lai et al. |
| 11,824,311 | B2 | 11/2023 | Gailus et al. |
| 2006/0234538 | A1 | 10/2006 | Khemakhem et al. |
| 2008/0026638 | A1 | 1/2008 | Cohen et al. |
| 2008/0194146 | A1 | 8/2008 | Gailus |
| 2008/0200955 | A1 | 8/2008 | Tepic |
| 2008/0207023 | A1 | 8/2008 | Tuin et al. |
| 2008/0246555 | A1 | 10/2008 | Kirk et al. |
| 2008/0248658 | A1 | 10/2008 | Cohen et al. |
| 2008/0248659 | A1 | 10/2008 | Cohen et al. |
| 2008/0248660 | A1 | 10/2008 | Kirk et al. |
| 2008/0264673 | A1 | 10/2008 | Chi et al. |
| 2008/0267620 | A1 | 10/2008 | Cole et al. |
| 2008/0297988 | A1 | 12/2008 | Chau |
| 2008/0305689 | A1 | 12/2008 | Zhang et al. |
| 2009/0011641 | A1 | 1/2009 | Cohen et al. |
| 2009/0011645 | A1 | 1/2009 | Laurx et al. |
| 2009/0011664 | A1 | 1/2009 | Laurx et al. |
| 2009/0017682 | A1 | 1/2009 | Amleshi et al. |
| 2009/0023330 | A1 | 1/2009 | Stoner et al. |
| 2009/0051558 | A1 | 2/2009 | Dorval |
| 2009/0098767 | A1 | 4/2009 | Long |
| 2009/0117386 | A1 | 5/2009 | Vacanti et al. |
| 2009/0130913 | A1 | 5/2009 | Yi et al. |
| 2009/0130918 | A1 | 5/2009 | Nguyen et al. |
| 2009/0166082 | A1 | 7/2009 | Liu et al. |
| 2009/0176400 | A1 | 7/2009 | Davis et al. |
| 2009/0205194 | A1 | 8/2009 | Semba et al. |
| 2009/0215309 | A1 | 8/2009 | Mongold et al. |
| 2009/0227141 | A1 | 9/2009 | Pan |
| 2009/0239395 | A1 | 9/2009 | Cohen et al. |
| 2009/0247012 | A1 | 10/2009 | Pan |
| 2009/0269971 | A1 | 10/2009 | Tamura et al. |
| 2009/0291593 | A1 | 11/2009 | Atkinson et al. |
| 2009/0291596 | A1 | 11/2009 | Miyazoe |
| 2009/0305533 | A1 | 12/2009 | Feldman et al. |
| 2009/0311908 | A1 | 12/2009 | Fogg et al. |
| 2010/0009571 | A1 | 1/2010 | Scherer et al. |
| 2010/0081302 | A1 | 4/2010 | Atkinson et al. |
| 2010/0087084 | A1 | 4/2010 | George |
| 2010/0099299 | A1 | 4/2010 | Moriyama et al. |
| 2010/0112850 | A1 | 5/2010 | Rao et al. |
| 2010/0144167 | A1 | 6/2010 | Fedder et al. |
| 2010/0144168 | A1 | 6/2010 | Glover et al. |
| 2010/0144175 | A1 | 6/2010 | Helster et al. |
| 2010/0144201 | A1 | 6/2010 | Defibaugh et al. |
| 2010/0144203 | A1 | 6/2010 | Glover et al. |
| 2010/0177489 | A1 | 7/2010 | Yagisawa |
| 2010/0183141 | A1 | 7/2010 | Arai et al. |
| 2010/0203768 | A1 | 8/2010 | Kondo et al. |
| 2010/0221951 | A1 | 9/2010 | Pepe et al. |
| 2010/0248544 | A1 | 9/2010 | Xu et al. |
| 2010/0291806 | A1 | 11/2010 | Minich et al. |
| 2010/0294530 | A1 | 11/2010 | Atkinson et al. |
| 2011/0003509 | A1 | 1/2011 | Gailus |
| 2011/0034075 | A1 | 2/2011 | Feldman et al. |
| 2011/0067237 | A1 | 3/2011 | Cohen et al. |
| 2011/0074213 | A1 | 3/2011 | Schaffer et al. |
| 2011/0104948 | A1 | 5/2011 | Girard, Jr. et al. |
| 2011/0130038 | A1 | 6/2011 | Cohen et al. |
| 2011/0136387 | A1 | 6/2011 | Matsuura et al. |
| 2011/0177699 | A1 | 7/2011 | Crofoot et al. |
| 2011/0212632 | A1 | 9/2011 | Stoke et al. |
| 2011/0212633 | A1 | 9/2011 | Regnier et al. |
| 2011/0212649 | A1 | 9/2011 | Stokoe et al. |
| 2011/0212650 | A1 | 9/2011 | Amleshi et al. |
| 2011/0223807 | A1 | 9/2011 | Jeon et al. |
| 2011/0230095 | A1 | 9/2011 | Atkinson et al. |
| 2011/0230096 | A1 | 9/2011 | Atkinson et al. |
| 2011/0230104 | A1 | 9/2011 | Lang et al. |
| 2011/0263156 | A1 | 10/2011 | Ko |
| 2011/0287663 | A1 | 11/2011 | Gailus et al. |
| 2011/0300757 | A1 | 12/2011 | Regnier et al. |

(56) References Cited

U.S. PATENT DOCUMENTS

2011/0300760 A1 12/2011 Ngo
2012/0003848 A1 1/2012 Casher et al.
2012/0034798 A1 2/2012 Khemakhem et al.
2012/0034820 A1 2/2012 Lang et al.
2012/0077369 A1 3/2012 Andersen
2012/0077380 A1 3/2012 Minich et al.
2012/0094536 A1 4/2012 Khilchenko et al.
2012/0135643 A1 5/2012 Lange et al.
2012/0156929 A1 6/2012 Manter et al.
2012/0184136 A1 7/2012 Ritter
2012/0202363 A1 8/2012 McNamara et al.
2012/0202386 A1 8/2012 McNamara et al.
2012/0214344 A1 8/2012 Cohen et al.
2012/0252232 A1 10/2012 Buck et al.
2012/0329294 A1 12/2012 Raybold et al.
2013/0012038 A1 1/2013 Kirk et al.
2013/0017715 A1 1/2013 Laarhoven et al.
2013/0017733 A1 1/2013 Kirk et al.
2013/0034999 A1 2/2013 Szczesny et al.
2013/0040482 A1 2/2013 Ngo et al.
2013/0065454 A1 3/2013 Milbrand, Jr.
2013/0078870 A1 3/2013 Milbrand, Jr.
2013/0084744 A1 4/2013 Zerebilov et al.
2013/0092429 A1 4/2013 Ellison
2013/0109232 A1 5/2013 Paniaqua
2013/0143442 A1 6/2013 Cohen et al.
2013/0196553 A1 8/2013 Gailus
2013/0210246 A1 8/2013 Davis et al.
2013/0223036 A1 8/2013 Herring et al.
2013/0225006 A1 8/2013 Khilchenko et al.
2013/0270000 A1 10/2013 Buck et al.
2013/0273781 A1 10/2013 Buck et al.
2013/0288521 A1 10/2013 McClellan et al.
2013/0288525 A1 10/2013 McClellan et al.
2013/0288539 A1 10/2013 McClellan et al.
2013/0340251 A1 12/2013 Regnier et al.
2014/0004724 A1 1/2014 Cartier, Jr. et al.
2014/0004726 A1 1/2014 Cartier, Jr. et al.
2014/0004746 A1 1/2014 Cartier, Jr. et al.
2014/0041937 A1 2/2014 Lloyd et al.
2014/0057475 A1 2/2014 Tohjo
2014/0057493 A1 2/2014 De Geest et al.
2014/0057494 A1 2/2014 Cohen
2014/0057498 A1 2/2014 Cohen
2014/0065883 A1 3/2014 Cohen et al.
2014/0073174 A1 3/2014 Yang
2014/0073181 A1 3/2014 Yang
2014/0099844 A1 4/2014 Dunham
2014/0199885 A1 7/2014 Vinther et al.
2014/0242844 A1 8/2014 Wanha et al.
2014/0273551 A1 9/2014 Resendez et al.
2014/0273557 A1 9/2014 Cartier, Jr. et al.
2014/0273627 A1 9/2014 Cartier, Jr. et al.
2014/0286613 A1 9/2014 Ito et al.
2014/0287627 A1 9/2014 Cohen
2014/0295680 A1 10/2014 YuQiang et al.
2014/0302706 A1 10/2014 YuQiang et al.
2014/0308852 A1 10/2014 Gulla
2014/0335707 A1 11/2014 Johnescu et al.
2014/0335736 A1 11/2014 Regnier et al.
2015/0056856 A1 2/2015 Atkinson et al.
2015/0072561 A1 3/2015 Schmitt et al.
2015/0079829 A1 3/2015 Brodsgaard
2015/0079845 A1 3/2015 Wanha et al.
2015/0180578 A1 6/2015 Leigh et al.
2015/0194751 A1 7/2015 Herring
2015/0200483 A1 7/2015 Martin et al.
2015/0200496 A1 7/2015 Simpson et al.
2015/0207247 A1 7/2015 Regnier et al.
2015/0236450 A1 8/2015 Davis
2015/0236451 A1 8/2015 Cartier, Jr. et al.
2015/0236452 A1 8/2015 Cartier, Jr. et al.
2015/0255926 A1 9/2015 Paniagua
2015/0280351 A1 10/2015 Bertsch
2015/0288110 A1 10/2015 Tanguchi et al.
2015/0303608 A1 10/2015 Zerebilov et al.
2015/0357736 A1 12/2015 Tran et al.
2015/0357747 A1 12/2015 Filipon et al.
2015/0357761 A1 12/2015 Wanha et al.
2016/0013594 A1 1/2016 Costello et al.
2016/0013596 A1 1/2016 Regnier
2016/0028189 A1 1/2016 Resendez et al.
2016/0049746 A1 2/2016 Gross
2016/0104956 A1 4/2016 Santos et al.
2016/0111825 A1 4/2016 Wanha et al.
2016/0141807 A1 5/2016 Gailus et al.
2016/0149343 A1 5/2016 Atkinson et al.
2016/0149362 A1 5/2016 Ritter et al.
2016/0150633 A1 5/2016 Cartier, Jr.
2016/0150639 A1 5/2016 Gailus et al.
2016/0150645 A1 5/2016 Gailus et al.
2016/0181713 A1 6/2016 Peloza et al.
2016/0181732 A1 6/2016 Laurx et al.
2016/0190747 A1 6/2016 Regnier et al.
2016/0197423 A1 7/2016 Regnier
2016/0211598 A1 7/2016 Costello et al.
2016/0218455 A1 7/2016 Sayre et al.
2016/0233598 A1 8/2016 Wittig
2016/0268714 A1 9/2016 Wanha et al.
2016/0268739 A1 9/2016 Zerebilov et al.
2016/0274316 A1 9/2016 Verdiell
2016/0308296 A1 10/2016 Pitten et al.
2016/0322770 A1 11/2016 Zerebilov
2016/0344141 A1 11/2016 Cartier et al.
2017/0025783 A1 1/2017 Astbury et al.
2017/0033478 A1 2/2017 Wanha et al.
2017/0042070 A1 2/2017 Baumler et al.
2017/0047692 A1 2/2017 Cartier, Jr. et al.
2017/0054250 A1 2/2017 Kim et al.
2017/0077643 A1 3/2017 Zbinden et al.
2017/0093093 A1 3/2017 Cartier, Jr. et al.
2017/0098901 A1 4/2017 Regnier
2017/0162960 A1 6/2017 Wanha et al.
2017/0294743 A1 10/2017 Gailus et al.
2017/0302011 A1 10/2017 Wanha et al.
2017/0338595 A1 11/2017 Girard, Jr.
2017/0365942 A1 12/2017 Regnier
2017/0365943 A1 12/2017 Wanha et al.
2018/0006416 A1 1/2018 Lloyd et al.
2018/0034175 A1 2/2018 Lloyd et al.
2018/0034190 A1 2/2018 Ngo
2018/0040989 A1 2/2018 Chen
2018/0062323 A1 3/2018 Kirk et al.
2018/0109043 A1 4/2018 Provencher et al.
2018/0145438 A1 5/2018 Cohen
2018/0219331 A1 8/2018 Cartier, Jr. et al.
2018/0219332 A1 8/2018 Brungard et al.
2018/0269612 A1 9/2018 Pitten et al.
2018/0309214 A1 10/2018 Lloyd et al.
2018/0366880 A1 12/2018 Zerebilov et al.
2019/0013625 A1 1/2019 Gailus et al.
2019/0020155 A1 1/2019 Trout et al.
2019/0044284 A1 2/2019 Dunham
2019/0157812 A1 5/2019 Gailus et al.
2019/0173236 A1 6/2019 Provencher et al.
2019/0260147 A1 8/2019 Pitten et al.
2019/0267732 A1 8/2019 Buck et al.
2020/0244025 A1 7/2020 Winey et al.
2020/0274267 A1 8/2020 Zerebilov
2020/0274301 A1 8/2020 Manter et al.
2021/0021085 A1 1/2021 Diaz et al.
2021/0091496 A1 3/2021 Cartier, Jr. et al.
2021/0234291 A1 7/2021 Zerebilov
2021/0305731 A1 9/2021 Klein et al.
2021/0384691 A1 12/2021 Winey et al.
2021/0399455 A1 12/2021 Wang et al.
2022/0013962 A1 1/2022 Gailus et al.
2022/0158371 A1 5/2022 Zerebilov et al.
2022/0173550 A1 6/2022 Liu et al.
2022/0224057 A1 7/2022 Diaz et al.
2023/0253722 A1 8/2023 Zerebilov
2023/0299518 A1 9/2023 Zerebilov et al.

(56) References Cited

U.S. PATENT DOCUMENTS

| | | | |
|---|---|---|---|
| 2023/0307854 A1 | 9/2023 | Pritchard et al. |
| 2023/0352895 A1 | 11/2023 | Winey et al. |
| 2024/0030655 A1 | 1/2024 | Diaz et al. |

FOREIGN PATENT DOCUMENTS

| | | | |
|---|---|---|---|
| CN | 101312275 | A | 11/2008 |
| CN | 101330172 | A | 12/2008 |
| CN | 101364692 | A | 2/2009 |
| CN | 101752700 | A | 6/2010 |
| CN | 201562814 | U | 8/2010 |
| CN | 201956529 | U | 8/2011 |
| CN | 102598430 | A | 7/2012 |
| CN | 202678544 | U | 1/2013 |
| CN | 102986091 | A | 3/2013 |
| CN | 103140994 | A | 6/2013 |
| CN | 103682705 | A | 3/2014 |
| CN | 104025393 | A | 9/2014 |
| CN | 104518363 | A | 4/2015 |
| CN | 104779467 | A | 7/2015 |
| CN | 105051978 | A | 11/2015 |
| CN | 105612671 | A | 5/2016 |
| CN | 106030925 | A | 10/2016 |
| CN | 106104933 | A | 11/2016 |
| CN | 107408769 | A | 11/2017 |
| CN | 107645072 | A | 1/2018 |
| CN | 108028481 | A | 5/2018 |
| CN | 108475891 | A | 8/2018 |
| CN | 108713355 | A | 10/2018 |
| CN | 109273932 | A | 1/2019 |
| CN | 212571566 | U | 2/2021 |
| CN | 113078510 | A | 7/2021 |
| CN | 214100162 | U | 8/2021 |
| CN | 115347395 | A | 11/2022 |
| CN | 102823073 | A | 12/2022 |
| EP | 2 169 770 | A2 | 3/2010 |
| JP | 2010-266729 | A | 11/2010 |
| JP | 2011-018651 | A | 1/2011 |
| JP | 2012-516021 | A | 7/2012 |
| JP | 2014-195061 | A | 10/2014 |
| JP | 2016-528688 | A | 9/2016 |
| JP | 6193595 | B2 | 9/2017 |
| JP | 6599548 | B2 | 10/2019 |
| KR | 10-2015-0067010 | A | 6/2015 |
| KR | 10-2015-0101020 | A | 9/2015 |
| KR | 10-2016-0038192 | A | 4/2016 |
| KR | 10-2016-0076334 | A | 6/2016 |
| TW | 200910710 | A | 3/2009 |
| TW | M357771 | U | 5/2009 |
| TW | 201320504 | A | 5/2013 |
| TW | I446657 | B | 7/2014 |
| TW | I465333 | B | 12/2014 |
| TW | 201521295 | A | 6/2015 |
| TW | I489002 | B | 6/2015 |
| WO | WO 2004/098251 | A1 | 11/2004 |
| WO | WO 2008/072322 | A1 | 6/2008 |
| WO | WO 2008/124057 | A1 | 10/2008 |
| WO | WO 2010/039188 | A1 | 4/2010 |
| WO | WO 2012/078434 | A2 | 6/2012 |
| WO | WO 2013/006592 | A2 | 1/2013 |
| WO | WO 2015/013430 | A1 | 1/2015 |
| WO | WO 2015/112717 | A1 | 7/2015 |
| WO | WO 2017/015470 | A1 | 1/2017 |
| WO | WO 2017/123574 | A1 | 7/2017 |
| WO | WO 2017/164418 | A1 | 9/2017 |
| WO | WO 2018/226805 | A1 | 12/2018 |
| WO | WO 2019/195319 | A1 | 10/2019 |

OTHER PUBLICATIONS

International Preliminary Report on Patentability mailed Mar. 31, 2022 in connection with International Application No. PCT/US2020/051242.

[No Author Listed], Amphenol TCS expands the Xcede Platform with 85 Ohm Connectors and High-Speed Cable Solutions. Press Release. Published Feb. 25, 2009. http://www.amphenol.com/about/news_archive/2009/58 [Retrieved on Mar. 26, 2019 from Wayback Machine]. 4 pages.

[No Author Listed], Agilent. Designing Scalable 10G Backplane Interconnect Systems Utilizing Advanced Verification Methodologies. White Paper, Published May 5, 2012. 24 pages.

[No Author Listed], Difference Between Weld Metal and Heat Affected Zone (HAZ). Minaprem.com. 2021. 7 pages. URL:http://www.difference.minaprem.com/joining/difference-between-weld-metal-and-heat-affected-zone-haz [date retrieved Dec. 20, 2021].

[No Author Listed], Hitachi Cable America Inc. Direct Attach Cables. 8 pages. Retrieved Aug. 10, 2017 from http://www.hca.hitachi-cable.com/products/hca/catalog/pdfs/direct-attach-cable-assemblies.pdf [last accessed Mar. 6, 2019].

[No Author Listed], What is the Heat Affected Zone (HAZ)? TWI Ltd. 2021. 8 pages. URL:https://www.twi-global.com/technical-knowledge/faqs/what-is-the-heat-affected-zone [date retrieved Dec. 20, 2021].

Diaz et al., Controlled-Impedance Compliant Cable Termination, U.S. Appl. No. 18/321,754, filed May 22, 2023.

Lehto et al., Characterisation of local grain size variation of welded structural steel. Weld World. 2016;60:673-688. 16 pages. URL:https://link.springer.com/content/pdf/10.1007/s40194-016-0318-8.pdf.

Lloyd et al., High Speed Bypass Cable Assembly, U.S. Appl. No. 15/271,903, filed Sep. 21, 2016.

Lloyd et al., High Speed Bypass Cable Assembly, U.S. Appl. No. 15/715,939, filed Sep. 26, 2017.

Winey et al., I/O Connector Configured for Cabled Connection to The Midboard, U.S. Appl. No. 18/346,172, filed Jun. 30, 2023.

Zerebilov et al., I/O Connector Configured for Cable Connection to a Midboard, U.S. Appl. No. 18/136,827, filed Apr. 19, 2023.

Zerebilov, High Frequency Midboard Connector, U.S. Appl. No. 17/160,229, filed Jan. 27, 2021.

Extended European Search Report dated Jan. 23, 2024 in connection with European Application No. 20866832.7.

Fan et al., Compact High-Speed Electrical Connector, U.S. Appl. No. 18/494,129, filed Oct. 25, 2023.

U.S. Appl. No. 18/494,129, filed Oct. 25, 2023, Fan et al.

EP 20866832.7, Jan. 23, 2024, Extended European Search Report.

Chinese Office Action dated Jan. 10, 2024 in connection with Chinese Application No. 202080072500.X.

* cited by examiner

HIGH SPEED ELECTRONIC SYSTEM WITH MIDBOARD CABLE CONNECTOR

RELATED APPLICATIONS

This application is a continuation of U.S. patent application Ser. No. 17/024,337, filed on Sep. 17, 2020, entitled "HIGH SPEED ELECTRONIC SYSTEM WITH MIDBOARD CABLE CONNECTOR," which claims priority to and the benefit under 35 U.S.C. § 119(e) of U.S. Provisional Application No. 62/902,820, filed Sep. 19, 2019, entitled "HIGH SPEED ELECTRONIC SYSTEM WITH MIDBOARD CABLE CONNECTOR." The contents of these applications are incorporated herein by reference in their entirety.

FIELD

Disclosed embodiments are related to midboard connector assemblies and designs, materials and related methods of use of such cable connector assemblies.

BACKGROUND

Electrical connectors are used in many electronic systems. It is generally easier and more cost effective to manufacture a system as separate electronic subassemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

A known arrangement for joining several printed circuit boards is to have one printed circuit board serve as a backplane. Other printed circuit boards, called "daughterboards," "daughtercards," or "midboards" may be connected through the backplane. A backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors."

Connectors may also be used in other configurations for interconnecting printed circuit boards. Sometimes, one or more smaller printed circuit boards may be connected to another larger printed circuit board. In such a configuration, the larger printed circuit board may be called a "motherboard" and the printed circuit boards connected to it may be called daughterboards. Also, boards of the same size or similar sizes may sometimes be aligned in parallel. Connectors used in these applications are often called "stacking connectors" or "mezzanine connectors."

Connectors may also be used to enable signals to be routed to or from an electronic device. A connector, called an "I/O connector," may be mounted to a printed circuit board, usually at an edge of the printed circuit board. That connector may be configured to receive a plug at one end of a connector assembly, such that the cable is connected to the printed circuit board through the I/O connector. The other end of the connector assembly may be connected to another electronic device.

Cables have also been used to make connections within the same electronic device. The cables may be used to route signals from an I/O connector to a processor assembly that is located at the interior of printed circuit board, away from the edge at which the I/O connector is mounted. In other configurations, both ends of a cable may be connected to the same printed circuit board. The cables can be used to carry signals between components mounted to the printed circuit board near where each end of the cable connects to the printed circuit board.

Routing signals through a cable, rather than through a printed circuit board, may be advantageous because the cables provide signal paths with high signal integrity, particularly for high frequency signals, such as those above 40 Gbps using an NRZ protocol. Known cables have one or more signal conductors, which is surrounded by a dielectric material, which in turn is surrounded by a conductive layer. A protective jacket, often made of plastic, may surround these components. Additionally the jacket or other portions of the cable may include fibers or other structures for mechanical support.

One type of cable, referred to as a "twinax cable," is constructed to support transmission of a differential signal and has a balanced pair of signal wires embedded in a dielectric and encircled by a conductive layer. The conductive layer is usually formed using foil, such as aluminized Mylar. The twinax cable can also have a drain wire. Unlike a signal wire, which is generally surrounded by a dielectric, the drain wire may be uncoated so that it contacts the conductive layer at multiple points over the length of the cable. At an end of the cable, where the cable is to be terminated to a connector or other terminating structure, the protective jacket, dielectric and the foil may be removed, leaving portions of the signal wires and the drain wire exposed at the end of the cable. These wires may be attached to a terminating structure, such as a connector. The signal wires may be attached to conductive elements serving as mating contacts in the connector structure. The foil may be attached to a ground conductor in the terminating structure, either directly or through the drain wire, if present. In this way, any ground return path may be continued from the cable to the terminating structure.

High speed, high bandwidth cables and connectors have been used to route signals to or from processors and other electrical components that process a large number of high speed, high bandwidth signals. These cables and connectors reduce the attenuation of the signals passing to or from these components to a fraction of what might occur were the same signals routed through a printed circuit board.

SUMMARY

In some embodiments, a connector assembly having at least one cable including at least a first cable conductor and an electrical connector includes a first contact tip including a superelastic conductive material configured to mate with a first signal contact of a circuit board, and a first conductive coupler mechanically coupling the first contact tip to the first cable conductor. The first conductive coupler at least partially surrounds a circumference of the first contact tip and a circumference of the first cable conductor.

In some embodiments, a connector assembly includes a plurality of cables, each of the plurality of cables including at least one cable conductor having an end, a plurality of contact tips, where each of the plurality of contact tips includes an end abutting the end of a respective cable conductor and is made from a different material than the respective cable conductor, and a plurality of conductive couplers. Each of the plurality of conductive couplers includes a first end with tines at least partially surrounding a contact tip of the plurality of contact tips and a second end with tines at least partially surrounding the end of the respective cable conductor.

In some embodiments, a connector assembly includes a first contact tip, a first cable conductor in electrical communication with the contact tip, a first conductive coupler including a first end mechanically coupled to the first contact tip and a second end coupled to the first cable conductor, and a housing including an opening therethrough, where the opening includes a first end defined by a first wall and a second end defined by a second wall and the first contact tip passes through the first wall, the first cable conductor passes through the second wall, and the first conductive coupler is disposed in the opening.

In some embodiments, an electrical connector includes a housing including a first surface, a first side transverse to the first surface, an electrical contact tip projecting from the cable connector housing and exposed at the first surface, and at least one member configured as a receptacle sized to receive the housing therein, where the receptacle is bounded by a second side. The first side including a first portion with a second surface making an angle of greater than 0 degrees and less than 90 degrees with respect to the first surface. The second side includes a second portion with a third surface, parallel to the second surface and positioned to engage the second surface when the housing is received in the receptacle.

In some embodiments, a method of connecting a cable to a substrate includes positioning the housing with a first surface of the housing facing a surface of the substrate, applying a first force to the housing in a first direction, where the first direction is parallel to the surface of the substrate, engaging a second surface on the housing with a third surface on the receptacle, such that a second force in a second direction, perpendicular to the first direction, is generated on the housing, urging, with the second force, a ground contact tip against a ground contact disposed on the surface of the substrate, and urging, with the second force, a first electrical contact tip against a first signal contact disposed on the surface of the substrate.

In some embodiments, a method of manufacturing an electrical connector includes mechanically and electrically connecting a first cable conductor formed of a first material to a first electrical contact tip formed of a conductive superelastic material different from the first material, attaching a member to the first cable conductor and/or the first electrical contact tip, and positioning the member in a housing with the first electrical contact tip exposed in a surface of the housing and the first cable conductor extending from the housing.

In some embodiments, an electrical connector includes a first contact tip formed of a first material, a first cable conductor formed of a second material different from the first material and electrically connected to the first contact tip at a joint, and a housing including an opening therethrough, where the joint is disposed in the opening, where the opening is bounded by interior surfaces of the housing, and at least a portion of the interior surfaces are coated with a conductor.

In some embodiments, an electrical connector kit includes a contact tip, a conductive coupler including a first end configured to be mechanically coupled to the first contact tip and a second end configured to be mechanically coupled to a cable conductor, and a housing including an opening therethrough, where the opening includes a first end defined by a first wall and a second end defined by a second wall. The housing is configured to receive the first contact tip through the first wall, the housing is configured to receive the cable conductor through the second wall, and the opening is configured to receive the conductive coupler.

In some embodiments, an electrical connector includes a first contact tip formed of a first material, a first cable conductor formed of a second material different from the first material, a capacitor electrically connecting the first contact tip to the first cable conductor, and a housing including an opening therethrough, where the capacitor is disposed in the opening.

In some embodiments, a connector assembly includes a circuit board including a first contact pad, where the first contact pad includes a recess, and a first contact tip including a superelastic conductive material configured to mate with the first contact pad, where the first contact pad is configured to align the first contact tip with respect to the recess when the first contact tip mates with the first contact pad.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
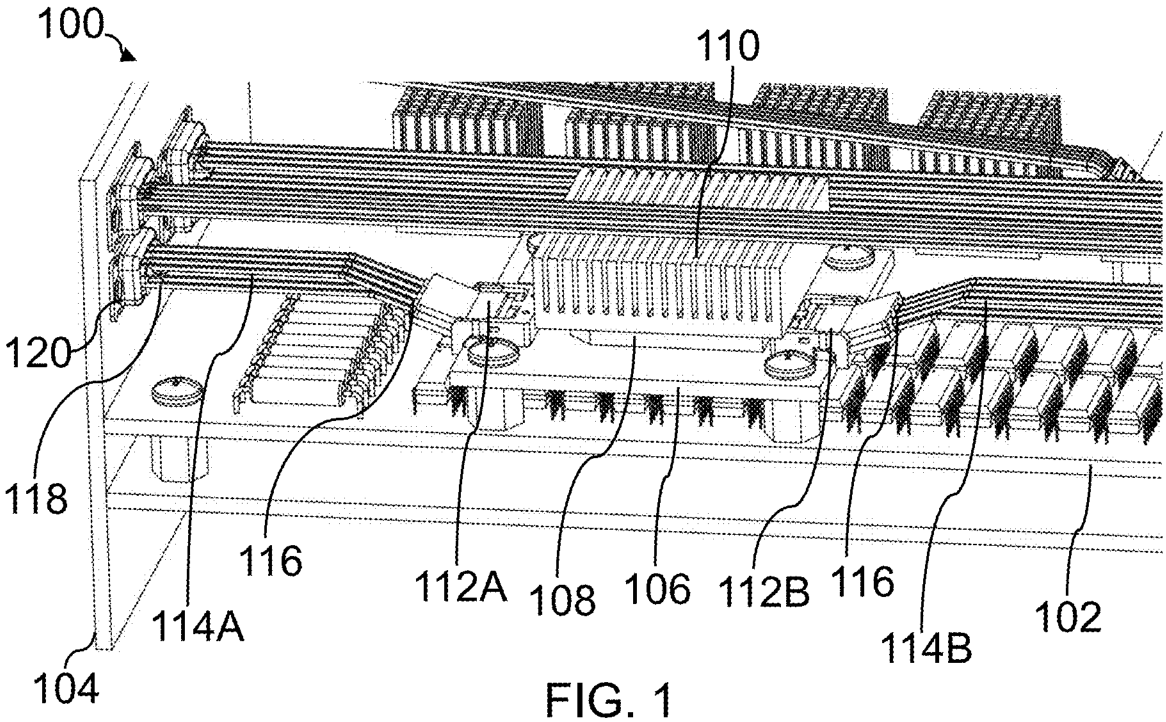
FIG. 1 is a perspective view of a portion of an exemplary embodiment of an electronic system with cables routing signals between I/O connectors and a midboard location.

The inventors have recognized and appreciated designs for cable connectors that enable efficient manufacture of small, high performance electronic devices, such as servers and switches. These cable connectors support a high density of high-speed signal connections to processors and other components in the midboard region of the electronic device. The other end of cables terminated to the connector may be connected to an I/O connector or at another location remote from the midboard such that the cables of a connector assembly may carry high-speed signals, with high signal integrity, over long distances.

The connector may support a pressure mount interface to a substrate (e.g., a PCB or semiconductor chip substrate) carrying a processor or other components processing a large number of high speed signals. The connector may incorporate features that provide a large number of pressure mount interconnection points in a relatively small volume. In some embodiments, the connector may support mounting on the top and bottom of a daughtercard or other substrate separated by a short distance from a motherboard, providing a high density of interconnections. Further, the connector may have superelastic contact tips, for example, which may have a very small diameter but nonetheless generate sufficient and consistent contact force to provide reliable electrical connections, even if there are variations in the force pressing the connector towards the substrate.

The connector may terminate multiple cables with a contact tip for each conductor in each cable designed as a signal conductor and one or more contact tips coupled to a grounding structure within the cable. For drainless twinax cable, for example, the connector may have, for each cable, two contact tips electrically coupled to the cable conductors and either one or two contact tips coupled to a shield around the cable conductors.

According to exemplary embodiments described herein, any suitably sized cable conductors may be employed and coupled to a suitably sized contact tip. In some embodiments, cable conductors may have a diameter less than or equal to 30 AWG. In other embodiments, cable conductors may have a diameter less than or equal to 36 AWG.

Contact tips may be connected to conductive structures within the cables directly or through the use of one or more intermediate components. For signal conductors, contact tips may be connected, for example, through a coupler. The coupler may hold the cable conductor and the contact tip in axial alignment. Each of the tip and cable conductor may be secured to the coupler, such as through welding, soldering or crimping, which may electrically and mechanically couple the tip and cable conductor. In some embodiments, the coupler may be configured to hold an electronic component, such as a surface mount capacitor, such that the capacitor is coupled between the tip and cable conductor. Ground tips may be coupled to shields of the cables through compliant conductive members, such as conductive elastomers.

The inventors have recognized and appreciated that, at the scale required for high density interconnections, more reliable pressure-mount connections may be formed by inhibiting sliding of the cable conductors and/or tips relative to the insulative structures of the cables and/or connector housing. Members may be attached to the cable conductors and/or tips to prevent such sliding. The members may abut the connector housing or cable insulator, blocking sliding motion. For example, the member may fit within an opening in the connector housing such that sliding motion in both directions along the axial direction of the cable is inhibited. The coupler, electrically coupling the cable conductor and contact tip, may serve as the member inhibiting sliding motion.

To support high signal integrity interconnections, portions of the cable connectors extending beyond shielding of the cable may be partially or totally surrounded by grounded structures so as to ensure that there are only small impedance changes within the connector. Those grounded structures may include portions of the connector housing that are plated with metal, such as through a PVD process. Those grounded structures may include contact tips or metal sheets connected to the ground structures within the cable and/or on a surface of a substrate to which the connector is mounted. Grounded structures, in some embodiments, may include conductive elastomer and/or electrically lossy members.

Mating force may be generated with a camming structure that generates a force, urging the connector towards a substrate, based on a force on the connector parallel to the surface of the substrate. The camming structure may be implemented with surfaces on the connector housing and mounted to the substrate that are angled relative to the substrate. Those surfaces may be positioned to engage when the connector is inserted into the receptacle such that mating force can be generated by a simple motion and without the need to tighten screws or otherwise activate a mechanism that generates force towards the substrate. Generating force through a camming structure reduces the need for mechanical components above or below the connector, which can expand the locations in which the connector can be used in a compact electronic device. Additionally, generating mating as a result of moving the connection parallel to the substrate can cause contact tips of the connector to wipe along the surface of the substrate, removing contaminants at the interface between the tips and the substrate and making more reliable electrical connections.

The pressure mount connector also may be relatively thin, further expanding the locations in which such a connector may be used. Connectors may be thin enough to fit below a heat sink mounted on a chip, for example, or mounted to an upper and/or lower surface of a card containing a processor, such as a daughter card that is spaced from a motherboard by a relatively small distance. Mounting connectors to both upper and lower surfaces of a card may increase contact density expanding the number of contacts per linear inch of the card edge and, likewise per square inch of card used for the mating interface between connector assemblies and the midboard of the electronic device.

A high contact density may also be enabled through the use of modules. Each module may couple contact tips to conductive structures within a limited number of cables, such as a single cable. Each module may have an insulative member with openings in which the conductors of a cable are spliced to contact tips. Contact tips coupled to the shield of the cable may be mounted on the outside of the insulative member. The modules may be aligned in one or more rows, creating an array of contact tips. The modules may be tightly spaced without walls of a connector housing separating them, as the ground structures on the outside of adjacent modules may touch one another, further increasing the density of the array of tips. The ground contact tips of adjacent modules may pass through the same openings in the insulative members of the adjacent modules.

Electronic systems may be significantly improved by providing pressure mount electrical connectors that incorporate shape memory materials exhibiting superelastic behavior (also known as pseudoelasticity), herein referred to as superelastic materials.

Figure 12A:
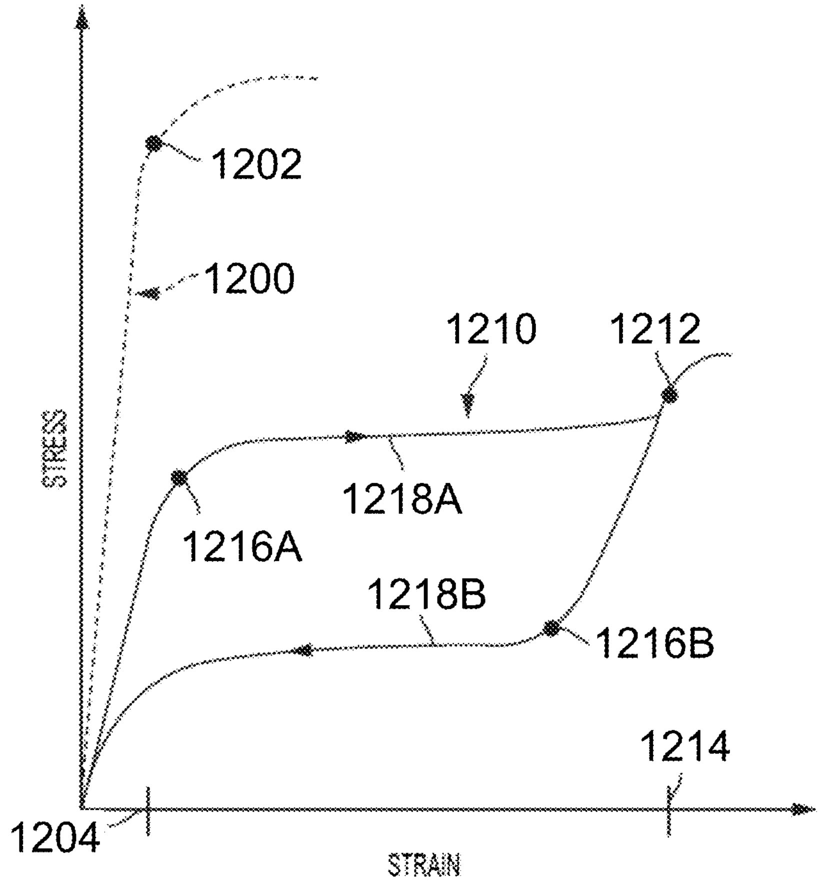
FIG. 12A is a plot showing representative stress-strain curves for conventional materials and superelastic materials.

Superelastic materials may be characterized by the amount of strain required for those materials to yield, with superelastic materials tolerating a higher strain before yielding. Additionally, the shape of the stress-strain curve for a superelastic material includes a "superelastic" region. Illustrative stress-strain curves for a conventional and superelastic material are shown in FIG. 12A.

Superelastic materials may include shape memory materials that undergo a reversible martensitic phase transformation when a suitable mechanical driving force is applied. The phase transformation may be a diffusionless solid-solid phase transformation which has an associated shape change; the shape change allows superelastic materials to accommodate relatively large strains compared to conventional (i.e. non-superelastic) materials, and therefore superelastic materials often exhibit a much larger elastic limit than traditional materials. The elastic limit is herein defined as the maximum strain to which a material may be reversibly deformed without yielding.

Superelastic behavior is exhibited by many shape memory materials which have the shape memory effect. Similar to superelasticity, the shape memory effect involves a reversible transformation between the austenite and martensite phases with a corresponding shape change. However, the transformation in the shape memory effect is driven by a temperature change, rather than mechanical deformation as in superelasticity. In particular, a material which exhibits the shape memory effect may reversibly transition between two predetermined shapes upon a temperature change which crosses a transition temperature. For example, a shape memory material may be "trained" to have a first shape at low temperatures (below the transition temperature), and a second, different shape above the transition temperature. Training a particular shape for a shape memory material may be accomplished by constraining the shape of the material and performing a suitable heat treatment.

Depending on the particular embodiment, the superelastic material may have a suitable intrinsic conductivity or may be made suitably conductive by coating or attachment to a conductive material. For example, a suitable conductivity may be in the range of about 1.5 μΩcm to about 200 μΩcm. Examples of superelastic materials which may have a suitable intrinsic conductivity include, but are not limited to, metal alloys such as copper-aluminum-nickel, copper-aluminum-zinc, copper-aluminum-manganese-nickel, nickel-titanium (e.g. Nitinol), and nickel-titanium-copper. Additional examples of metal alloys which may be suitable include Ag—Cd (approximately 44-49 at % Cd), Au—Cd (approximately 46.5-50 at % Cd), Cu—Al—Ni (approximately 14-14.5 wt %, approximately 3-4.5 wt % Ni), Cu—Au—Zn (approximately 23-28 at % Au, approximately 45-47 at % Zn), Cu—Sn (approximately 15 at % Sn), Cu—Zn (approximately 38.5-41.5 wt % Zn), Cu—Zn—X (X=Si, Sn, Al, Ga, approximately 1-5 at % X), Ni—Al (approximately 36-38 at % Al), Ti—Ni (approximately 49-51 at % Ni), Fe—Pt (approximately 25 at % Pt), and Fe—Pd (approximately 30 at % Pd).

In some embodiments, a particular superelastic material may be chosen for its mechanical response, rather than its electronic properties, and may not have a suitable intrinsic conductivity. In such embodiments, the superelastic material may be coated with a more conductive metal, such as silver, to improve the conductivity. For example, a coating may be applied with a chemical vapor deposition (CVD) process, particle vapor deposition process (PVD) or any other suitable coating process, as the disclosure is not so limited. Coated superelastic materials also may be particularly beneficial in high frequency applications in which most of the electrical conduction occurs near the surface of conductors. As described in more detail below, in some embodiments, the conductivity of a connector element including a superelastic material may be improved by attaching a superelastic material to a conventional material which may have a higher conductivity than the superelastic material. For example, a superelastic material may be employed only in a portion of the connector element which may be subjected to large deformations, and other portions of the connector which do not deform significantly may be made from a conventional (high conductivity) material.

In some embodiments, a contact pad disposed on a substrate (e.g., PCB) may include a recess configured to receive a contact tip and align the contact tip with the contact pad. The inventors have recognized the benefits of such an arrangement, which ensures consistent electrical connections between a contact tip and contact pad. In some cases, improper alignment of a contact tip and a contact pad may degrade signal launch and electrical impedance at the interface between the contact tip and the contact pad. That is, the electrical impedance and signal carrying capacity may be tuned based on specific position of a contact tip and a contact pad. Accordingly, if the contact pad aligns the contact tip when the contact tip is brought into engagement with the contact pad, the intended impedance and signal characteristics may be reliably achieved. In some embodiments, a contact pad may include a semi-circular or otherwise curved depression configured to generate normal forces that align a contact tip with a longitudinal centerline of the depression. In other embodiments, a contact pad may include a V-shaped groove with inclined walls configure to generate normal forces that align a contact tip with a longitudinal centerline of the groove. A recessed contact pad may be employed for signal contact pads and/or ground contact pads, as the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 2:
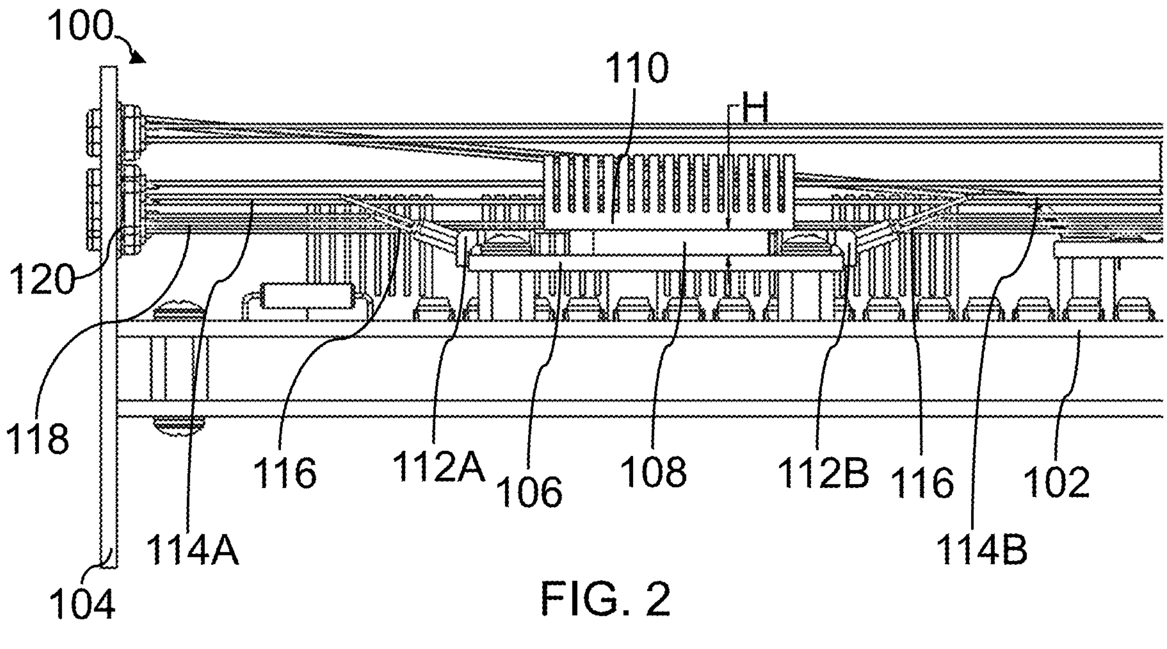
FIG. 2 is a side view of the system of FIG. 1.

FIGS. 1-2 show perspective and side views, respectively of an illustrative electronic system 100 in which a cabled connection is made between a connector mounted at the edge 104 of a printed circuit board 102, which here is a motherboard, and a midboard connector assembly 112A mated to a printed circuit board, which here is a daughterboard 106 mounted in a midboard region above printed circuit board 102. In the illustrated example, the midboard connector assembly 112A is used to provide a low loss path for routing electrical signals between one or more components, such as component 108, mounted to printed circuit daughterboard 106 and a location off the printed circuit board. Component 108, for example, may be a processor or other integrated circuit chip. However, any suitable component or components on daughterboard 106 may receive or generate the signals that pass through the midboard connector assembly 112A.

In the illustrated example, the midboard connector assembly 112A couples signals to and from component 108 through an I/O connector 120 mounted in panel 104 of an enclosure. The I/O connector may mate with a transceiver terminating an active optical cable assembly that routes signal to or from another device. Panel 104 is shown to be orthogonal to circuit board 102 and daughterboard 106. Such a configuration may occur in many types of electronic equipment, as high speed signals frequently pass through a panel of an enclosure containing a printed circuit board and must be coupled to high speed components, such as processors or ASICS, that are further from the panel than high speed signals can propagate through the printed circuit board with acceptable attenuation. However, a midboard connector assembly may be used to couple signals between a location in the interior of a printed circuit board and one or more other locations, either internal or external to the enclosure.

In the example of FIG. 1, connector assembly 112A mounted at the edge of daughterboard 106 is configured to support connections to an I/O connector 120. As can be seen, cabled connections, for at least some of the signals passing through I/O connectors in panel 104, connect to other locations with the system. For example, there is a second connector 112B, making connections to daughterboard 106.

Cables 114A and 114B may electrically connect midboard connector assemblies 112A and 112B to locations remote from component 108 or otherwise remote from the location at which midboard connector assemblies 112A or 112B are attached to daughterboard 106. In the illustrated embodiment of FIGS. 1-2, first ends 116 of the cables 114A and 114B are connected to the midboard connector assembly 112A or 112B, Second ends 118 of the cables are connected to an I/O connector 120. Connector assembly 120, however, may have any suitable function and/or configuration, as the present disclosure is not so limited. In some embodiments, higher frequency signals, such as signals above 10 GHz, 25 GHz, 56 GHz or 112 GHz may be connected through cables 114, which may otherwise be susceptible to signal losses at distances greater than or approximately equal to six inches.

Cables 114B may have first ends 116 attached to midboard connector assembly 112B and second ends 118 attached to another location, which may be a connector like connector 120 or other suitable configuration. Cables 114A and 114B may have a length that enables midboard connector assembly 112A to be spaced from second ends 118 at connector assembly 120 by a first distance. In some embodiments, the first distance may be longer than a second distance over which signals at the frequencies passed through cables 114A could propagate along traces within PCB 102 and daughterboard 106 with acceptable losses. In some embodiments, the first distance may be at least 6 inches, in the range of 1 to 20 inches, or any value within the range, such as between 6 and 20 inches. However, the upper limit of the range may depend on the size of PCB 102.

Taking midboard connector assembly 112A as representative, the midboard connector assembly may be mated to printed circuit board, such as daughter card 106, near components, such as component 108, which receive or generate signals that pass through cables 114A. As a specific example, midboard connector assembly 112A may be mounted within six inches of component 108, and in some embodiments, within four inches of component 108 or within two inches of component 108. Midboard connector assembly 112A may be mounted at any suitable location at the midboard, which may be regarded as the interior regions of daughterboard 106, set back equal distances from the edges of daughterboard 106 so as to occupy less than 100% of the area of the daughterboard 106. Such an arrangement may provide a low loss path through cables 114. In the electronic device illustrated in FIGS. 1-2, the distance between connector assembly 112A and processor 108 may be of the order of 1 inch or less.

In some embodiments, midboard connector assembly 112A may be configured for mating to a daughterboard 106 or other PCB in a manner that allows for ease of routing of signals coupled through the connector assembly. For example, an array of signal pads to which contact tips of midboard connector assembly 112A are mated may be spaced from the edge of daughterboard 106 or another PCB such that traces may be routed out of that portion of the footprint in all directions, such as towards component 108.

According to the embodiment of FIGS. 1-2, connector assembly 112A includes eight cables 114A aligned in multiple rows at first ends 116. In the depicted embodiment, cables are arranged in a 2×4 (i.e., two row, four column) array at first ends 116 attached to midboard connector assembly 112A. Such a configuration, or another suitable configuration selected for midboard connector assembly 112A, may result in relatively short breakout regions that maintain signal integrity in connecting to an adjacent component in comparison to routing patterns that might be required were those same signals routed out of an array with more rows and fewer columns.

As shown in FIG. 2, the connector assembly 112A may fit within a space that might otherwise be unusable within electronic device 100. In this example, a heat sink 110 is attached to the top of processor or component 108. Heatsink 110 may extend beyond the periphery of processor 108. As heat sink 110 is mounted above daughterboard 106, there is a space between portions of heatsink 110 and daughterboard 106. However, this space has a height H, which may be relatively small, such as 5 mm or less, and a conventional connector may be unable to fit within this space or may not have sufficient clearance for mating. However, the connector assembly 112A and other connectors of exemplary embodiments described herein may fit within this space adjacent to processor 108. For example, a thickness of a connector housing may be between 3.5 mm and 4.5 mm. Such a configuration uses less space on printed circuit daughterboard 106 than if a connector were mounted to printed circuit daughterboard 106 outside the perimeter of heatsink 110. Such a configuration enables more electronic components to be mounted to printed circuit to which the midboard connector is connected, increasing the functionality of electronic device 100. Alternatively, the printed circuit board, such as daughterboard 106, may be made smaller, thereby reducing its cost. Moreover, the integrity with which signals pass from connector assembly 112A to processor 108 may be increased relative to an electronic device in which a conventional connector is used to terminate cables 114A, because the length of the signal path through printed circuit daughterboard 106 is reduced.

While the embodiments of FIG. 1-2 depict a connector assembly connecting to a daughter card at a midboard location, it should be noted that connector assemblies of exemplary embodiments described herein may be used to make connections to other substrates and/or other locations within an electronic device.

As discussed herein, midboard connector assemblies may be used to make connections to processors or other electronic components. Those components may be mounted to a printed circuit board or other substrate to which the midboard connector might be attached. Those components may be implemented as integrated circuits, with for example one or more processors in an integrated circuit package, including commercially available integrated circuits known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores in one package such that one or a subset of those cores may constitute a processor. Though, a processor may be implemented using circuitry in any suitable format.

In the illustrated embodiment, the processor is illustrated as a packaged component separately attached to daughtercard 106, such as through a surface mount soldering operation. In such a scenario, daughtercard 106 serves as a substrate to which midboard connector 112A is mated. In some embodiments, the connector may be mated to other substrates. For example semiconductor devices, such as processors, are frequently made on a substrate, such as semiconductor wafer. Alternatively, one or more semiconductor chips may be attached, such as in a flip chip bonding process, to a wiring board, which may be a multi-layer ceramic, resin or composite structure. The wiring board may serve as a substrate. The substrate for manufacture of the semiconductor device may be the same substrate to which the midboard connector is mated.

Figure 3:
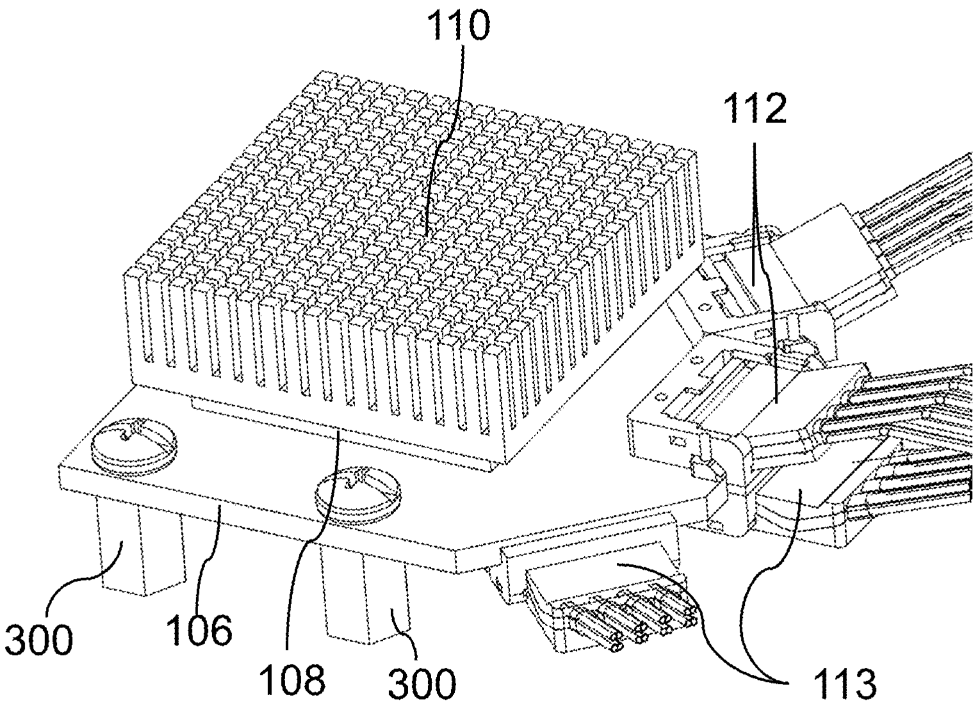
FIG. 3 is a perspective view of a portion of another exemplary embodiment an electronic system, showing connection of connector assemblies to the top and bottom surfaces of a substrate of a processor subassembly that may be installed in a midboard location of the electronic system.

FIG. 3 is a perspective view of another embodiment a daughterboard 106 connected to other subassemblies inside an electronic device with connector assemblies 112, 113. Similarly to the embodiment of FIGS. 1-2, the daughterboard of FIG. 3 includes a processor 108 topped by a heatsink 110 which extends past the periphery of the processor and creates a narrow gap (e.g., less than 10 mm, less than 7.5 mm, less than 5 mm, etc.) between the heatsink and the daughterboard. As shown in FIG. 3, connector assembly 112 mates to a top surface of the daughter card within the space between the heatsink and daughterboard, as in the example of FIGS. 1-2. In the example of FIG. 3, the daughterboard is mounted on standoffs 300, which physically couple the daughterboard to an associated printed circuit board such as a motherboard or another daughterboard. The standoffs create another narrow gap, in this case between a bottom surface of the daughterboard and the underlying PCB. Connector assembly 113 is configured to mate to a bottom surface of the daughterboard and fits between the daughterboard and the underlying PCB. The connector housings of the connector assemblies 112, 113 are suitably thin or low-profile to fit within the narrow gap and can be mated with a motion parallel to the surfaces of the daughterboard such that only a small amount of clearance above and below the daughterboard are required for mating. As a result, the size of the electronic device may be decreased or the density of electrical components, such as processor 108, within the electronic device may be increased. In the illustrated embodiment, thickness of the housings of connector assemblies 112 and 113 may be between 3.5 mm and 4.5 mm to achieve such a fit.

Figure 4:
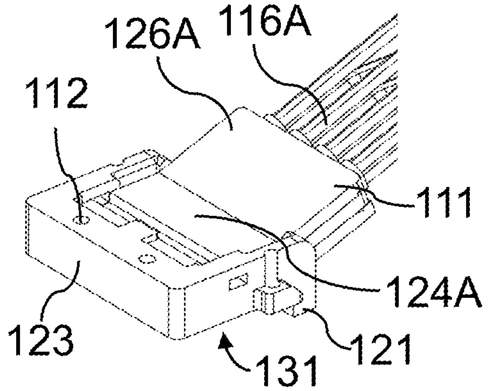
FIG. 4 is a perspective view of an exemplary embodiment of a portion of a connector assembly with a connector that may be connected to a top surface of a subassembly.

FIG. 4 is a perspective view of one embodiment of an upper connector assembly 112 including a plurality of cable ends 116A. As shown in FIG. 4, the connector assembly includes a connector housing which includes a first section 124A and a second section 126A. The cable ends 116A enter the connector housing at the second section 126A. One or more conductive elements, such as signal conductors and shielding, within each of the cables are connected to contact tips at least partly in the first housing section 124A, as will be discussed further below. According to the depicted embodiment, the first section and second section are angled relative to one another by an angle of approximately 30 degrees. Such an arrangement may be beneficial to improve cable and connector housing clearance from other electrical components in an electronic device, such as components mounted to the motherboard. In other embodiments, other relative angles between the first section and second section may be used, such as between 15 and 60 degrees.

As shown in FIG. 4, the connector housing includes a ledge 121 which is configured to align the connector assembly 112 with an edge of the PCB. The ledge overhangs a PCB when a mating surface 131 of the connector is flush with a surface of the PCB, allowing the ledge to contact an edge of the PCB and orient the connector assembly. According to the embodiment shown in FIG. 4, the connector assembly includes a connector and a separate connector receptacle 123 which receives the connector. The connector receptacle may include one or more surfaces which guide the mating surface 131 disposed on the connector into contact and alignment with the PCB, as will be discussed further with reference to the exemplary embodiments shown in FIGS. 21-24.

Figure 5:
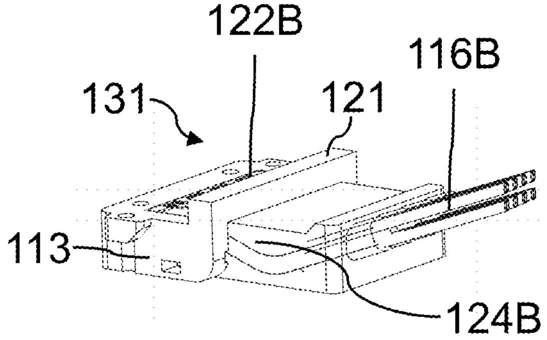
FIG. 5 is perspective view of an exemplary embodiment of a portion of a connector assembly with a connector that may be connected to a bottom surface of a subassembly.

FIG. 5 is perspective view of a lower connector assembly 113. Like the upper connector assembly of FIG. 4, the lower connector assembly includes a connector housing having a first section 124B. In contrast to the upper connector assembly, in this example, the lower connector assembly does not include a second housing section angled relative to the first housing section 124B. Nevertheless, the lower connector assembly still includes a housing portion having a mating surface 131 and another housing surface which positions a plurality of cables for routing. In the embodiment of FIG. 5, cable ends 116B of the plurality of cables enter the first section of the connector housing at an angle of approximately 30 degrees relative to the housing section. Such an arrangement similarly improves clearance of the cable around components which may be disposed on an underlying PCB. Of course, the cables may enter the connector housing at any suitable angle, including angles between 15 and 60 degrees, as the present disclosure is not so limited. As shown in FIG. 5, the signal conductors in the cable ends 116B are each connected to a respective contact tip 122B which engage a daughterboard or PCB to transfer signals between one or more components and associated cables.

Figure 6:
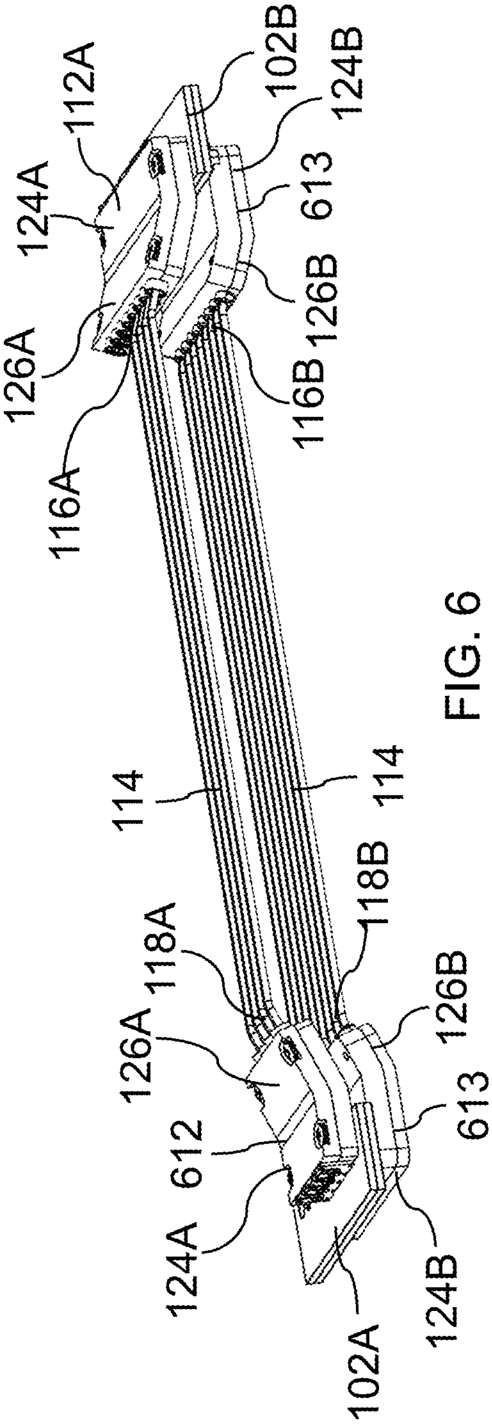
FIG. 6 is a perspective view of a portion of an exemplary embodiment of an electronic system in which cables are connected to top and bottom surfaces of substrates within the electronic system.
Figure 7:
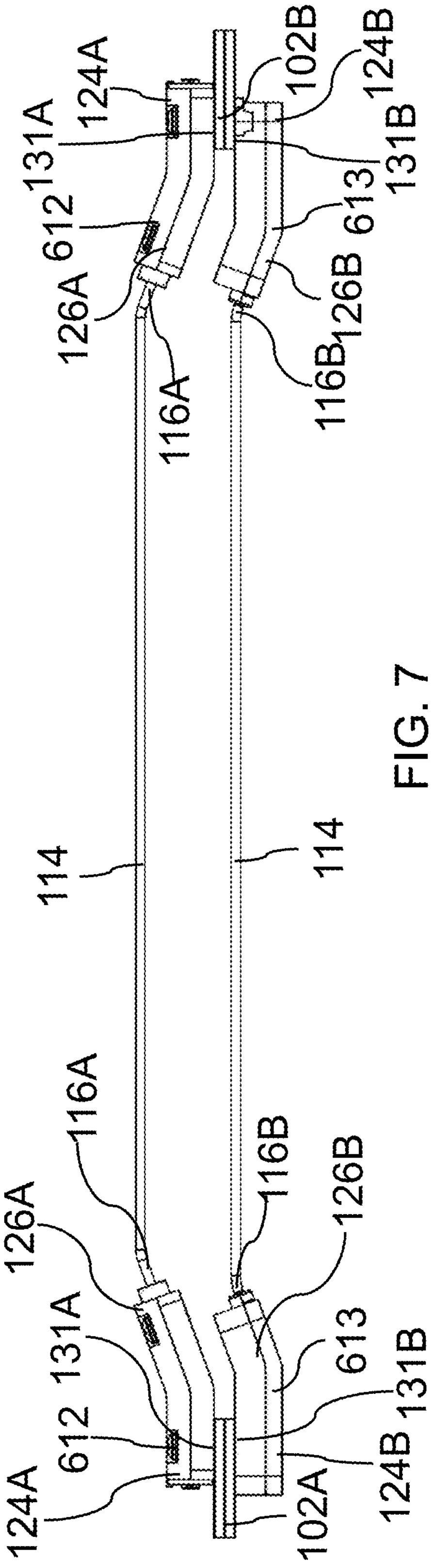
FIG. 7 is a side view of the cables and connector assemblies of FIG. 6.

FIGS. 6-7 are perspective and side views, respectively, of one embodiment of connector assemblies 612, 613 having cables 114 As shown in FIG. 6, the connector assemblies are configured to connect two substrates, which may be printed circuit boards 102A, 102B. For example, the connector assemblies of FIGS. 6-7 may interconnect two high frequency subassemblies, which may be formed by components mounted on the separate PCBs 102A, 102B. The first (e.g. upper) connector assemblies 612 includes a first housing section 124A and a second housing section 126A which is angled relative to the first housing section similarly to the embodiment of FIG. 4. First cable ends 116A enter the second section of the housing of one connector assembly and second cable ends 116B enter the second section of the housing of the other connector assembly. Similarly, the second (i.e., lower) connector assemblies 613 also include first housing sections 124B and second housing sections 126B. The first ends 116B of the cables enter the respective second housing section and the second ends 118B enter the other second housing section. Like the first connector assemblies, the second sections 126B of the housings are inclined relative to the first sections 124B to improve clearance of the housing and cables. As shown in FIGS. 6-7, the cables for the upper and lower connector assemblies are arrange in parallel one above the other, and may be clipped and/or routed together.

As shown in FIG. 7, each of the upper and lower connector assemblies 612, 613 are mated to PCBs 102A, 102B. In particular, mating surfaces 131A, 131B of each connector assembly are pressed against the PCB to create a mating interface. In the embodiment of FIG. 7, the mating surfaces are disposed on the first housing sections 124A, 124B of the upper and lower connector assemblies. As will be discussed further with reference to FIG. 8, the connector assemblies are secured with screw fasteners which secure the upper and lower connector assemblies to the PCBs 102A, 102B.

Figure 8:
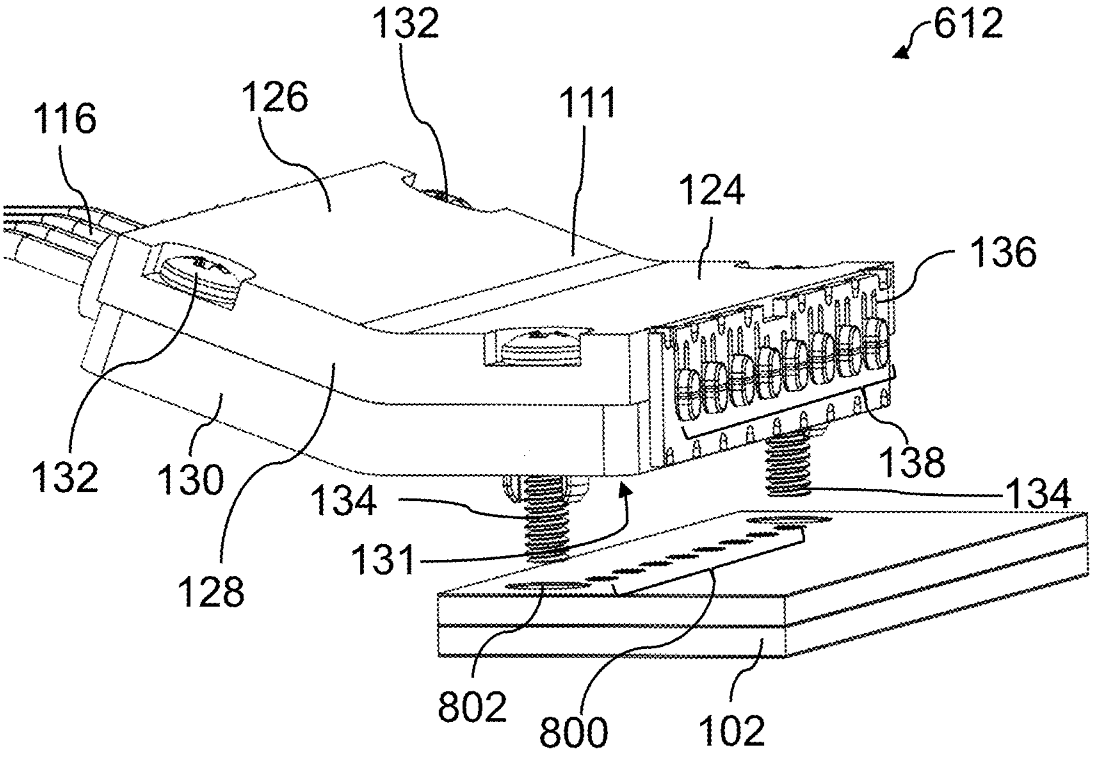
FIG. 8 is a perspective view of an embodiment of a connector connecting cables to a top surface of a subassembly of FIG. 6.

FIG. 8 is a perspective view of an embodiment of a connector assembly 612 of FIG. 6 with a connector 111 detached from PCB 102. In this configuration, a footprint for connector assembly is visible on the surface of PCB 102. The footprint includes contacts 800. The contacts 800 are pads to which signal conductors within the connector assembly 612 are mated. Other portions of the footprint may have ground pads or large portions of the footprint, set back from the signal pads, may be a ground layer. Ground conductors within the connector assembly 612 may mate with these ground structures on the surface of PCB 102.

To support mating to such a footprint, connector 111 may have contact tips connected to the signal and/or ground conductive structures of the cable. Those contact tips may be positioned to press against corresponding conductive structures within the footprint on PCB 102. In the configuration of FIG. 8, the mating face of the connector 111 is on a lower portion of first section 124. Though not visible in FIG. 8, those contact tips may extend, in a rest state, beyond the surface of first section 124 facing PCB 102. When connector 111 is pressed against PCB 102, those contact tips may deflect, generating a contact force between the contact tips and the pads or other conductive structures on the surface of PCB 102. In the embodiment illustrated, connector 111 is pressed against PCB using mounting components which, when actuated force connector 111 against the surface of PCB 102. Those mounting components are illustrated in FIG. 8 as fasteners 134, specifically screws in this example, which may be tightened to force connector 111 against PCB 102.

As shown in FIG. 8 and discussed previously, the connector 111 includes a first section 124 and a second section 126 inclined relative to the first section. The connector includes a mating surface 131 which is configured to be pressed against the PCB 102. In the embodiment shown in FIG. 8, the PCB fasteners 134 are screwed into holes 802 disposed on the PCB and tightened so that the mating surface is flushed with the PCB. Accordingly, contact tips which extend from the connector out of the mating surface are moved into contact with a plurality of contacts 800 on the PCB. When the mating surface is flushed with the PCB, the first section 124 of the housing is parallel to the PCB, while the second section 126 is inclined relative to the PCB to allow cables to be easily routed away from the PCB and to provide clearance for other components that may be on or near the PCB.

The housing is formed of multiple pieces that are held together, which allows internal components of the connector 111 to be arranged before being surrounded by the housing. Here, an upper piece 128 and a lower piece 130 are fastened together to form the housing modules. The two housing pieces are shaped to fit around the first ends 116 of the cables, which may enter the housing. Within the housing, conductive elements of the cable may be connected to contact tips. The upper piece and lower piece may be connected together with housing fasteners 132, which provide a clamping force to hold the connector its components together.

As shown in FIG. 8, the PCB includes a plurality of contacts 800 formed on the PCB as well as through holes 802 configured to receive the PCB fasteners 134. As noted above, the PCB fasteners may be threaded into the through holes 802 so that the connector 111 may be fastened to the PCB and electrical contact tips of the connector will engage the plurality of contacts 800 to electrically couple the associated cable conductors to the PCB.

As shown in FIG. 8, the connector 111 also includes a metal plate 136 which is configured to stabilize and rigidify the connector housing. As will be discussed below, the contact tips of the connector may generate a spring force when the connector is engaged with the PCB which urges the connector away from the PCB. Accordingly, as the connector is held to the PCB on transverse extremities of the connector (i.e., PCB fasteners 134), the biasing force may cause bowing (i.e., bending) of the connector along a transverse axis of the connector. The metal plate is arranged to increase the stiffness of the connector to inhibit bending along the transverse axis of the connector to promote consistent engagement of the contact tips regardless of where those contact tips are located in the transverse direction relative to the fasteners. In the example of FIG. 8, the metal plate is engaged to the housing at a plurality of locations along the transverse direction. Engagement in this example is achieved with a plurality of housing plate engagement projections 138 which allow the metal plate to resist the bending of the connector housing when the connector is coupled to the PCB 102.

Figure 9:
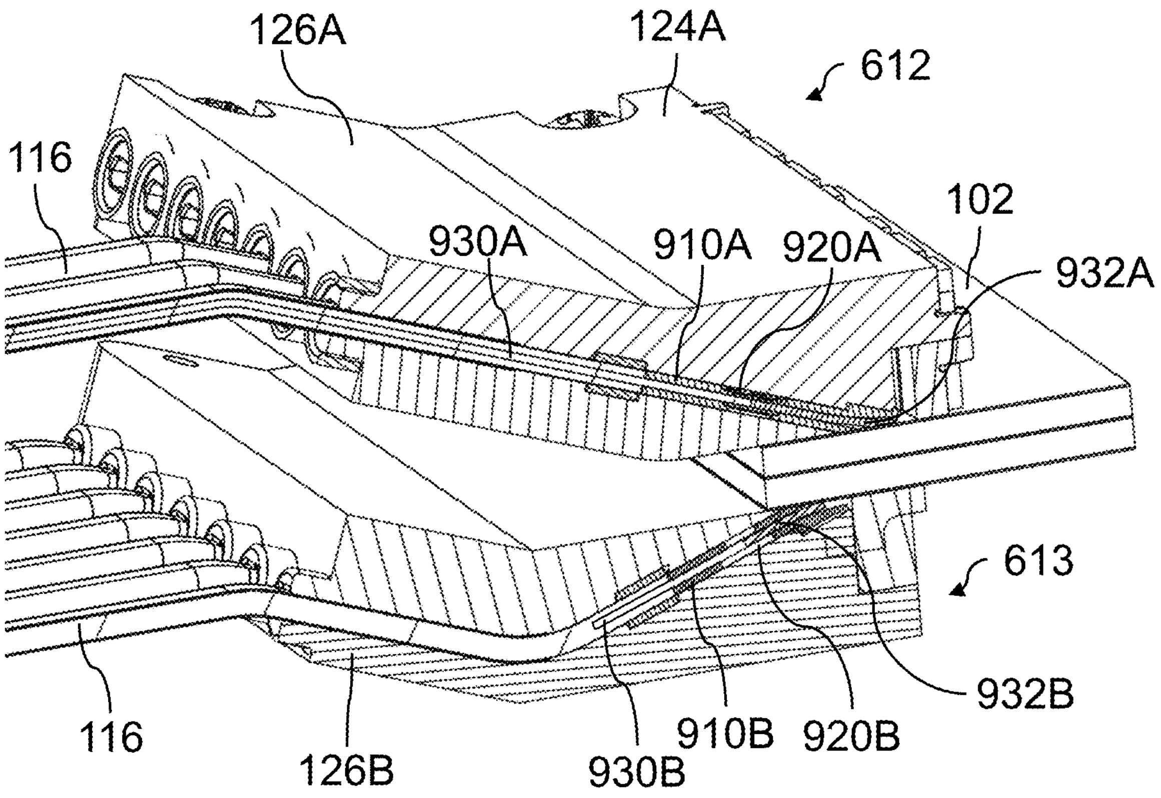
FIG. 9 is a section view of the connector assemblies connected to a substrate of FIG. 6.

FIG. 9 is a section view of the connector assemblies 612, 613 of FIG. 6 showing the signal contact tips 932A, 932B electrically coupled to cable conductors 930A, 930B of the first cable ends 116. As noted previously, the first ends 116 of the cables enter second sections 126A, 126B of their respective housings. Each of the cables includes at least one cable conductor 930A, 930B which carries an electrical signal. Though, it should be appreciated that each cable may include more than one conductor, such as a pair of conductors, each surrounded by an insulator, as is common in a twinax cable.

The housing may hold inserts 910A, 910B. Each of the inserts may support an end of the conductors of a cable and signal contact tips 932A, 932B that are electrically and mechanically coupled to the end of the conductors of the cable. Couplers 920A, 920B are shown coupling a cable conductor to a contact tip, which may similarly be supported by the insert. The coupler 920A, 920B is configured to electrically and physically couple the cable conductors 930A, 930B to the signal contact tips 932A, 932B, so that an electrical signal may be transmitted from the PCB 102 through the contact tips and to a respective cable conductor. Additionally, an insert may support ground contact tips, which may be electrically and, in some embodiments, physically coupled to a shield structure of a cable.

The coupler may be connected to the contact tips and conductors using, for example, soldering, welding, and/or crimping. The coupler may suitably connect the signal contact tips 932A which may be formed of a first material, such as a superelastic material like nickel titanium, to the cable conductors, which may be formed of a second material, such as a high conductivity material like copper.

The coupler may be fixed to the insert or mounted within the insert such that its motion in a direction parallel to the elongated axis of the cable conductor is limited. The inventors have recognized and appreciated that a cable conductor might slide within the insulator enclosing the cable conductor. In a configuration in which the end of the cable conductor is attached to a contact tip, such sliding of the conductor can change the position of the contact tip with respect to the surface of a substrate to which the contact tip is to mate, reducing the reliability of the connector. According to the embodiment of FIG. 9, the couplers 920A, 920B may also serve to inhibit pistoning (i.e., longitudinal or axial movement) of the cable conductors and/or contact tips. Alternatively or additionally, other anti-pistoning arrangement may be employed, such as beads fixed on the contact tip and/or cable conductor, which are mounted within the insert so as to limit motion of the bead. Such a bead may be formed, for example, by molding plastic or depositing solder.

Incorporating inserts into a connector housing may simplify manufacturing of the connector. An insert may be used to connect the conductors of a cable to contact tips outside of the connector housing, where tools and fixtures may be more readily used. For example, an end of a cable may be stripped of an exterior jacket and a shield surrounding a pair of signal conductors. Those signal conductors may be insulated within the cable, but that insulation may also be stripped off at the ends, leaving exposed conductors. Those exposed conductors might be inserted from one direction into openings passing through the insert. Contact tips may be inserted into those openings from the opposite direction, such that ends of the cable conductor and ends of the contact tip may face each other at an interior portion of the insert. That interior portion may include a window, exposing the joint between a cable conductor and a contact tip, such that the two may be connected, such as via welding or soldering. In embodiments in which a coupler is used, the window may open into a cavity in the insert where the coupler may be positioned. Ground contact tips may similarly be integrated into the insert, and coupled to the shield of the cable terminated by the insert. Once the cable is terminated with tips in this way, the insert may be inserted into or otherwise attached to the housing.

Figure 10:
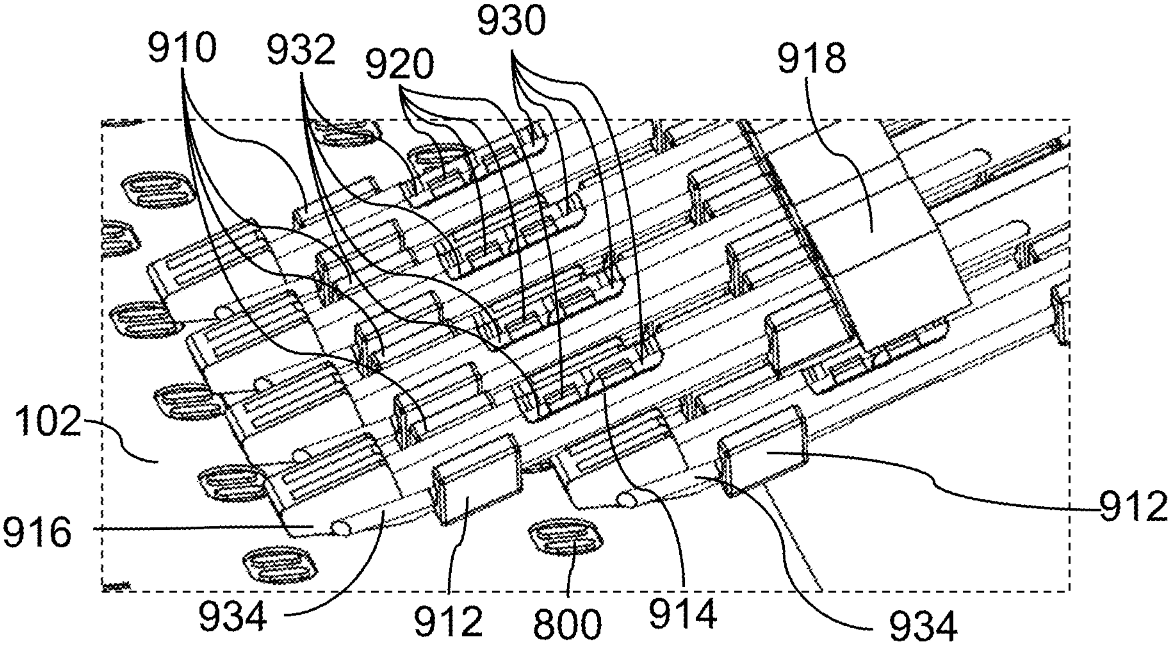
FIG. 10 is a perspective view of an exemplary embodiment of a connector with portions of the connector housing removed to reveal the mating interface of the connector.

FIG. 10 is a perspective view of one embodiment of a connector assembly with a connector housing removed to reveal a plurality of inserts, each terminating a cable. A modular construction of the connector assembly is achieved, in this example, by inserts aligned side-by-side in rows. Here, two rows are illustrated.

FIG. 10 shows a plurality of signal contact tips 932, cable conductors 930, and ground contact tips 934 for making an effective electrical connection of a plurality of contact pads 800 disposed on a PCB 102. As shown in FIG. 10, the connector assembly includes a plurality of inserts 910 which each support a pair of cable conductors 930, signal contact tips 932, and ground contact tips 934. Such an arrangement may be beneficial for twinax or dual conductor cables, as one insert will be used with each cable. Each insert includes ground contact tip holders T having an opening to receive and support the ground contacts 934. Additionally, the insert includes an opening 914 which is configured to receive two couplers 920 for creating two separate junctions between the two cable conductors 930 and two signal contact tips 932 disposed in each insert. Opening 914 may be segregated into two cavities, each holding one coupler. The insert 910 may be an insulative material, such as molded plastic, such that the couplers within opening 914 are electrically insulated from one another.

As shown in FIG. 10, each insert also includes a mating portion 916 including a contact surface configured to abut the PCB 102 when the connector is mated to the PCB. The contact tips project underneath the mating portion to engage a contact pad 800. According to the embodiment of FIG. 10, the connector assembly may be used with a cable having a ground shield surrounding the internal cable conductors. Accordingly, the connector assembly includes a mechanism to electrically couple the ground contact tips 934 and the shields of the cables. In this example, each of the inserts includes a compliant, conductive member that is pressed against both the ground contact tips 934 and the shields. The compliant, conductive member may be formed, for example, from an elastomer filled with conductive particles, such as conductive fibers, beads, or flakes. Force to press the compliant, conductive member against ground contact tips 934 and the shields may be generated by compressing that member between housing portions.

Thus, each of the contact tips may be connected to a separate cable conductor and each of the ground contact tips may be connected to a ground shield. The bodies of the inserts shown in FIG. 10 may be formed of a dielectric material, so that the individual contact tips and cable conductor combinations may be isolated from one another.

Figure 11:
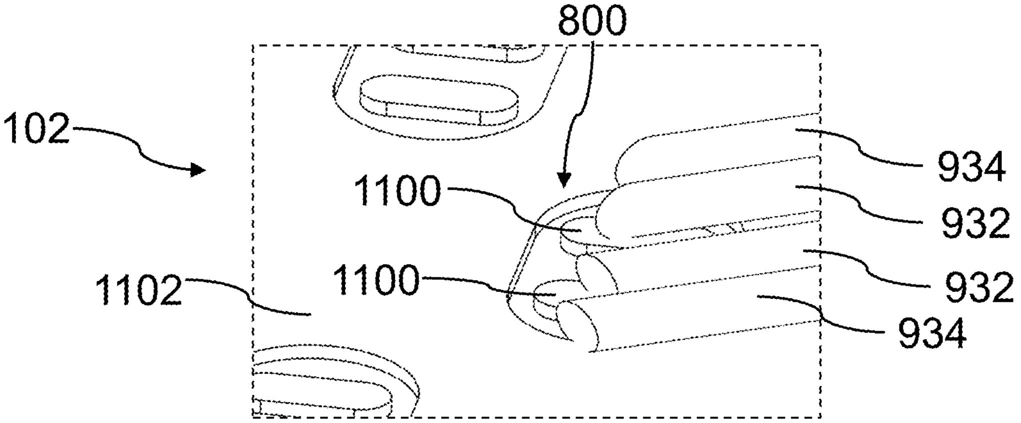
FIG. 11 is an enlarged perspective view of a pair of signal contact tips and ground contact tips of the mating interface of FIG. 10.

FIG. 11 is a perspective view of signal contact tips 932 and ground contact tips 934 of the connector of FIG. 10 engaged with a contact pad of a PCB 102. As shown in FIG. 11, the contact pad includes two signal pads 1100 and a ground pad 1102. Each of the contact tips (shown with a mating t portion of an insert as shown in FIG. 10, cut away in FIG. 11) is in contact with a respective signal pad 1100. In contrast, the ground contacts 934 are both electrically coupled to the same ground contact pad 1102. In the illustrated embodiment, the surface of PCB 102 at the footprint of the connector has a large ground pad, with openings in which signal pads 110 are disposed. The signal pads 110 are disposed in pairs in the openings of the ground pad, such that each pair of signal pads may be contacted by contact tips of an insert. Accordingly, when inserts configured to terminate twinax cables are positioned in rows, there may be rows of such pairs. FIG. 11, shows portions of two such rows. It can be seen in FIG. 11 that the pairs in the adjacent rows are offset with respect to each other in the row direction, such that the pairs in one row are between the pairs in the other. In other embodiments, the rows may be aligned or the ground contacts may have separate contact pads, as the present disclosure is not so limited.

In the depicted embodiment, to mate the connector to PCB 102, the contact tips and ground contact tips are elastically deformed against the contact pads 800. Elastic deformation may ensure good electrical communication between the PCB 102 and associated cable conductors. The inventors have recognized and appreciated that it may be desirable to form the signal contact tips 932 and/or ground contact tips of a superelastic material such as nickel titanium. Superelastic material, for example, may ensure a relatively constant contact force for a range of deflections of the contact tips, allowing for larger tolerances in the manufacturing of a connector assembly. As will be discussed further with reference to FIGS. 12A-12B, the contact tips may have an elastic range of deformation where added elastic deformation does not increase the spring force generated by the contact tip. Alternatively or additionally, using superelastic material enable the use of small diameter conductors to form contact tips, such as 30 AWG, 32 AWG, 34 AWG or smaller diameter wires.

FIG. 12A depicts representative stress-strain curves for conventional materials and for superelastic materials which may be employed in contact tips and/or ground contact tips of exemplary embodiments described herein. In this example, the superelastic materials are materials that undergo a reversible martensitic phase change from an austenite phase to a martensite phase. The stress-strain curve 1200 for a conventional material exhibits elastic behavior up to a yield point 1202 corresponding to an elastic limit 1204. The stress strain curve for a superelastic material is depicted as curve 1200; the arrows on the curve indicate the stress-strain response for loading and unloading. During loading, superelastic materials exhibit elastic behavior up to a first transition point 1216A, after which the transformation from austenite to martensite begins and the stress-strain curve exhibits a characteristic plateau 1218A, herein referred to as the superelastic regime. In the superelastic regime, the shape change associated with the martensite transformation allows the material to accommodate additional strain without a significant corresponding increase in stress. When all of the superelastic material has been converted to martensite, the superelastic material may reach a yield point 1212 corresponding to an elastic limit 1224. During unloading, the martensite phase transforms back to the austenite phase; the transformation begins at a second transition point 1216B and may occur at a lower stress than the transformation during loading, as indicated by the second plateau 1218B.

As described above, the elastic limit of superelastic materials may be substantially larger than those of conventional materials. For example, some superelastic materials may be deformed to about 7% to 8% strain or more without yielding; in contrast, many conventional materials, such as metal alloys commonly used in electrical connectors, yield at 0.5% strain or less. Therefore, superelastic materials may enable designs for separable electrical connectors which utilize relatively large local deformations that are not possible with conventional materials without resulting in yielding and associated permanent damage to the connector. In particular, the inventors have recognized and appreciated that the large elastic limit of superelastic materials may be beneficial for providing reliable connections in the mating interface of an electrical connector. For example, the substantially flat stress-strain response of superelastic materials in the superelastic regime may allow for components made from superelastic materials to provide the same contact force over a large range of deformations. Therefore, superelastic components may allow for design tolerances that are larger compared to what is possible with conventional materials.

In some embodiments, the plateau 1218A in the stress-strain response of a superelastic material may enable connector designs which feature a substantially constant mating force over an extended range of deformations. Specifically, as described above, when a superelastic material is deformed in the superelastic regime, additional applied strain may be accommodated via a phase transition from an austenite phase to a martensite phase without a substantial increase in the applied stress. Such a response may allow for more facile and/or reliable connections between components of an interconnection system. For example, in some embodiments, an initial deformation applied to a connector element made from superelastic material during an initial stage of the mating process may be sufficient to deform the connector element into the superelastic regime. Therefore, the remainder of the mating process, including subsequent deformation of the superelastic connector element, may be carried out with little, if any, additional required force. In contrast, connector elements made from conventional materials may require an increasing force to achieve additional deformation.

Accordingly, in some embodiments, a connector may be designed with a nominal mating state in which beams or other members made of superelastic materials are deflected near the middle of the superelastic region. Because of manufacturing tolerances in the connector and the system in which the connector might be installed, members in a connector may be deflected more or less than designed for a nominal mating state. In a connector made with superelastic members, over a relatively wide working range, more or less deflection will still result in the members operating in their superelastic region. As a result, the contact force provided by those members will be approximately the same over the entire working range. Such a uniform force, despite variations attributable to manufacturing tolerances, may provide more reliable electrical connectors and electronic systems using those connectors.

Figure 12B:
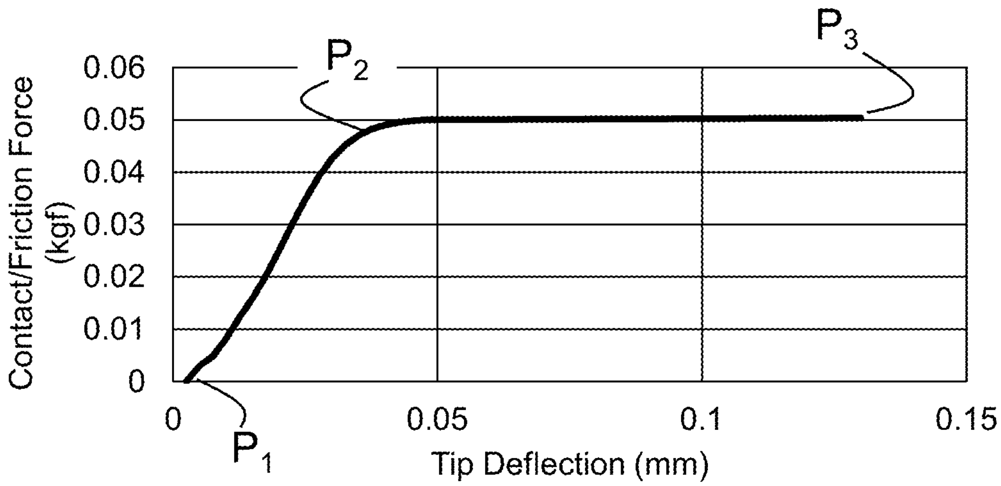
FIG. 12B is a graph of contact force as a function of deflection for an exemplary embodiment of a contact tip undergoing superelastic deformation.

FIG. 12B is a graph of one embodiment of a contact tip undergoing superelastic deformation. During mating, the superelastic contact tips are moved into engagement with contact pads, and the engagement causes the contact tips to deflect, as represented by point $P_1$. That deflection creates a force, which increases until the superelastic regime is reached, as represented by point $P_2$. Further deflection within the superelastic regime, as represented by the of the curve between point $P_2$ and by point $P_3$. The deflected shape of the superelastic contact tips provides a restoring force which creates the contact force necessary to form a reliable electrical connection. Furthermore, the force may be sufficient to break through any oxide on the surfaces of the portions of the connectors which come into contact. When unmated, the superelastic wires may return to their original, undeformed geometry.

As shown in FIG. 12B, a superelastic contact tip may be deflected from 0.05 mm to 0.1 mm with little added contact force as the contact tip is in the superelastic range. Such an arrangement allows larger tolerances with manufacturing a connector assembly and/or pressing the connector assembly against a substrate, as the contact tips may be deflected within a range without a corresponding change in contact force that would result in a weak electrical connection or permanently deform the contact tips. Here, the contact force is constant over a sufficiently large range of deflections to encompass the variation in deflections expected across fielded systems. In the present embodiment, the contact force may remain within 5% over a range of tip deflections of 0.03 mm to 0.15 mm. Of course, other contact force ranges for a given desirable tip deflection range may employed, as the present disclosure is not so limited. It should also be understood that in such embodiments, the use of superelastic components may enable designs in which local strains in the superelastic components would exceed the elastic limit of conventional materials, and therefore such embodiments would not be possible using conventional materials without causing permanent deformation and associated damage to the connector. In some embodiments, a pressure mount connector may be designed with a nominal deformation of contact tips during a mating operation sufficient to place the contact tips in the superelastic region when mated. As can be appreciated from FIGS. 12A and 12B, in such a configuration, the connector will provide a predictable and repeatable mating force with little variation even if the actual deformation is less than or greater than the nominal value.

Figure 13:
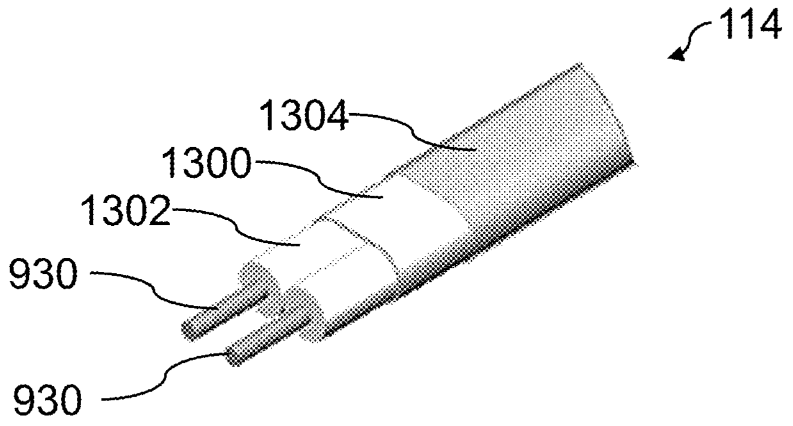
FIG. 13 is a perspective view of an exemplary embodiment of a drainless twinax cable.

FIG. 13 is a perspective view of one embodiment of a cable that may be terminated by a connector as described herein. The conductors of such a cable, for example may be physically and electrically coupled to contact tips of an insert, for example. In this example, the cable is a drainless twinax cable 114 which may be used with a connector assembly of exemplary embodiments described herein. As shown in FIG. 13, the drainless twinax cable includes two cable conductors 930 which may be electrically and physically coupled to contact tips of an associated connector assembly. Each of the cable conductors are surrounded by dielectric insulation 1302 which electrically isolate the cable conductors from one another. A shield 1300 which may be connected to ground surrounds the cable conductors and dielectric insulation. The shield may be formed of a metal foil and may fully surround the circumference of the cable conductors. The shield may be coupled to one or more ground contact tips through a compliant conductive member. Surrounding the shield is an insulative jacket 1304. Of course, while a drainless twinax cable is shown in FIG. 13, cable configurations may be employed, including those having more or less than 2 cable conductors, one or more drain wires, and/or shields in other configurations, as the present disclosure is not so limited.

Figure 14A:
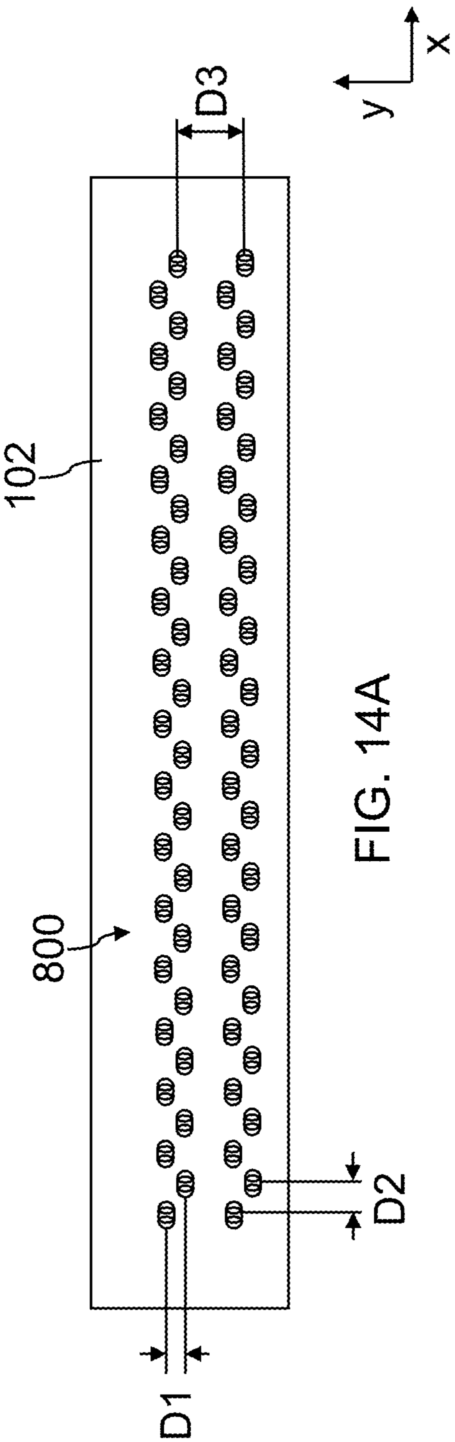
FIG. 14A is a top plan view of a portion of an exemplary embodiment of a substrate of a subassembly with conductive pads to which a midboard connector may be connected.
Figure 14B:
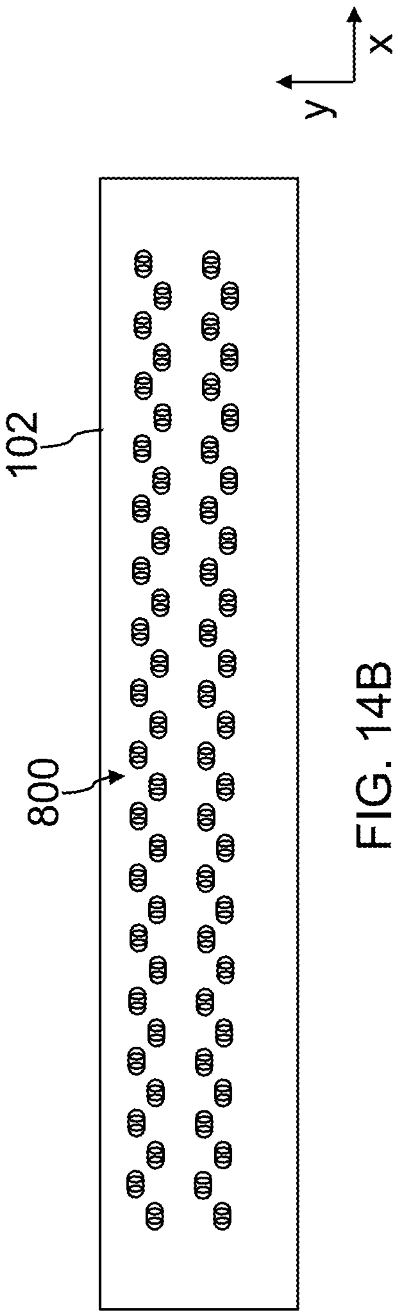
FIG. 14B is a bottom plan view of the substrate of FIG. 14A.

FIGS. 14A-14B are top and bottom plan views, respectively, of one embodiment of a PCB 102 (e.g., daughterboard, motherboard, orthogonal PCB, etc.) including a plurality of contact pads 800. Like the embodiment of FIG. 11, each of the contact pads includes two signal contact pads and a ground contact pad. The contact pads may be arranged in a dense array to allow a plurality of signals to be transmitted in high bandwidth through a plurality of cables. According to the embodiment of FIGS. 14A-14B, the PCB is arranged with 128 individual contact pads 800 between the top side and bottom side of the PCB.

As shown in FIG. 14A, the contact pads are arranged in two primary offset rows (in the y-direction), with each primary row having alternating offset contact pads in the y-direction (i.e., the contact pads in a primary row are arranged in first and second secondary rows). In each row, adjacent contacts are offset from one another by a distance D1 in the Y direction, and distance D2 in the x-direction.

According to the embodiment of FIGS. 14A-14B, the distance D1 may be between 0.5 mm and 1.5 mm, and the distance D2 may be between 1.5 mm and 2.5 mm. Each primary row may include 32 contact pads, and each primary row is offset from the adjacent primary rows by a distance D3, which in the embodiment of FIGS. 14A-14B may be between 3.5 mm and 5.5 mm. Of course, in some embodiments, the contact pads may not be arranged in secondary rows (i.e., D1 would be zero).

In some embodiments, a PCB may include 256 contact pads with an increase in contact pad density or an equivalent pad density. Of course, any suitable number of contact pads may be employed on any suitable PCB surface, as the present disclosure is not so limited. A corresponding connector assembly may have a contact tip quantity and density corresponding to the quantity and density of the contact pads. In embodiments in which each cable is terminated in an insert, the inserts may similarly be held within a housing or other support structure in a similar pattern of primary and secondary rows with offsets, at least at the engagement surfaces of the inserts, conforming to the pattern of primary and secondary rows of contacts shown in FIG. 14A or 14B.

Figure 15:
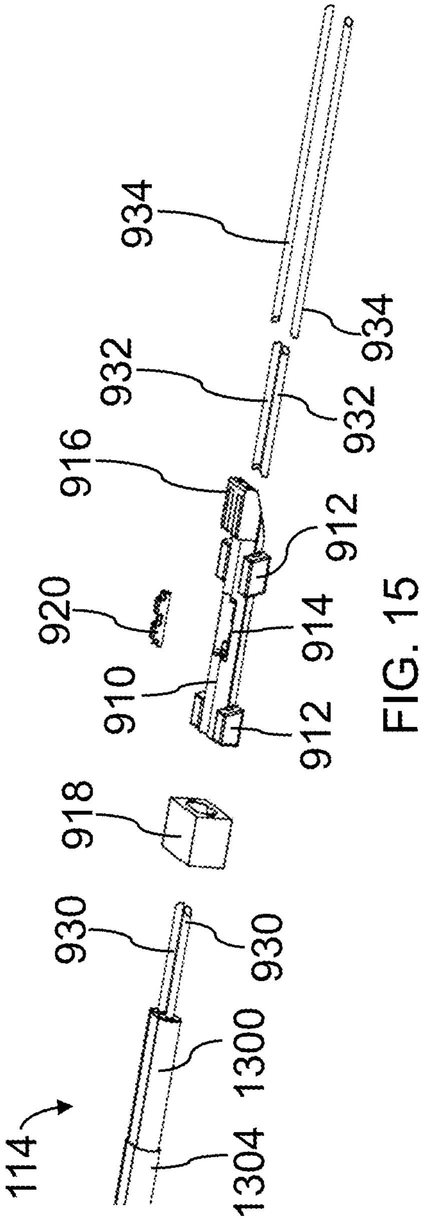
FIG. 15 is an exploded view of an exemplary embodiment of a connector module with a coupler, signal contact tips, and ground contact tips.

FIG. 15 is an exploded view of one embodiment of a coupler 920, signal contact tips 932, and ground contact tips 934 of a connector assembly. As shown in FIG. 15, the connector assembly includes an insert 910 which is configured to receive the signal contact tips 932 and ground contacts 934. The insert may be secured in a channel formed in a housing in a modular fashion. A suitable number of inserts may be employed in a variety of connector housings which have a desired number of channels for a given number of contact tips. For example, a housing may have 64 individual channels to support 64 individual inserts.

The inserts include ground contact tip holders 912 which include openings configured to receive and hold the ground contact tips 934. Ground contact tip holders 912 may be formed of insulative material, which may be the same material use to form other portions of insert 910. Alternatively or additionally, ground contact tip holders 912 may be formed of lossy material. The inserts also include an opening 914 configure to receive one or more couplers 920 which are used to electrically couple a cable conductor 930 to a signal contact tip 932. In this example, two such couplers fit within opening 914, and are electrically isolated from one another.

The assembly also includes a compliant conductive member which is configured to contact both the ground contact tips 934 and a conductive shield 1300 of a cable 114 to electrically couple the ground contact tips and shield. In this example, an end of the ground contact tips 934 fit between the shield 1300 and the compliant conductive member 918. Compression of the compliant conductive member 918 makes electrical connection to both ground contact tips 934 and shield 1300, thereby electrically connecting them.

Figure 16:
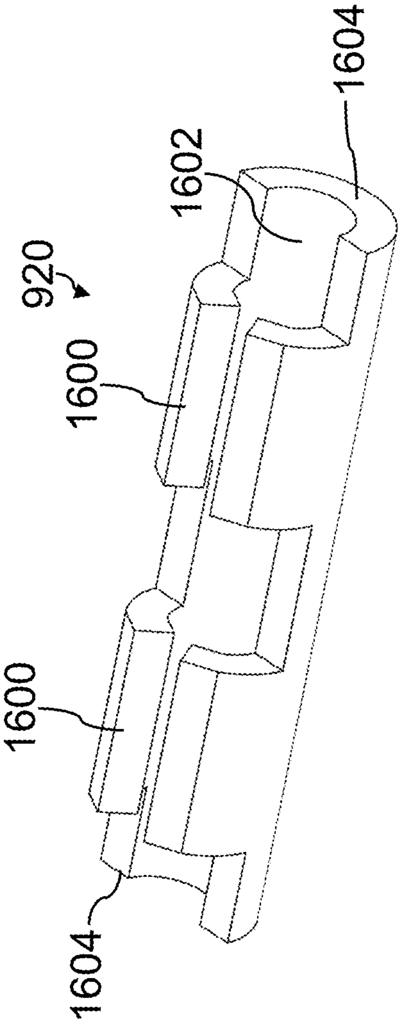
FIG. 16 is a perspective view of the coupler of FIG. 15.

FIG. 16 is a perspective view of the coupler 920 for use with the insert 910 of FIG. 15. Coupler 920 may be formed of metal such that it is conductive and can be deformed form crimping or may form an intermetallic bod with the cable conductors and or contact tips. According to the embodiment of FIG. 16, the coupler is configured to allow a cable conductor to be welded to a signal contact tip and cable conductor. The coupler includes arms 1600 which surround a majority of a received contact tip and/or cable conductor. The arms may function to stabilize and support the contact tip and cable conductor in the coupler before and after the contact tip and cable conductor are welded together. The arms also function as weld areas for the inserted contact tip and cable conductor. One set of arms may be spot welded (e.g., with a laser) to an inserted cable conductor and the other set of arms may be spot welded to an inserted contact tip. Once spot welded, the cable conductor and contact tip may be secured together, and electrically coupled through the coupler and/or any direct contact between the contact tip and cable conductor.

In some embodiments, the arms may also be crimped around the cable conductor and signal contact to secure the signal contact and cable conductor before welding or instead of using welding to attach those conductors to the coupler. As a further alternative, those conductors may alternatively or additionally be soldered to coupler 920. The coupler also includes a cupped channel 1602 which also support the contact tip and cable conductors along a length of the portions of the contact tip and cable conductor inserted into the coupler.

Coupler 920 is illustrated with an opening between arms 1600. A cable conductor and a contact tip inserted into channel 1602 may butt against one another in that opening. In some embodiments, a laser or energy from another source may be applied to the butt joint between the cable conductor and a contact tip, forming a weld between the cable conductor and contact tip instead of or in addition to a weld between cable conductor and contact tip and respective ones of the arms 1600. As a further alternative, cable conductor and contact tip may be inserted into channel 1602 with a fusible mass, such as a solder ball or solder paste, between them. Heat may be applied to solder the cable conductor to the contact tip.

The coupler also includes flat ends 1604 which may be used for anti-pistoning in an insert or other housing, as will be discussed further with reference to FIGS. 18-19.

Figure 17:
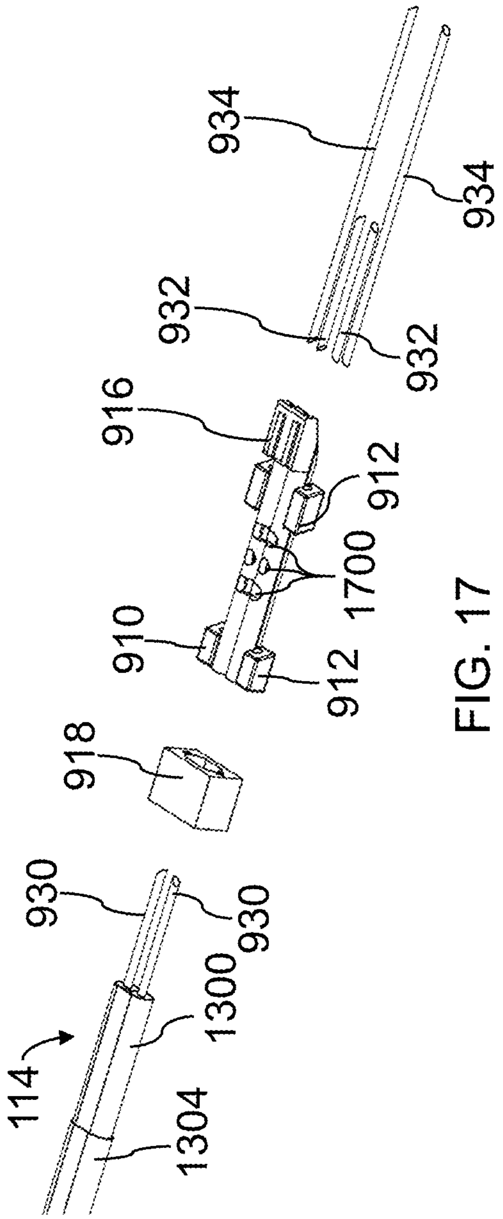
FIG. 17 is an exploded view of another embodiment of a connector module with a coupler, signal contact tips, and ground contact tips.

FIG. 17 is an exploded view of a connector module with another embodiment of a coupler 1700, signal contacts 932, and ground contact tips 934. The connector module of FIG. 17, similar to the embodiment of FIG. 15, includes an insert 910 which receives two signal conductors 930, signal contact tips 932 and ground contact tips 934. The ground contact tips are supported by ground contact holders 912 which are electrically coupled to a cable shield 1300 via a compliant conductive member 918. In contrast to the embodiment of FIG. 15, the coupler is formed with solder cups 1700 which are configured to receive solder or solder paste to electrically couple the contact tips to the respective cable conductor.

In some embodiments, surfaces of the insert 910 may be coated in a conductive material (e.g., metal), such as through a particle vapor deposition (PVD) process. The conductive surfaces may be connected to ground. As such, the coated surfaces may be the closest ground to the signal conductors, establishing the signal to ground spacing for those portions of the conductors within the insert, which in turn establishes the impedance of those portions of the conductors. Such an arrangement may allow the impedance of the portions of the conductors within the insert to match, such as within +/−5% or +/−10%, of the impedance within the cable, where the cable conductors are surrounded by a shield. The coating may be on an internal or external surface. Advantageously, the insert may be sized and shaped such that the surface coated with a conductor is at distance from the center of the conductors that varies based on other conductive structures attached to the conductors. For example, where there is solder or a coupler, increasing a mass of metal around the axis of the conductor, the plated surface may be spaced further from the center of the cable conductor to match an impedance of the cable conductor. A matched impedance may improve signal fidelity for high frequency signals.

While the embodiments of FIGS. 15 and 17 show contact tips and cable conductors which are electrically and physically coupled through welding or soldering, it should be appreciated that any suitable technique may be used alone or in combination to physically and electrically secure the contact tips and cable conductors together. For example, any of welding, soldering, and crimping may be used alone or in combination to secure a contact tip to a cable conductor in a cable conductor assembly.

Figure 18:
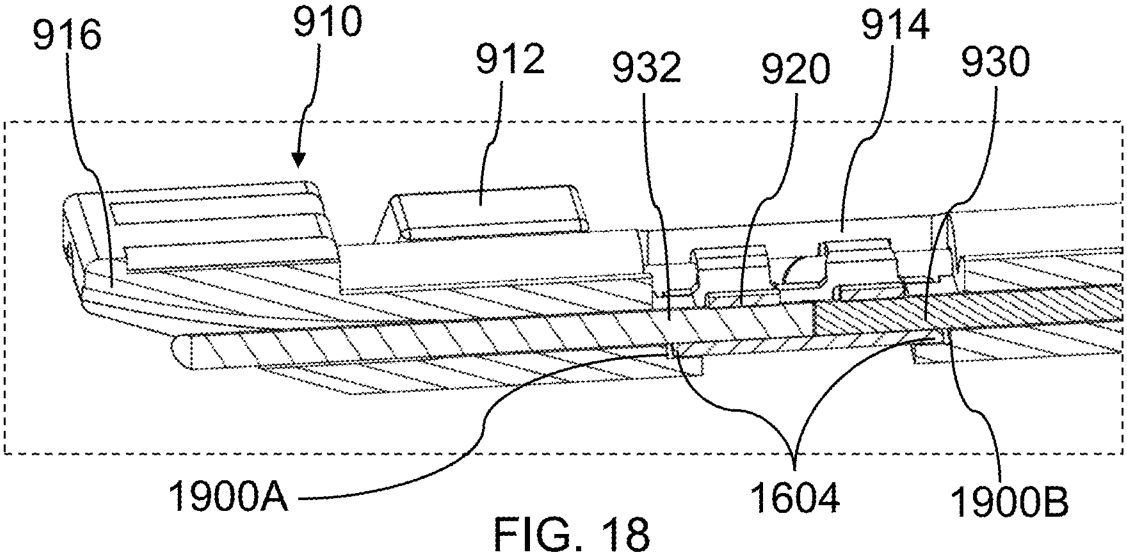
FIG. 18 is a cross-sectional view of the coupler, signal contact tips, and ground contact tips of FIG. 15.

FIG. 18 is a cross-sectional view of the coupler 920, signal contact tips 932, and ground contact tips 934 of FIG. 15. As shown in FIG. 18, the coupler is disposed in opening 914 which is formed in the insert 910. A signal contact tip 932 and a cable conductor are both disposed in the coupler 920 and are secured to the cable conductor via a spot weld. Accordingly, neither the contact tip nor the cable conductor may move relative to the coupler. As shown in FIG. 18, the coupler includes end 1604 which in this case are flat, but in other embodiments may have other shapes. The opening 914 is bounded at a first end by a first wall 1900A and at a second end by a second wall 1900B. The signal contact tip extends from the coupler 920 through the first wall 1900A and out a mating portion 916 of the insert. The cable conductor extends from the coupler 920 through the second wall 1900B toward the remainder of an associated cable.

The components may be sized and shaped to ensure that the amount of contact tip extending from the housing at the mating interface is not materially impacted by movement of the cable. Such a design may take advantage of the fact that the coupler does not fit through the holes formed in the first wall and second wall. Instead, the coupler ends 1604 contact the first wall 1900A and second wall 1900B to inhibit movement of the coupler relative to the insert 910. The insert may be disposed securely in a connector housing so that the insert does not move relative to the housing, the coupler may therefore not move relative to the housing. Correspondingly, the signal contact tip 932 and cable conductors 930 may also be inhibited from moving relative to both the insert 910 and an associated connector housing. Thus, each coupler and insert may cooperate to prevent movement of signal contact tips and cable conductors relative to a connector housing and/or insulators of an associated cable. Alternatively, the coupler may fit within the housing with such a small spacing on either end that any movement of the cable conductors and contact tips may be small, or the coupler may be positioned to block movement of the cable conductor in a direction away from the mating interface that a sufficient amount of the contact tip extends from the mating portion 916 to make a reliable and repeatable contact. It should be noted that in some embodiments the first wall and second wall may be formed directly in a connector housing and not an insert 910.

Figure 19:
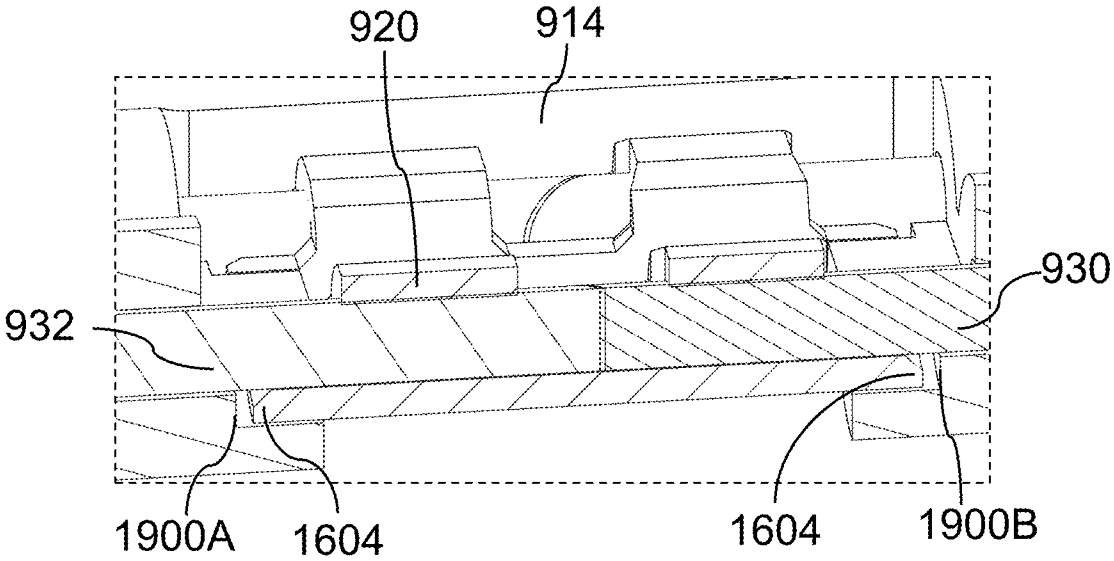
FIG. 19 is an enlarged cross-sectional view of the coupler, signal contact tips, and ground contact tips of FIG. 18.

FIG. 19 is an enlarged cross-sectional view of the coupler 920, signal contact tips 932, and ground contact tips 934 of FIG. 18 better showing the alignment of the coupler ends 1604 and first wall 1900A and second wall 1900B. As shown in FIG. 19, the first wall 1900A is adjacent an end 1604 of the coupler, and the second wall 1900B is adjacent the other end 1604 of the coupler. Accordingly, if the coupler is pulled along its longitudinal axis, one of the ends 1604 will contact either the first wall or second wall to inhibit the movement.

Figure 20:
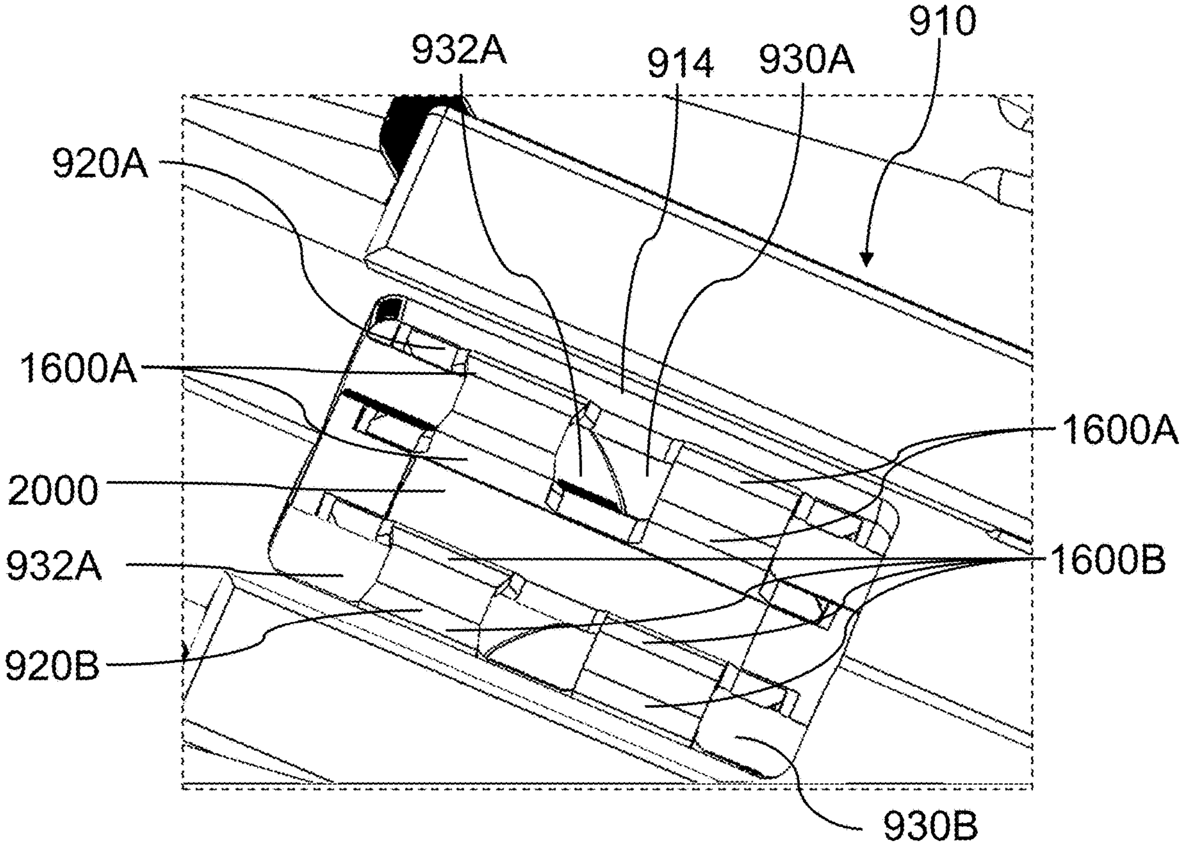
FIG. 20 is a top perspective view of the coupler, signal contact tips, and ground contact tips of FIG. 18.

FIG. 20 is a top perspective view of couplers, signal contact tips, and cable conductors of the embodiment of FIG. 15 demonstrating how the pair of couplers is disposed in the opening 914 formed in the insert 910. As shown in FIG. 20, a first coupler 920A is disposed adjacent to and parallel with a second coupler 920B. Each of the couplers includes a set of arms 1600A, 1600B which have been spot welded to a respective signal contact tip 932A, 932B or cable conductor 930A, 930B. The couplers are separated from one another by a dielectric separator 2000 formed in the insert.

Figure 21:
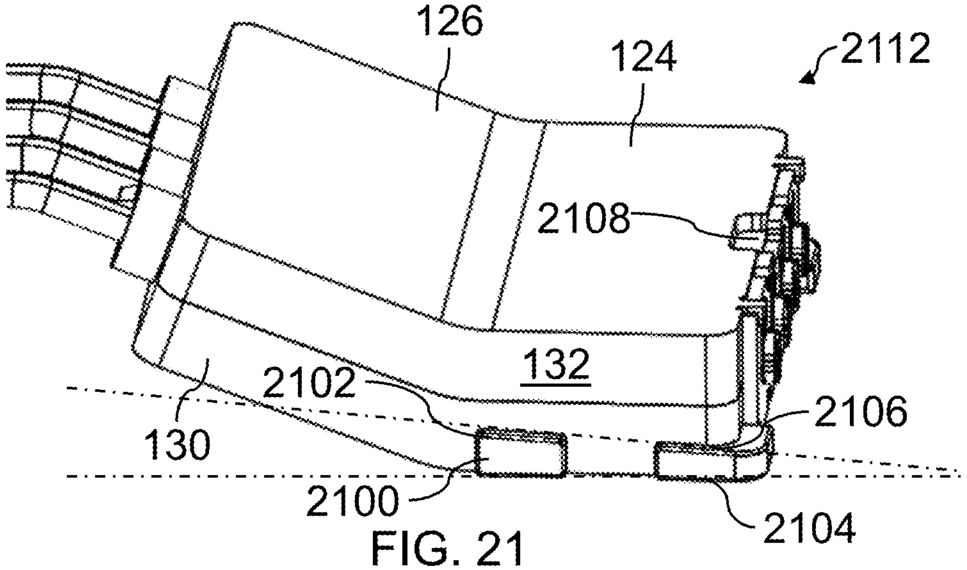
FIG. 21 is a perspective view of another embodiment of a connector assembly.

FIG. 21 is a perspective view of another embodiment of a connector assembly 2112. In the embodiment of FIG. 21, a force on connector assembly 2112, forcing the contact tips against a footprint on a substrate, is generated through a camming mechanism formed by surfaces on the connector assembly that press against surfaces on a component mounted to the substrate. In the illustrated embodiment surfaces extending from a side of the connector assembly 2112 engage surfaces on a receptacle mounted to the substrate and into which the connector is inserted for mating.

As shown in FIG. 21, the connector assembly includes a first housing section 124 and second housing section 126 which is angled relative to the first housing section. The housing is formed by a lower piece 130 and an upper piece 132 which combine to form the connector housing. In other embodiments, the housing may be unitary. In some embodiments, the connector housing may be integrally formed with a plurality of inserts, while in other embodiments the connector housing may receive and retain separately formed inserts. According to the embodiment shown in FIG. 21, the lower piece of the housing includes a first projection 2100 having a first engagement surface 2102 and a second projection 2104 having a second engagement surface 2106. On the upper piece 132 the connector housing includes a recess 2018. The engagement surfaces, of which two such surfaces 2102 and 2106 are shown, are angled with respect to the mating face of the connector. Those surfaces angle downwards towards the front of the connector, which is the direction opposite from which cables extend from the connector. As will be discussed further below, the first engagement surface, second engagement surface, and recess cooperate with a connector receptacle to releasably secure the connector to a PCB or other substrate so that the contact tips of the connector may be electrically coupled with contact pads of the PCB.

Figure 22:
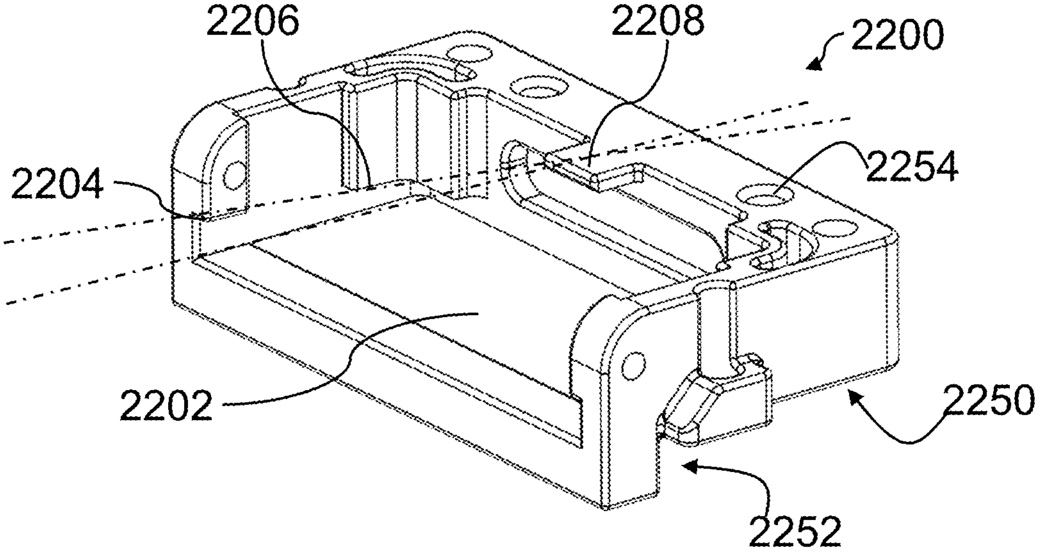
FIG. 22 is a perspective view of an exemplary embodiment of a connector receptacle.

FIG. 22 is a perspective view of an embodiment of a connector receptacle 2200 which may be mounted on a PCB such as a motherboard or daughterboard. The connector receptacle has a cavity with a shape generally corresponding to a shape of the first housing section of the connector assembly of FIG. 21.

The connector receptacle includes a mounting face 2250, which is designed to be mounted against a surface of a substrate, such as a PCB. An edge 2252 of the receptacle extends perpendicularly from the mounting face 2250 and may press against an edge of the substrate, positioning the receptacle with respect to the edge. The receptacle may be fastened to the substrate. In this embodiment, the receptacle includes holes, 2254, through which fasteners, such as screws, may be inserted to secure the receptacle to the substrate.

In the embodiment of FIG. 22, the mounting face 2250 has an opening 2202, through which a portion of the substrate may be exposed. The receptacle may be configured such that the connector footprint on the substrate, such as is shown in FIG. 14A or 14B, may be exposed through opening 2202. The receptacle may be shaped and mounted to the substrate such that, when the connector assembly 2112 is fully inserted into and engaged with the receptacle, the contact tips on the mating surface of the connector press against the pads of the connector footprint exposed through opening 2202. In this configuration, the signal and ground contact tips of a connector assembly are electrically coupled to the contact pads when the connector receptacle receives the connector assembly.

The connector receptacle includes features that generate a force on the connector assembly 2112 inserted into the receptacle. That force urges the connector assembly towards the substrate such that the contact tips extending through the mating surface are deflected, generating a contact force. In this embodiment, the connector receptacle includes a receptacle surface 2204 and a receptacle surface 2206 configured to engage the first engagement surface and second engagement surface of the connector housing. As the connector housing is slid into the connector receptacle, force on the connector housing in a direction parallel to the substrate is converted into a downward force to urge the connector housing toward the substrate.

The mechanisms that generate mating force may be positioned in multiple locations to provide consistent locations along the mating interface. In the embodiment illustrated in FIGS. 21 and 22, the connector receptacle includes a tab 2208 configured to engage the recess 2018 of the connector housing. This tab may be positioned in the central part of the mating portion. Tab 2208 and/or recess 2018 may have tapered surfaces to generate a force on the connector housing in a direction towards the substrate, similar to the force generated by the engagement surfaces of the sides of the connector. In some embodiments, tab 2208 alternatively or additionally may have a hook or other latching feature that engages with complementary surfaces within recess 2018.

Figure 23:
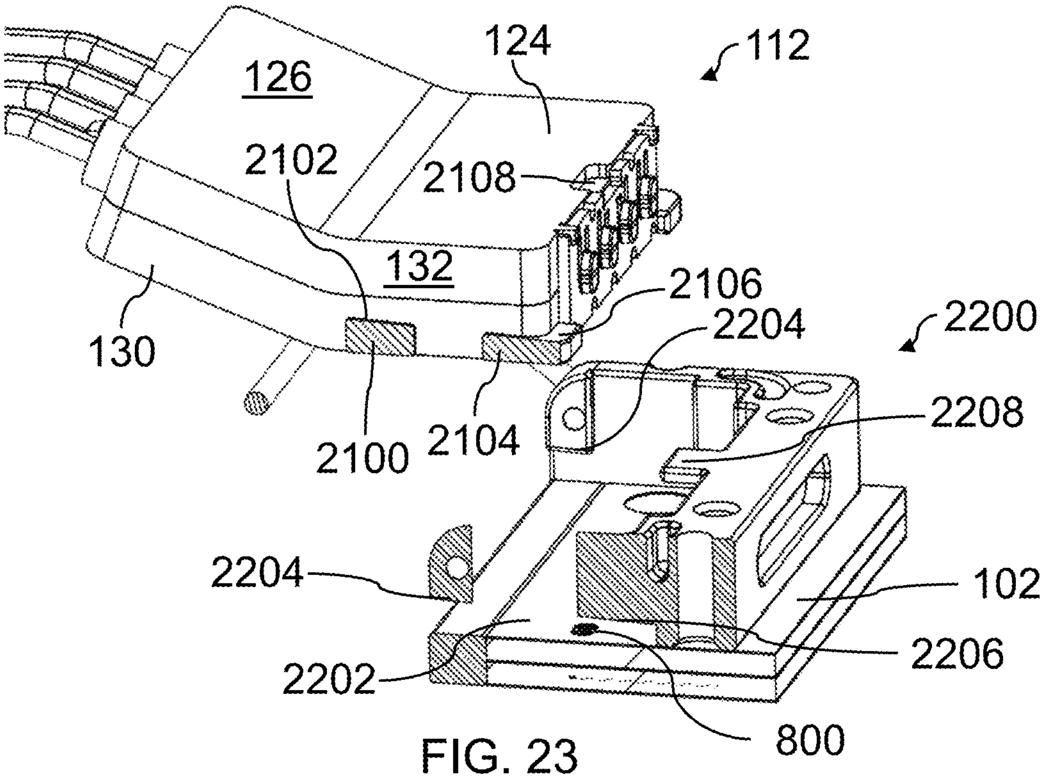
FIG. 23 is a cross-sectional view of the connector of FIG. 21 and the connector receptacle of FIG. 22 in an uncoupled state.
Figure 24:
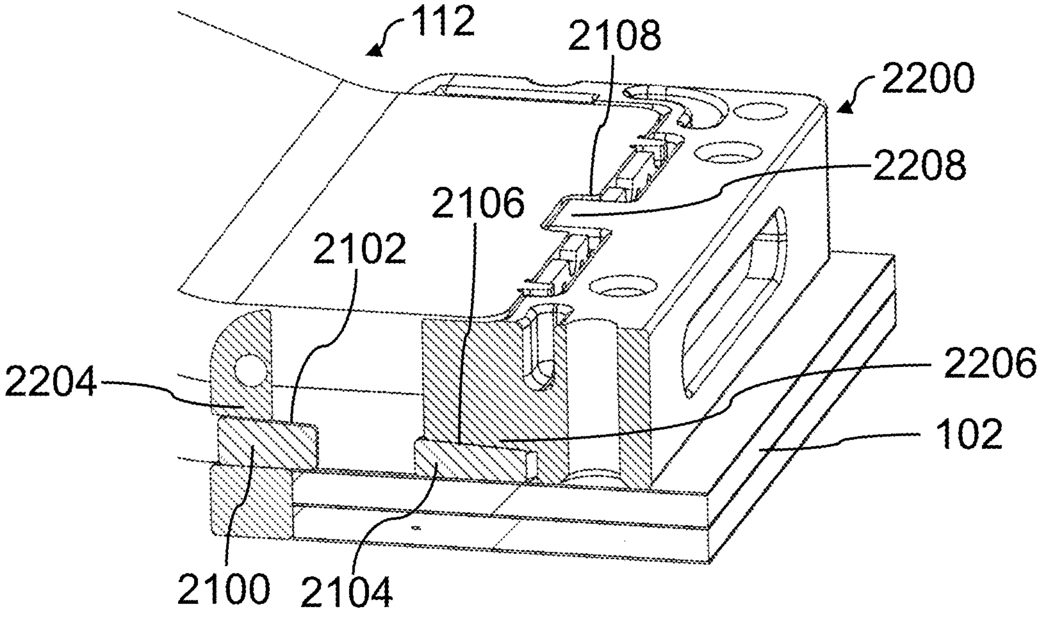
FIG. 24 is a cross-sectional view of the connector assembly of FIG. 21 and the connector receptacle of FIG. 22 in an coupled state.

FIG. 23 is a cross-sectional view of the connector assembly 112 of FIG. 21 and the connector receptacle 2200 of FIG. 22, as mounted to a PCB 102. In FIG. 23, the connector and receptacle are shown in an uncoupled state. FIG. 24 shows the connector inserted in the receptacle, better showing the engagement between the various surfaces of the connector housing and connector receptacle. As discussed previously, the connector assembly includes a first engagement surface 2102 formed on a first projection 2100, a second engagement surface 2106 formed on a second projection 2104, and a recess formed in an upper piece 132 of the connector housing. As shown in FIG. 23, the first engagement surface and second engagement surface are angled relative to a surface of the PCB at a consistent angle from the first section 124 of the housing towards the second section 126 of the housing. According to the embodiment of FIG. 23, the first receptacle surface 2204 and second receptacle surface 2206 are angled at an equivalent angle relative to a surface of the PCB 102. Accordingly, when the connector housing is received in the connector receptacle, the first engagement surface 2102 will engage the first receptacle surface 2204 and the second engagement surface 2104 will engage the second receptacle surface 2206 so that when the connector housing is slid into the connector receptacle the connector housing is forced closer to the contact surface 2202 of the PCB 102. This camming action between the inclined planes formed by the surfaces of the connector assembly and connector receptacle generates a mating force between associated contact tips and contact pads 800 disposed on the contact surface. As a result, application of a first force on the connector housing which moves the connector housing into the connector receptacle will be partially converted into a second force in a direction perpendicular to the direction of the first force which forces the connector housing toward the contact surface. The connector engagement surfaces and connector receptacle surfaces may be disposed on both sides of the connector housing and connector receptacle, as shown in FIG. 23.

Mating connector assembly 112 to contact pads on a surface of a board with a motion parallel to the surface of the printed circuit board enables the connector to be mated without open space above the mounting location. Such a configuration may enable a more compact electronic system. Additionally, it may enable more reliable mating. According to the embodiment of FIG. 23, the connector assembly 112 and connector receptacle 2200 are arranged so that associated signal and ground contact tips are wiped over the contact pads 800 as the connector assembly is moved parallel to the surface of the printed circuit board 102 into engagement with the connector receptacle. As lower piece 130 of the connector housing is slid across opening 2202 and the engagement surfaces and receptacle surfaces engage one another, the signal and ground contact tips may wipe the contact pads 800 as they become electrically coupled. Such an arrangement may be beneficial to remove oxidization layers or other buildup on the contact tip and/or contact pad to ensure a good electrical connection.

In some embodiments, the first 2102 and second 2106 engagement surfaces may be angled relative to the PCB 102 at an angle greater than 0 degrees and less than 90 degrees relative to the mating surface of the connector. In one embodiment, the engagement surfaces may be angled between 2 and 10 degrees relative to the mating surface of the connector. The connector receptacle surfaces may have angles corresponding to those of the engagement surfaces of the connector housing. The angles of the receptacle surfaces may be measured with respect to the mounting face of the receptacle and/or the PCB to which the receptacle is mounted. Alternatively, in some embodiments, the connector receptacle may have connector receptacle surfaces which are angled at different angles than the engagement surfaces of the connector housing, or which are not angled at all. In other embodiments, the connector receptacle surfaces may be angled relative to the PCB while the connector engagement surfaces are not inclined or have a different inclination relative to the PCB. In some embodiments, a connector housing may include a single continuous engagement surface or any suitable number of distinct engagement surfaces. Likewise, in some embodiments, a connector receptacle may include any suitable number of distinct receptacle surfaces. In some embodiments, each distinct connector engagement surface and/or receptacle surface may be inclined at the same or a different angle with respect to the PCB 102.

FIG. 24 is a cross-sectional view of the connector assembly 112 of FIG. 21 and the connector receptacle 2200 of FIG. 22 in a coupled state. As shown in FIG. 24, the first engagement surface 2102 of the connector assembly is engaged with the first receptacle surface 2204, so that the connector assembly is pressed against the PCB. Likewise, the second engagement surface 2106 is engaged with the second receptacle surface 2206 to further secure the connector against the PCB 102. Finally, the tab 2208 is engaged with recess 2018 to preclude bowing of a central portion of the connector assembly and/or generate downward force on the central portion of the connector assembly. Thus, in the illustrated embodiment, the connector assembly engages the connector receptacle with five distinct regions of contact, providing a consistent mating force across the elongated mating interface of the connector.

To remove the connector assembly from the connector receptacle, the connector assembly may be slid out of the connector receptacle in a direction parallel to the plane formed by the PCB 102. Movement in any other directions is restricted by the various engagement surfaces. As will be discussed with reference to FIGS. 27-28, the connector assembly may be selectively prevented from being slid out with a spring latch.

While the embodiments of FIG. 21-24 are shown with a connector housing having projections and a connector receptacle having a corresponding shape to receive the projections, it should be understood that any suitable arrangement of engagement surfaces be employed. In some embodiments, for example, engagement surfaces on the receptacle may be formed on projections and engagement surfaces may be within channels that are recessed in the housing. Any suitable combination of recessed and projecting portions may be employed on either the connector housing and connector receptacle, as the present disclosure is not so limited.

Figure 25:
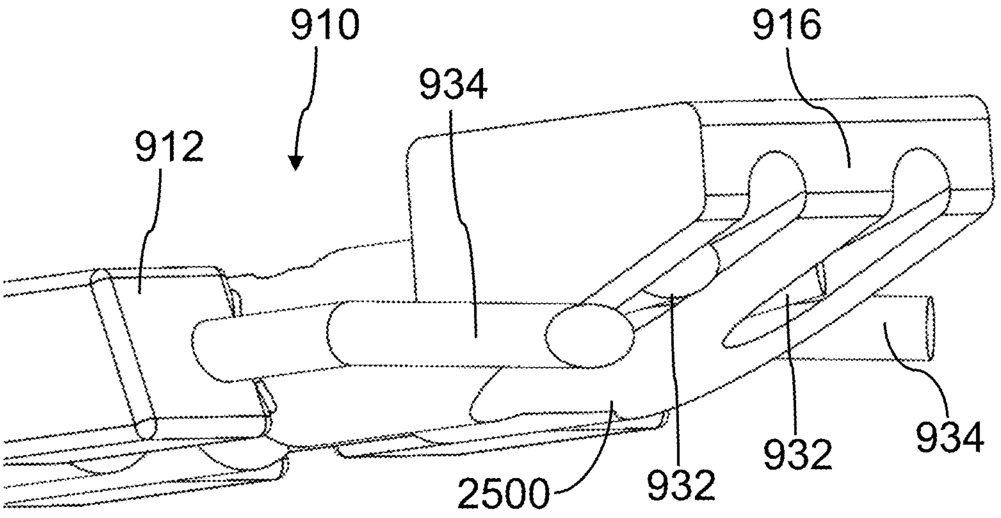
FIG. 25 is an enlarged perspective view of one embodiment of a mating interface of a connector module.

FIG. 25 is an enlarged perspective view of the mating portions of an embodiment of an insert 910 for use with the connector assembly of FIGS. 23-24. As shown in FIG. 25, the insert is like those of FIG. 15 or 17, and houses two signal contact tips 932 and two ground contact tips 934. Both the signal contact tips and ground contact tips extend beyond an insert mating surface 2500. Insert 910 may be held within a connector assembly such that mating surface 2500 is parallel to receptacle surface of a substrate when the connector assembly is mated to the substrate. In the example of FIG. 23, for example, mating surface 2500 will be parallel with the lower surface of portion 132. In the embodiment of FIG. 25, the ground contact tips project further from mating surface 2500 than the signal contact tips, so that the ground contact tips are electrically coupled to a ground contact pad before the signal contact tips are electrically coupled to signal contact pads.

Figure 26:
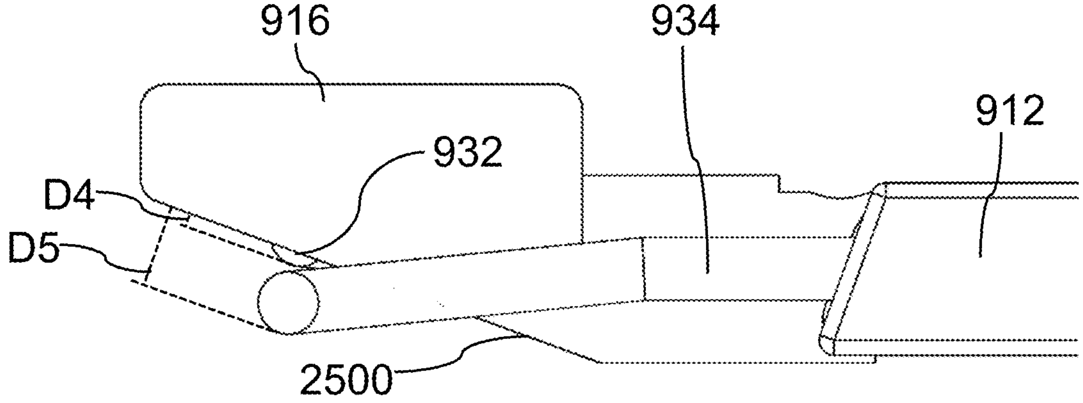
FIG. 26 is an enlarged side view of the mating interface of FIG. 25.

FIG. 26 is an enlarged side view of the insert of FIG. 25 showing the disparity in the projection of the signal contact tips 932 and ground contact tips 934. When measured in a direction perpendicular to the insert mating surface 2500, the signal contact tips project a distance D4, which is less than a distance D5 by which the ground signal contacts project. D4 and D5 may be any appropriate value to achieve suitable tip deflection and contact force. As a specific example, the contact tips may extend by a distance in the range from 0.04 mm to 0.15 mm. For contact tips formed of material as represented by FIG. 12B, an extension in this range is such that, when the mating surface is pressed against a substrate, the tips deflect an amount that places the contacts in the superelastic regime. In some embodiments, the connector may be designed for a deflection near the center of this range, such as between 0.05 and 0.1 mm, such that, consistent contact force is generated even with manufacturing tolerances. Such positioning ensures repeatable and reliable mating for both signal and ground contact tips. Of course, in other embodiments, the signal contact tips and ground contact tips may project the same distance from the insert engagement surface (or another surface of a connector housing), as the present disclosure is not so limited.

Figure 27:
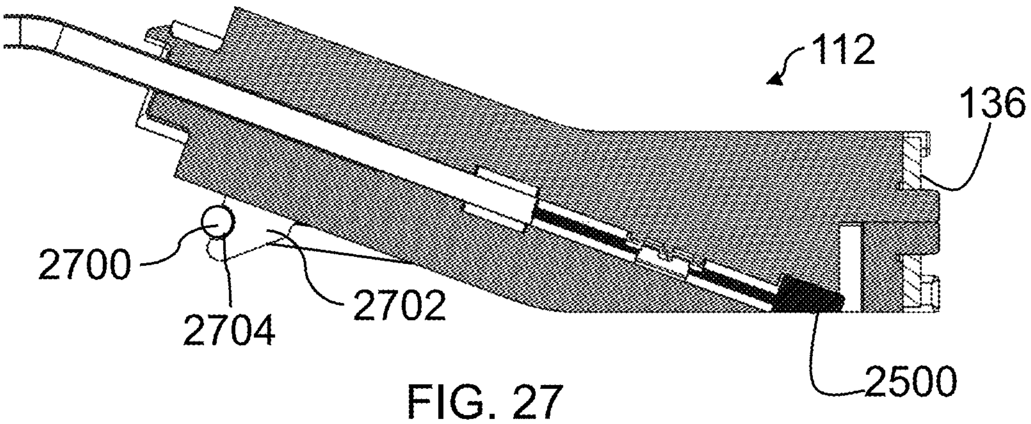
FIG. 27 is a cross-sectional view of an exemplary embodiment of a connector assembly held in a connector receptacle with a spring latch.
Figure 28:
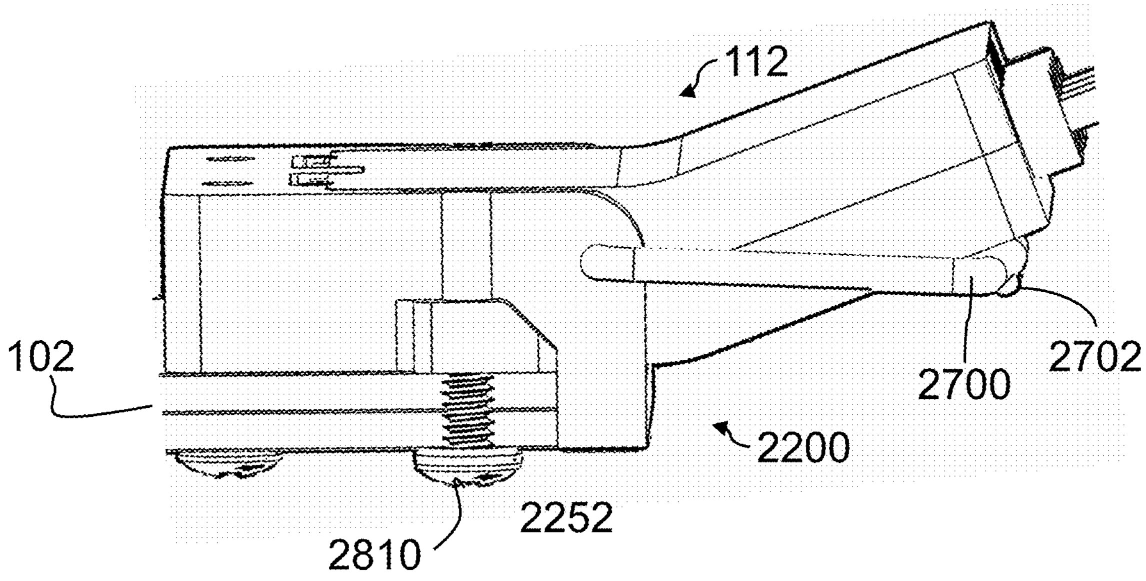
FIG. 28 is a side view of the connector assembly and spring latch of FIG. 27.

In some embodiments, the connector assembly and/or mounting components, such as receptacle 2200, may include latching components that hold connector assembly 2112 in a position in which it is pressed against the substrate. For example, latching components may be used to hold the connector assembly in the a position in the receptacle in which the connector aligns with contact pads exposed in opening 2202 and the engagement surface so f the connector assembly and receptacle are engaged such that he mating face of the connector is pressed against the substrate. FIGS. 27-28 are cross sectional and side views, respectively, of one embodiment of a connector assembly 2112 and spring latch 2700 configured to selectively prevent sliding of the connector assembly out of a connector receptacle as well as to generate a force on connector assembly 2112 urging it into a mating position within receptacle 2200. The spring latch 2700 is configured as a biased arm which is connected to the connector receptacle, and is configure to rotate into or out of engagement with the connector assembly. In particular, the spring latch is configured to rotate into a spring latch receptacle 2704 formed on a spring latch tab 2702 on a lower surface of a connector housing. When the spring latch is disposed in the recess, the connector assembly will be prevented from sliding out of the connector receptacle. To uncouple the connector assembly, the arm may be rotated out of the spring latch receptacle so that the connector assembly may be slid out of the connector receptacle. While a spring latch is shown in FIGS. 27-28, other releasable latching arrangement alternatively or additionally may be employed, as the present disclosure is not so limited.

FIG. 28 is partially cut away to show mounting hardware holding receptacle 2200 to a substrate, here a printed circuit board 102. In this example, the receptacle is mounted with screws 2810 that pass through PCB 102 and engage holes in receptacle 2200. Receptacle 2200 may be positioned with respect to a footprint on the surface of PCB 102 by those screws, which may pass through holes drilled through PCB 102 at positions oriented with respect to the footprint such that the footprint is positioned in opening 2202 for proper mating of connector assembly 2112 when inserted in the receptacle. Alternatively or additionally, the receptacle may be positioned with respect to the footprint with other features, such as edge 2252, which positions receptacle 2200 with respect to an edge of PCB 102. The connector footprint may be positioned with respect to the same edge such that receptacle 2200 is aligned with respect to the footprint.

Figure 29:
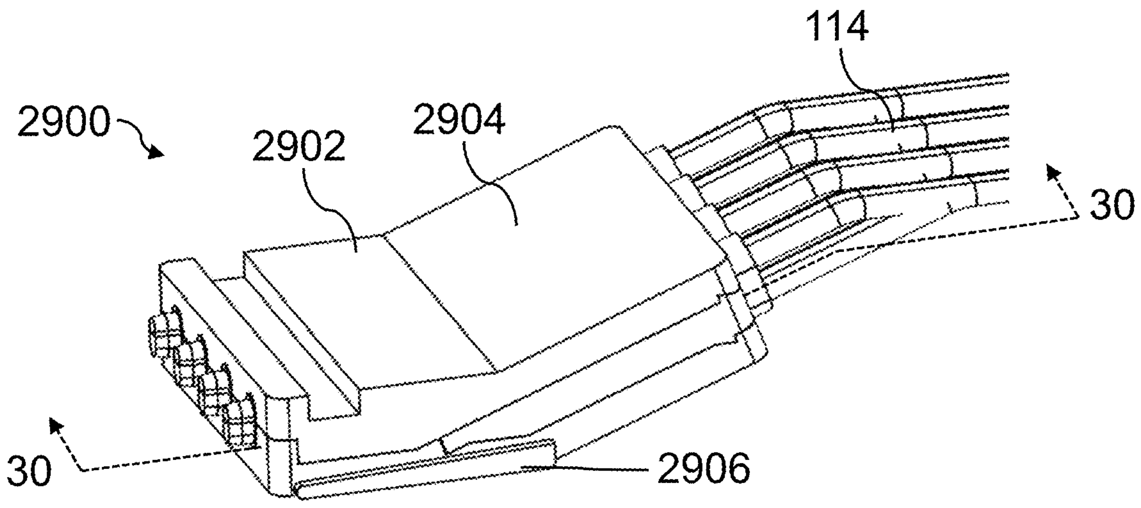
FIG. 29 is a perspective view of an exemplary embodiment of a connector assembly with multiple rows of contact tips.

A connector assembly as described herein may have different numbers and arrangements of contact tips than expressly pictured. The contact tips, for example, may be in multiple rows. FIG. 29 is a perspective view of another embodiment of a connector assembly 2900 including two rows of contact tips. As shown in FIG. 29, the connector assembly includes a first housing section 2902 and a second housing section 2904 angled relative to the first housing section. The connector assembly also includes an inclined engagement surface configured to move the connector assembly closer to a PCB as the connector assembly is moved into a connector receptacle. As shown in FIG. 29, a plurality of cables enter the second section 2904 of the connector housing in two offset rows.

Figure 30:
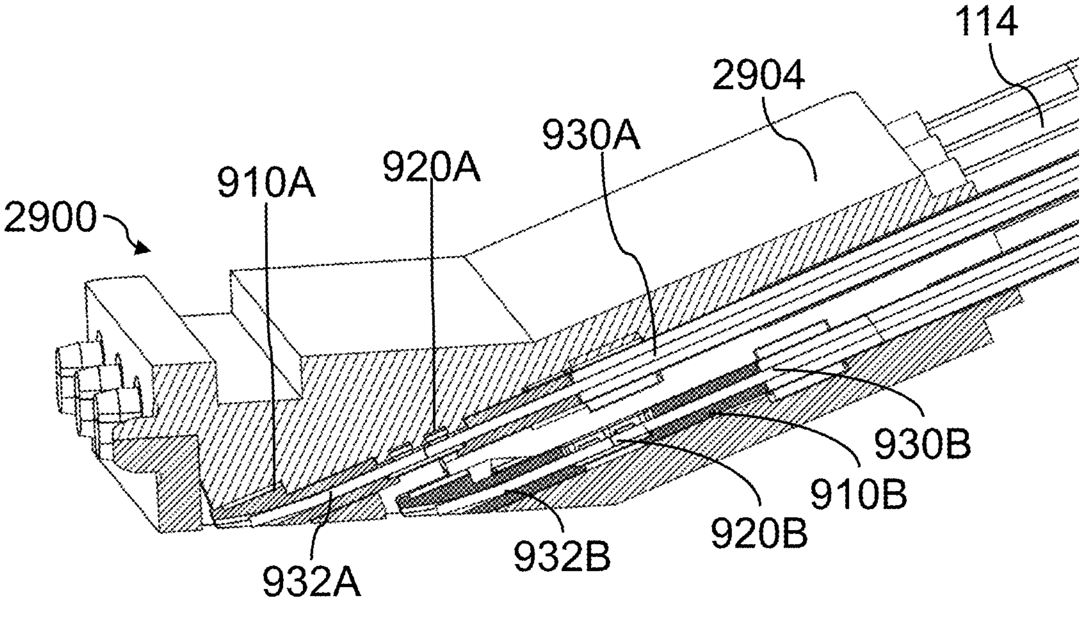
FIG. 30 is a cross-sectional view of the connector assembly of FIG. 29 taken along line 30-30.

FIG. 30 is a cross-sectional view of the connector of FIG. 29 taken along line 30-30. As shown in FIG. 30, the connector assembly 2900 includes two rows of inserts and associated couplers, cable conductors, and contact tips. In a first row, a first insert 910A is disposed in the connector housing and holds a first coupler 920A. The first coupler 920A in turn receives a first cable conductor 930A and a first signal contact tip 932A and electrically and physically couples them together. Likewise, in a second row a second insert 910B holds a second coupler 920B which electrically and physically couples a second cable conductor 930B and a second signal contact tip 932B. As the second section of the housing is inclined, the first row and second row are disposed in the connector at an equivalent incline. This allows the first row and second row to be stacked on top of one another. Multiple rows may be beneficial for increasing the number and/or density of contact tips on a contact surface along an edge of a PCB or other substrate.

Figure 31:
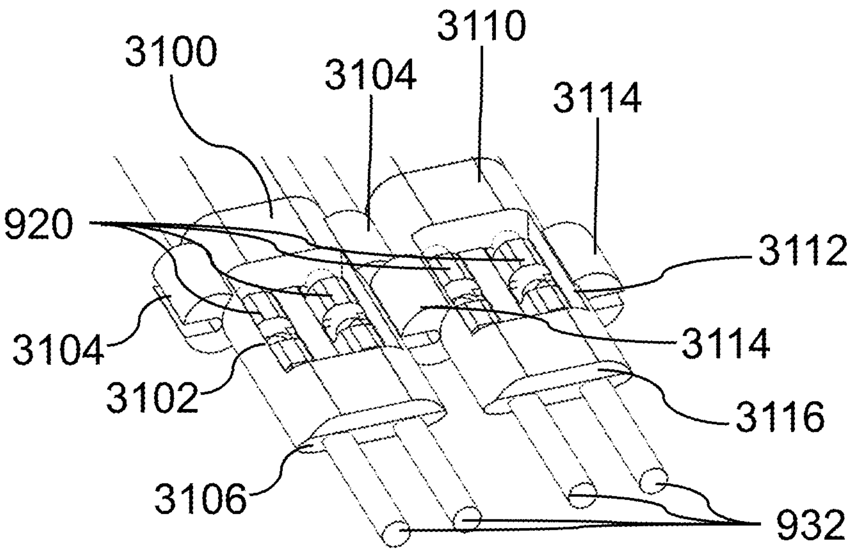
FIG. 31 is a perspective view of an exemplary embodiment of a portion of a connector formed of housing modules.

FIG. 31 is a perspective view of an embodiment of interlocking housing modules 3100, 3110 for use in a connector assembly. As noted previously, connector assemblies of exemplary embodiments herein may be modular in that a connector may be assembled from multiple inserts, serving as hosing modules, to provide a certain number of signal and ground contact tips to electrically couple an electronic device and a plurality of cables. Each housing module, for example, may terminate a cable, coupling a contact tip to each signal conductor within the cable. In some embodiments, those inserts may be secured together, by inserting them in openings in an outer housing. In some embodiments, modules in other configurations may be used and/or modules may be positioned and held together with other support structures.

According to the embodiment of FIG. 31, interlocking housing modules may be linked together into a unit, which is then secured to a support structure, such as by insertion into an outer housing. The outer housing need not have separate cavities to receive inserts and therefore may omit divider walls that might be used in other embodiments to position separate inserts. Such an assembly technique may reduce the separation between modules, further increasing the density of contacts of a connector assembly. FIG. 31 shows two such modules, but any number of housing modules may be held together in a row. The first housing module 3100 includes an opening 3102 configured to receive two couplers 920 and associated signal contact tips 932 and cable conductors. The contact tips extend through a surface 3106 a sufficient distance that they can deflect and provide a contact force when included within a connector that is mated to a substrate. The first housing module also includes ground contact tip holders 3104 with openings configured to receive and support ground contact tips, similarly positioned to make contact to a substrate.

Like the first housing module, the second housing module 3110 also includes an opening 3112, ground contact tip holders 3114, and a module surface 3116. However, the ground contact tip holders 3114 are offset from the ground contact tip holders 3104 of the first module, so that the housing modules may interlock while the housing module surfaces 3106, 3116 are aligned in the same plane.

Figure 32:
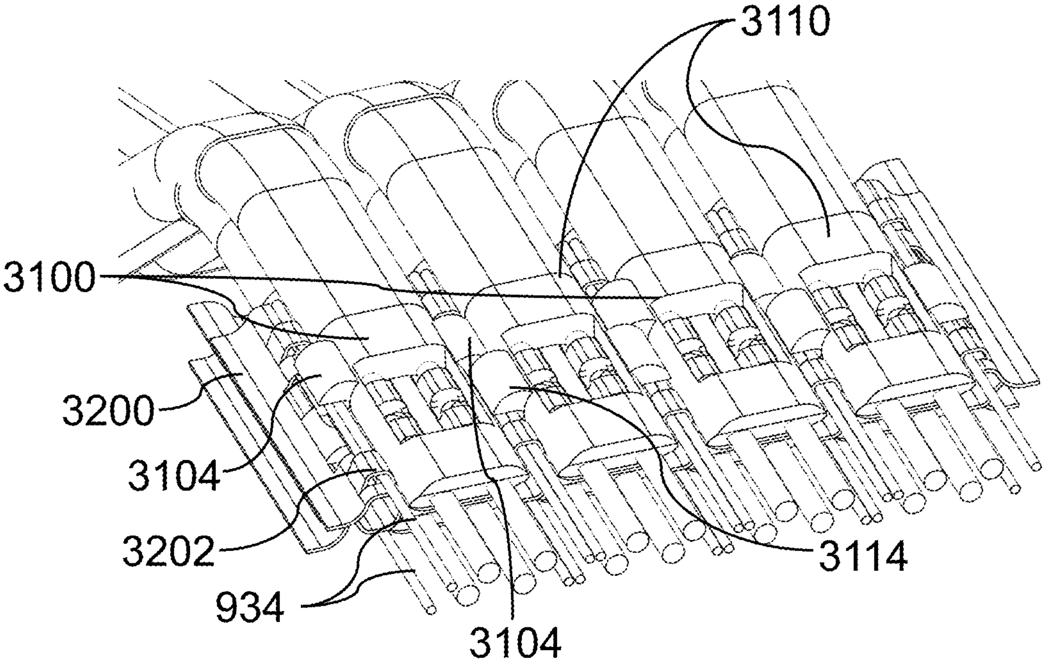
FIG. 32 is a perspective view of an exemplary embodiment of a portion of a connector formed with two rows of housing modules of FIG. 31.

FIG. 32 is a perspective view of one embodiment of a connector assembly including the housing modules 3100, 3110 of FIG. 31 with an outer housing removed. As shown in FIG. 32, the interlocking housing modules are arranged in two rows of four, but this number of rows and modules is for simplicity of illustration only. A connector assembly, for example, may include 64 pairs of signal contacts in a row and may have more or fewer than two rows.

The first housing modules 3100 are alternated with the second housing modules 3110 so that a row of housing modules is formed, with a total of eight signal contact tips in each row. As shown in FIG. 32, ground contact tips 934 are held in the ground contact holders 3104, 3114. According to the embodiment of FIG. 31, the ground contact holders are configured to attach to the ground contact tips associated with the respective housing module and the adjacent housing modules. The housing modules may be interlocked and secured to one another via adjacent ground contact tips. The adjacent ground contact tips may be in electrical communication, and held together in a bundle by the first ground contact tip holders 3104 and second ground contact tip holders 3114. In the illustrated embodiment, the ground contact tips are smaller diameter than the signal contact tips. In an embodiment as illustrated, in which two ground contact tips are bundled, the diameter may be selected such that a bundle provides the same contact force as a signal contact tip, or other suitable contact force. In other embodiments, the interlocking housing modules may be secured directly to one another instead of indirectly through the contact tips, as the present disclosure is not so limited.

One or more structures may be used to couple the ground contact tips to shields of the cables. Those structures may also provide shielding and/or impedance control for the signal conductors within each of the modules. For example, conductive sheets, such as might be stamped from metal, may be used for this purpose. In other embodiments, compliant conductive material and/or lossy material, as elsewhere described herein, may be used to connect ground structures.

As shown in FIG. 32, the connector assembly includes a bottom metal sheet 3200 which supports the interlocking housing modules 3100, 3110 in a first row and electrically connects each of the ground contact tips 934 to the other ground contact tips. The metal sheet includes sheet ground contact tip holders 3202 which also receive the ground contact tips in addition to the ground contact tip holders of the housing modules. Ground contact tip holders 3202 are shown formed by tamping a tab from the metal sheet that is pressed upwards to leave an opening between the tab and the body of the metal sheet into which the contact tips may be inserted. The tab may then be pressed against the contact tips, clamping them in place. Other types of connection alternatively or additionally may be used in some embodiments. Contact tips, for example, may be soldered or otherwise attached to a tab extending from the metal plate, or to another part of the plate.

In some embodiments, the metal sheet may also electrically couple the ground contact tips to a shield of each of the associated cables.

In the illustrated embodiment, the interlocking housing modules are secured to the metal sheet indirectly via the ground contact tips. In other embodiments the housing modules may be directly secured to the metal sheet or held in engagement with the metal sheet by an external housing of the connector assembly.

Figure 33:
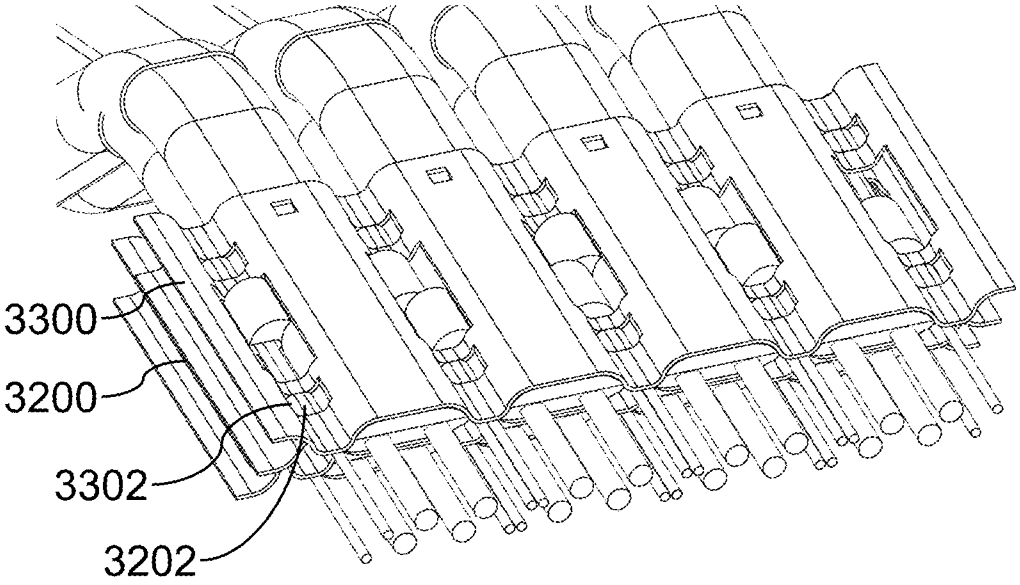
FIG. 33 is a perspective view of the portion of the connector of FIG. 32 including a top metal sheet.

FIG. 32 illustrates a row of modules with a lower metal sheet. In some embodiments, a row of modules may be placed between two metal sheets. FIG. 33 is a perspective view of the connector assembly of FIG. 32 including a top metal sheet 3300 in addition to a bottom metal sheet. As shown in FIG. 33, the stop metal sheet is fit over a completed row of interlocking housing modules, so that each row of housing modules is surrounded and/or held together by a metal sheet. The top metal sheet has a complementary shape to that of the bottom metal sheet 3200. Holes 3302 may be formed in the top metal sheet such that the ground contact tip holders 3202 from the bottom sheet may pass through the upper sheet. The ground contact tips inserted in the ground contact tip holders 3202 may lock the top sheet to the bottom sheet.

Figure 34:
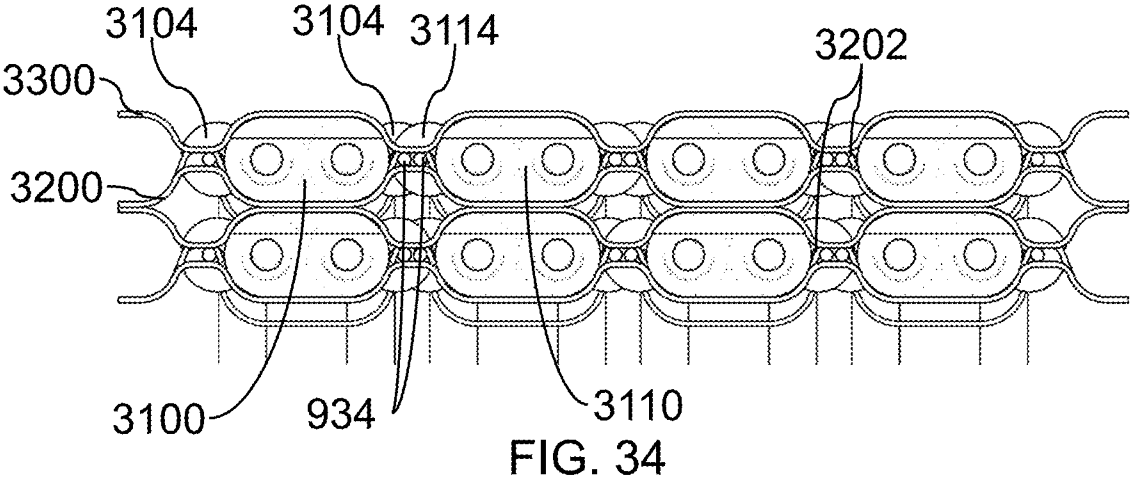
FIG. 34 is an elevation view of the connector assembly of FIG. 33.

FIG. 34 is an elevation view of the connector assembly of FIG. 33 showing how the modular array of interlocking housing connectors interlock. As shown in FIG. 34, the first housing module 3100 and second housing module 3110 are interlocked at first ground contact tip holder 3104 and second ground contact tip holder 3114. The ground contact tips are disposed adjacent to one another in the interlocking contact tip holders 3104, 3114. Each row of housing modules is surrounded by a top metal sheet 3300 and a bottom metal sheet 3200. The bottom metal sheet includes sheet ground contact tip holders 3202, which interlock with the top metal sheet. Each layer of a connector assembly may be built up in such a manner until a connector assembly with a desired number of rows is formed.

Each row may have a desired number of connector modules. FIG. 24 shows four modules per row, but the row may be extended with additional modules and a metal sheet elongated in the row direction to surround any additional modules. FIG. 34 does not show the end of the row. The top and bottom metal sheets may be welded or soldered, adhered or otherwise secured to each other at the ends of the row. Likewise, the metal sheets may be secured to each other and/or the ground conductors between modules.

Figure 35:
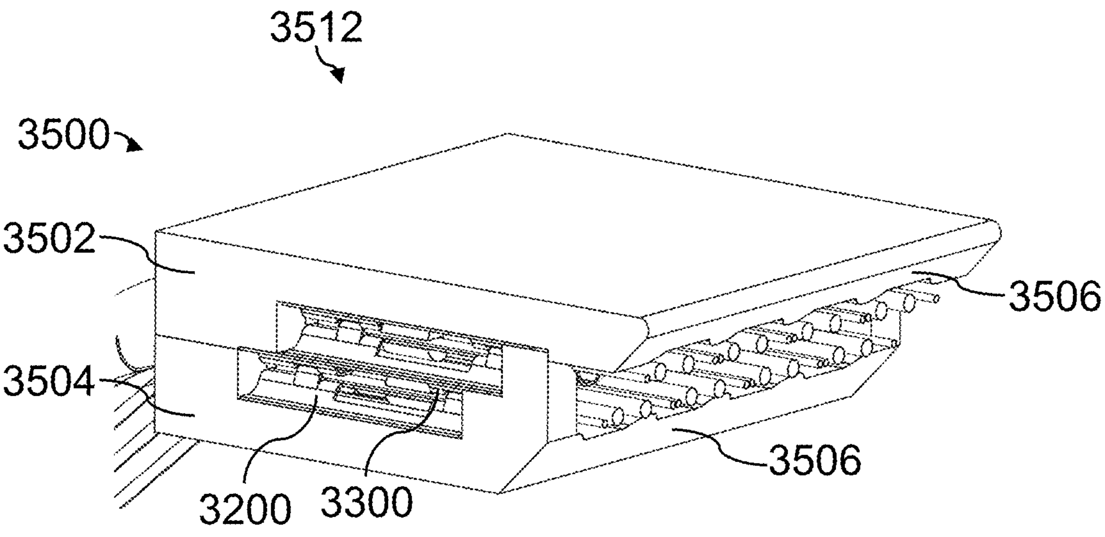
FIG. 35 is a perspective view of the connector of FIG. 32 including a support member holding the connector modules.

The modules, held together in a subassembly as shown in FIG. 34, may be inserted into or otherwise attached to a support structure. FIG. 35 is a perspective view of the connector assembly of FIGS. 33 and 34 held in a connector housing 3500. As shown in FIG. 35, the connector housing is a clam shell formed by a first piece 3502 and a second piece 3504 which together surround the rows of housing modules. As shown in FIG. 35, each row of housing modules is longitudinally offset from the other rows, so that each of the ground and signal contact tips may electrically couple to a PCB when the housing mating surface 3506 is flushed and parallel with the PCB. Housing 3500 holds the modules in position for mating to a footprint on a substrate, and may serve other functions, such as protecting components of the connector from damage. Though not shown in FIG. 35, housing 3500 may include features that interact with mounting mechanisms to align the connector 3512 with a footprint on a substrate and press the connector against the substrate. The housing may also press against cables extending from a rear of the housing, reducing strain on joints between the cable conductors and contact tips. Other support structures may be employed, including unitary housings, to perform some or all of these functions, as the present disclosure is not limited to the specific configuration shown.

Figure 36:
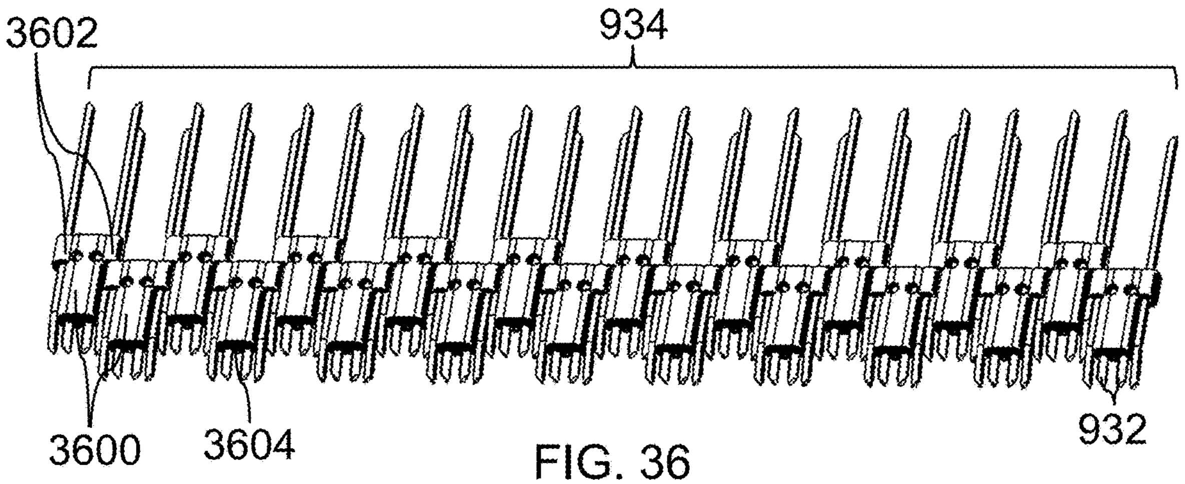
FIG. 36 is a perspective view of a portion of a connector formed with housing modules according to another embodiment.

FIG. 36 is a perspective view of another embodiment of housing modules 3600 for use in a connector assembly, here shown without cables attached. As shown in FIG. 36, a plurality of housing modules 3600 may be interconnected to one another with interlocking ground contact tip holders 3602 in a similar manner to the prior embodiment. However, in contrast to the embodiment of FIGS. 31-35, the housing modules of FIG. 36 are identical, meaning the ground contact tip holders are not offset from one another. Accordingly, housing module engagement surfaces 3604 are not aligned in a single row, but are disposed in two subrows in an alternating manner. Contact tips may mate with a footprint such as is shown in FIGS. 14A and 14B, for example. As shown in FIG. 36, each housing module includes two ground contact tips 934 and two signal contact tips 932. Like the prior embodiment, the adjacent ground contact tips are held by the ground contact tip holders of adjacent housing modules, meaning they are held immediately adjacent to one another. Like the previous embodiment, the housing modules may be placed between metal sheets and/or placed in a connector housing with any desirable number of rows and columns.

Figure 37:
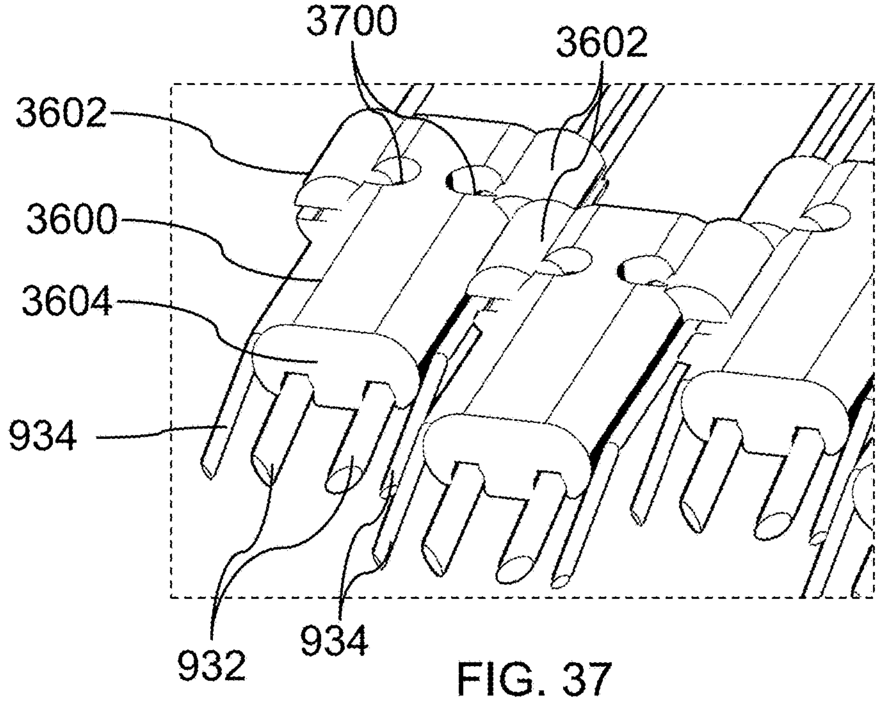
FIG. 37 is an enlarged view of the housing modules of FIG. 36.

FIG. 37 is an enlarged view of the housing modules 3600 of FIG. 36. As shown in FIG. 37, each housing module includes two signal contact tips 932 which are configured to be welded, soldered, or otherwise attached to cable conductors (e.g., through holes 3700 or a suitable coupler). Ground contact tip holders 3602 are each configured to hold two ground contact tips in a side-by side arrangement. The interlocking housing modules attach to the ground contact tips associated with the adjacent housing module, so that each interlocking housing module is indirectly attached to its surrounding housing modules.

Figure 38:
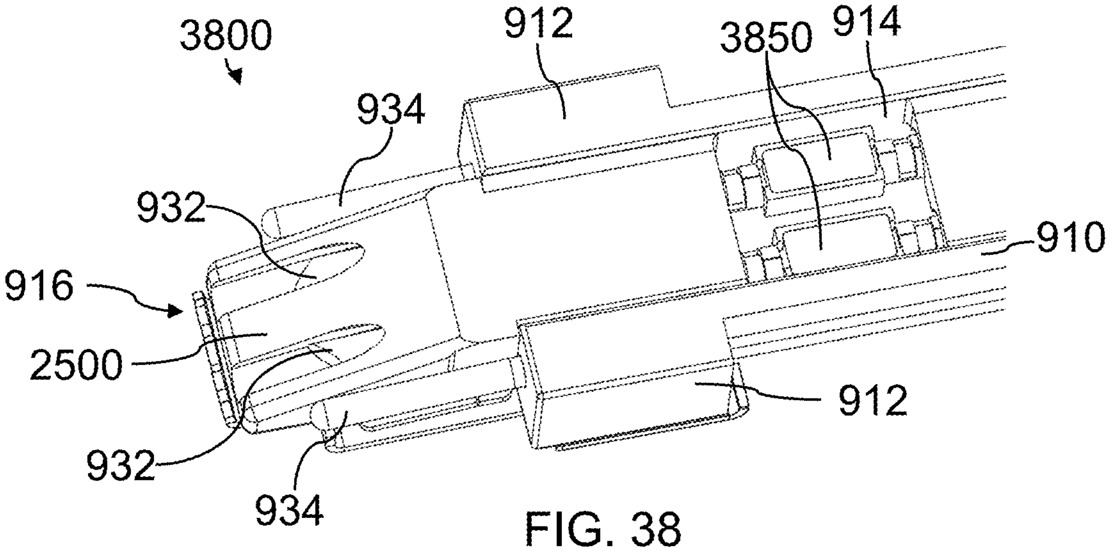
FIG. 38 is a perspective view of an exemplary embodiment of a connector module including an electronic component.

FIG. 38 is a perspective view of another embodiment of a connector module 3800. Here, the module is formed as an insert that may be inserted in a connector housing, using techniques as described above, including in connection with FIG. 15. As shown in FIG. 38, the connector includes a housing 910 having ground contact tip holders 912 and an opening 914. The ground contact tip holders are holding ground contact tips 934.

Module 3800 is here shown configured to connect a signal conductor in a cable and a signal contact tip through an electronic component. The components may be surface mount components, such as 0205 surface mount capacitors. Such components may be sufficiently small that they may be integrated into a coupler.

In the example of FIG. 38, capacitor couplers 3850 are disposed in the opening 914 which couple signal contact tips 932 to corresponding cable conductors. The housing 910 also includes an mating portion 916 which includes engagement mating surface 2500 which is flushed with a PCB or other substrate when the connector is electrically connected to footprint on the PCB. The arrangement of FIG. 38 may be desirable in cases where the connector electrically connects directly to the substrate of a chip or other electrical component such that it is impractical to position capacitors, or other electronic components that might instead be integrated into the connector, between the signal contact tips 932 and the component. Accordingly, the arrangement of FIG. 38 may improve space savings and the density of components and their respective connectors.

According to the embodiment of FIG. 38, the opening 914 may be sized and shaped to receive the capacitor couplers 3850 without changing the impedance through the electrical connection between the signal contact tips 932 and their respective cable conductors. In the embodiment of FIG. 38, the opening is arranged so no dielectric material is in contact with the capacitor coupler. To maintain the impedance at a consistent level throughout the connector, the dielectric constant of the opening surrounding the capacitor coupler is lower relative to other portions of the housing in contact to and/or adjacent with the signal contact tips and cable conductors. Other arrangements, such as positioning of a ground, alternatively or additionally may be employed to maintain a constant impedance throughout the connector, as the, present disclosure is not so limited.

Figure 39A:
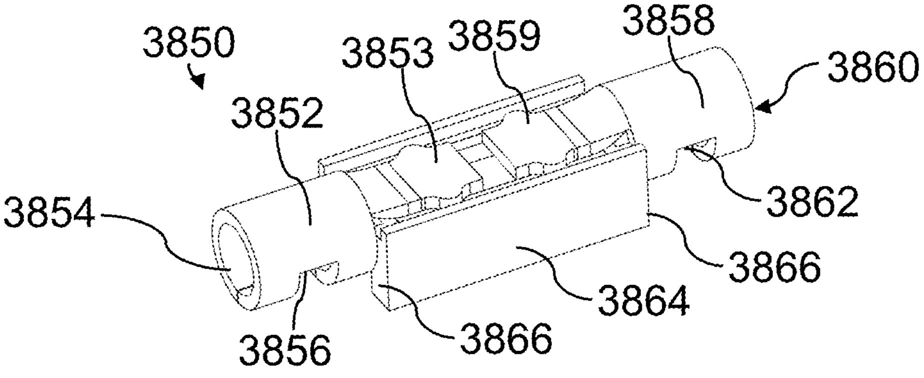
FIG. 39A is a first bottom perspective view of an exemplary embodiment of a coupler, including a capacitor.

FIG. 39A is a bottom perspective view of an embodiment of a capacitor coupler 3850. The capacitor coupler includes a first conductor receptacle 3852 which includes a hole 3854 and a weld channel 3856. The first hole 3854 is sized and shaped to receive a correspondingly sized conductor such as a signal contact tip or a cable conductor. The weld channel 3856 may provide a suitable channel for laser welding or spot welding so that the conductor may be secured and electrically connected to the capacitor coupler. While weld channels are shown in the embodiment of FIG. 39A, any suitable electrical and/or physical connection may be employed, such as solder or crimping, as the present disclosure is not so limited.

Hole 3854 may be formed by bending arms, such as arms 1600, into a tube. The arms forming hole 3854 are here shown integral with tab 3853. One end of a capacitor or similar component may be attached to tab 3853, such as via a surface mount solder technique.

The capacitor coupler also includes a second side conductor receptacle 3858 which similarly includes a second hole 3860 and a weld channel 3862. The second side conductor receptacle may also receive and secure a conductor such as a cable conductor or signal contact tip. The arms forming hole 3858 are here shown integral with tab 3859. A second end of a capacitor or similar component may be attached to tab 3859.

As shown in FIG. 39A, the capacitor coupling also includes a capacitor housing 3864 which includes ends 3866. Housing 3864 may, for example, be insulative material molded around the conductors forming conductor receptacles 3852 and 3858 and their corresponding tabs 3853 and 3859. In some embodiments, conductor receptacles 3852 and 3858 and their corresponding tabs 3853 and 3859 may be stamped and formed from a sheet of metal. Those components initially may be held together by tie bars. At some point, after housing 3864 is molded around those elements, the tie bards may be severed, electrically separating tabs 3853 and 3859.

In some embodiments, when the capacitor coupler is placed in a housing opening, the housing opening may be sized and shaped so that portions of the housing abut the ends 3866 and prevent the capacitor coupler from moving relative to a longitudinal axis of a connected cable conductor inside of the connector housing. Correspondingly, an attached cable conductor which is physically secured to the capacitor coupler will also be inhibited from moving along its longitudinal axis (i.e., pistoning) relative to the connector housing or a cable jacket. In other embodiments, a cable conductor, contact tip, or other conductor secured to the capacitor coupler may include structures to inhibit pistoning such as a plastic bead attached to the conductor. In such an embodiment, the capacitor coupler may not provide any resistance to pistoning.

Figure 39B:
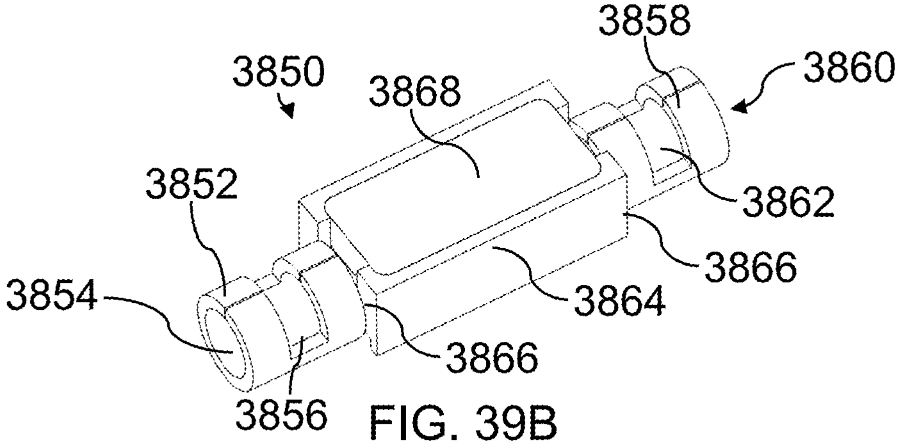
FIG. 39B is a top perspective view of the coupler and capacitor of FIG. 39A.

FIG. 39B is a top perspective view of the capacitor coupler 3850 of FIG. 39A. In the state shown in FIG. 39B, a capacitor is disposed in the capacitor housing 3864 such that the first conductor receptacle 3852 is electrically connected to the second conductor receptacle 3858 through the capacitor. In the embodiment illustrated, housing 3864 is then filled, which may protect the capacitor and the solder joints made to it. Here, filling 3686 is shown, which may be a UV curable conformal coating, such as is sold by DYMAX corporation.

Figure 40:
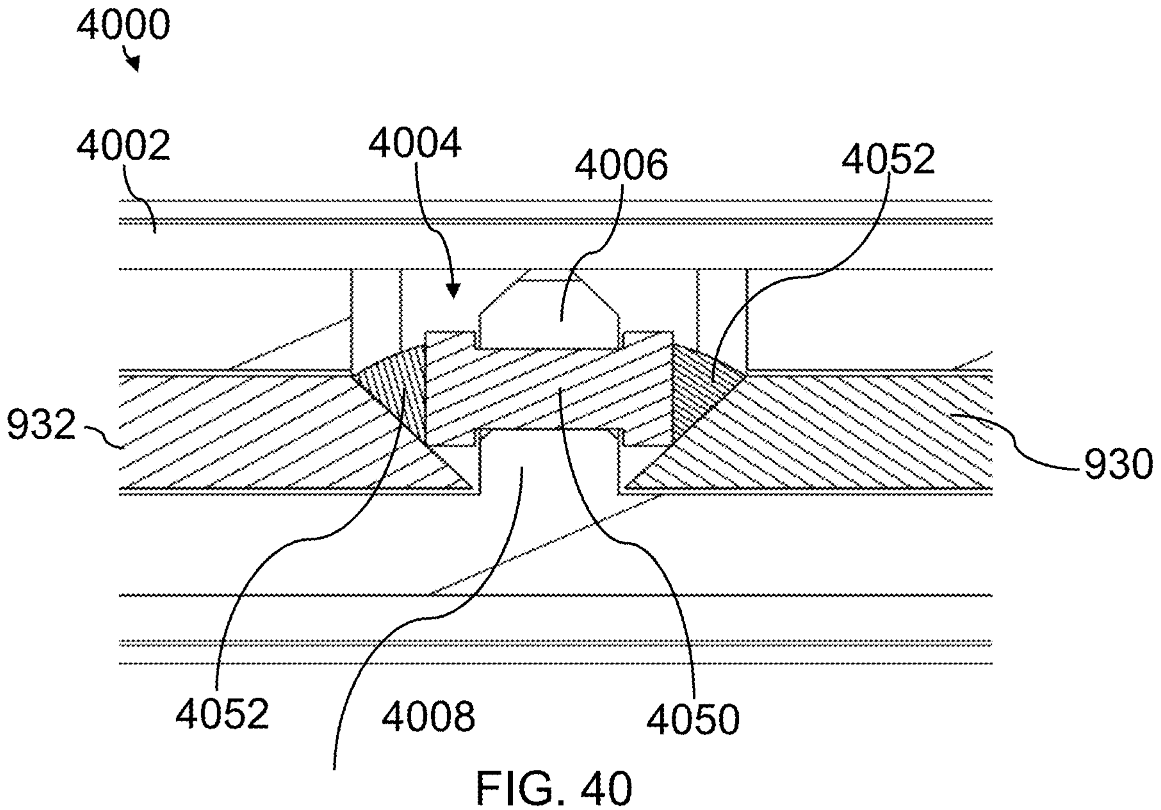
FIG. 40 is a cross-sectional view of another embodiment of a connector with conductors coupled via a capacitor.

In some embodiments a contact tip and a cable conductor may be coupled through a component without a separate holder. FIG. 40 is a top cross-sectional view of another embodiment of coupling through a capacitor 4000. The capacitor of FIG. 40 is disposed in a connector housing 4002 into which a cable conductor 930 and a signal contact tip 932 extend in opposite, collinear directions. The connector housing includes a capacitor receptacle 4004 sized and shaped to receive a capacitor 4050. As shown in FIG. 40, the capacitor rests on a pedestal portion 4008 of housing 4002 such that it is offset from the longitudinal axes of the signal contact tip 932 and cable conductor 930.

Such an arrangement may inhibit pistoning of the capacitor 4050, signal conductor 930, and/or signal contact tip 932. The capacitor coupling also includes an anti-pistoning projection 4006 which is shaped correspondingly to the capacitor so as to further inhibit motion of the capacitor 4050, and thereby inhibit pistoning of the conductors to which it is attached.

According to the embedment of FIG. 40, the capacitor is electrically and physically connected to the signal contact tip and cable conductor with solder 4052. Here, the ends of the conductors are cut at a an angle with respect to the longitudinal dimensions so as to expose a larger surface area for attachment of the capacitor. In this example, ends of capacitor 4050 are soldered to the angled ends of the conductors.

Figure 41:
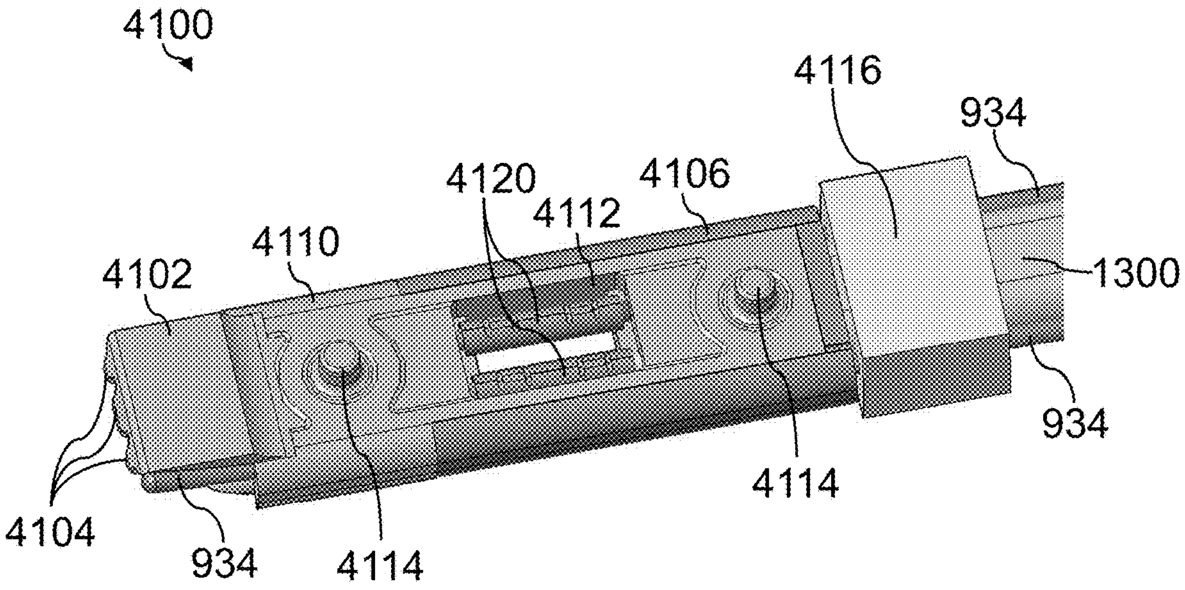
FIG. 41 is a perspective view of another embodiment of a connector module.

FIG. 41 is a perspective view of another embodiment of a module 4100. The module of FIG. 41 may be used similarly to that of FIG. 15 to terminate conductors in a cable to signal and ground contact tips. As shown in FIG. 41, the connector includes a housing 4110 having an opening 4112 which receives conductive couplers 4120. The conductive couplers electrically and physically connect signal contact tips to cable conductors. In this example, conductive couplers 4120 are shown crimped around the contact tips and cable conductors, but other conductors, including those described above in which attachment is via welding or that incorporate capacitors may alternatively be used.

Ground contact tips 934 are disposed at least partially in the housing 4110 and are electrically connected to a shield 1300 of a cable. In this example, connection between the shield 1300 and the ground contact tips is via a compliant conductive member 4116, which may be formed as described above.

In the embodiment of FIG. 41, the connector housing includes an electrically lossy (i.e., semi-conductive) region 4106. The electrically lossy region may be electrically coupled to ground contact tips 934. In the embodiment illustrated, ground contact tips 934 pass through openings in regions 4106. The module 4100 may also incorporate one or more grounded, conductive structures including, for example, a top shield 4012 (FIG. 42).

The lossy material is electrically connected to both the top shield 4012 and ground contact tips 934 and/or other grounded structures.

Figure 42:
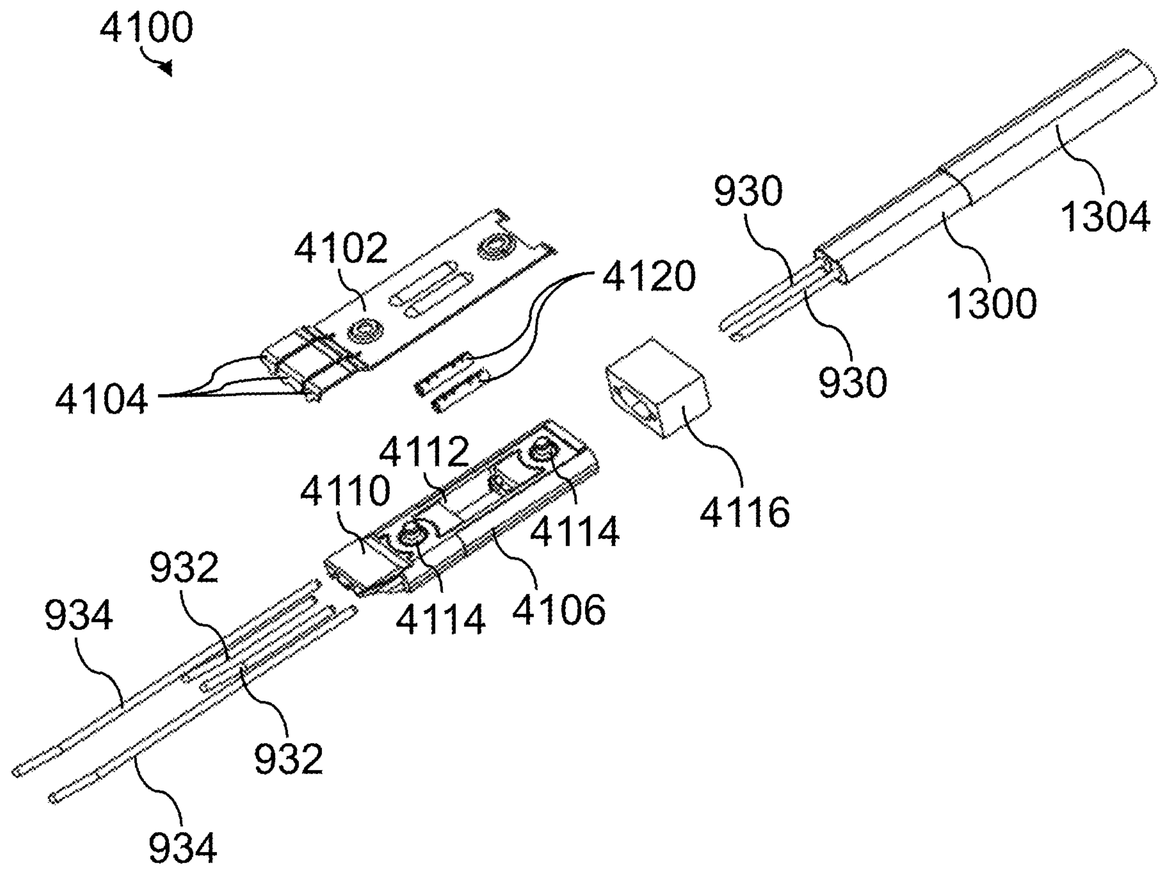
FIG. 42 is an exploded view of the connector module of FIG. 41.

As can be seen in the exploded view of FIG. 42, module 4100 may include a top shield 4102 which covers at least a portion of the signal contact tips, ground contact tips, and cable conductors. The top shield includes fingers 4104 that extend beyond the mating portion of module 4100 such that, when module 4100 is pressed against a substrate, the fingers 4104 may connect to ground contacts on the substrate. The top shield is electrically connected to the ground contact tips 934 as well as the cable shield 1300 via the compliant conductive member 4116. As a result, there is a continuous ground path from the cable shield to the ground structure of the substrate to which the module is mated. That ground path is through both the top shield and the ground contact tips, and parallel to the signal paths. The top shield provides a low impedance path. Such a configuration has been found to provide high signal integrity. Further, lossy portion region 4106 is coupled to that ground structure, which may further improve signal integrity.

The top shield is secured to the housing with posts 4114 and additionally may provide added structural rigidity and/or strength to the module.

As shown in the exploded view of FIG. 42 and discussed above, the connector includes the connector housing 4110 having the opening 4112. The opening is configured to receive the conductive couplers 4120 which in turn are configured to electrically connect signal contact tips 932 to cable conductors 930. The housing also includes posts 4114 which receive and secure the top shield 4102 the housing. The top shied includes fingers 104 which are configured to engage ground contacts disposed on a PCB or other substrate. Likewise, the ground contact tips 934 are also configured to electrically connect to ground contact disposed on the PCB or substrate. The ground contact tips are configured to be disposed partially in the housing 4110 and are electrically connected to a shield 1300 of a cable via a conductive compliant member 4116. A lossy material 4106 surrounds the outside of the ground contact tips and is also electrically connected to the top shield to damp resonant signals passing though the grounds. In some embodiments, instead of a lossy material 4106 the material 4106 may be a conductive elastomer.

Figure 43:
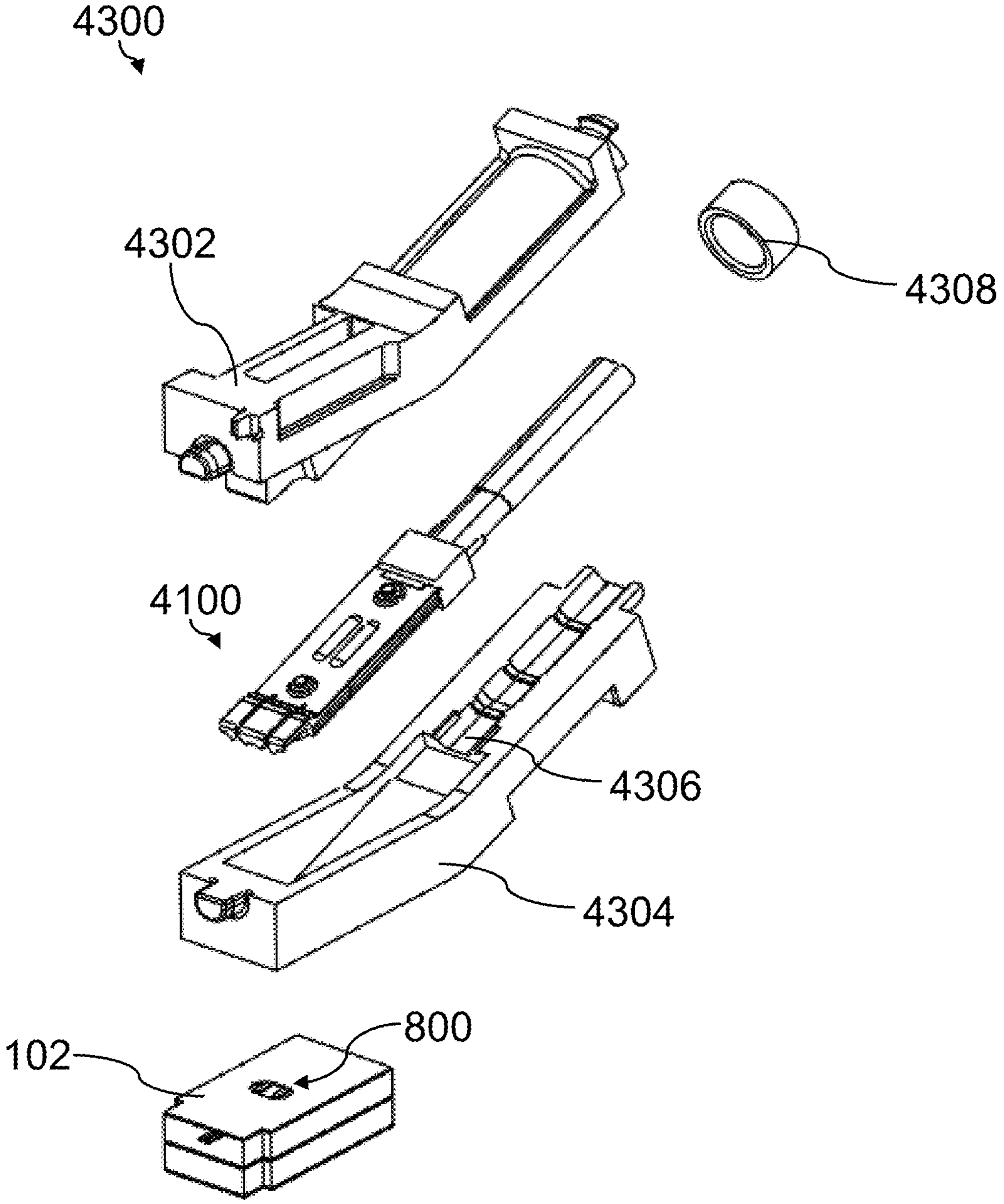
FIG. 43 is an exploded view of a portion of a connector assembly including the connector module of FIG. 41.

FIG. 43 is an exploded view of a connector assembly 440 including the module 4100 of FIG. 41. The connector assembly includes a first housing section 4302 and a second housing section 4304. Housing sections 43020 and 4304 may be molded of an insulative material, such as plastic.

The first and second housing sections include receptacles 4306 sized and shaped to receive the module 4100. In some embodiments, the housing sections may include multiple receptacles for multiple modules, so that any desirable number of contacts and grounds may be employed in connector assembly. In such a configuration, the structure shown in FIG. 43 may be duplicated, such as in the configuration of FIG. 8, for example. The housing sections may be held together in any suitable way, including through use of screws, adhesives or other fasteners.

In some embodiments, a cable clamp 4308 may be used. The cable clamp 4308, for example, may be compressed around the cable 1304 and a portion of the housing. The clamp may be rigid, such as a crimped metal band or may be flexible, and may be formed by overmolding rubber or similarly flexible material on the cable and housing portion. The connector assembly is suitable for use with a substrate (e.g., a PCB) 102 having one or more contacts.

Figure 44A:
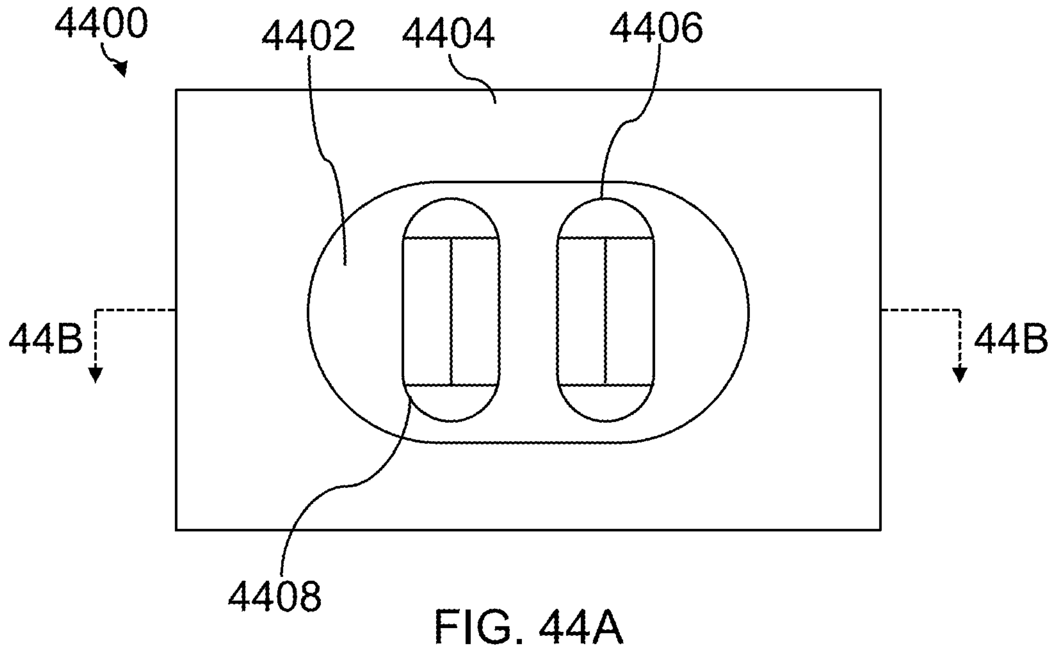
FIG. 44A is a top plan view of one embodiment of a conductive pads to which contact tips of a midboard connector may be mated.

FIG. 44A is a top plan view of one embodiment of a contact region 4400 to which a contact tips of a midboard connector may be mated. As shown in FIG. 44A, contact region 4400 is disposed on a substrate (e.g., a PCB) 4402. According to the embodiment of FIG. 44A, contact region 4400 may be employed to electrically connect one or more contact tips of a midboard connector. Similar to the contact pads described with reference to FIGS. 14A-14B, the contact region 4400 includes a ground contact pad 4404, a first signal contact pad 4406, and a second signal contact pad 4408. As shown in FIG. 44A, the ground contact pad 4404 may be generally planar and extend over a relatively large area of substrate 4402, with openings in which signal contact pads are disposed. Such a ground contact pad may electrically connect with multiple ground contact tips of a midboard connector.

First signal contact pad 4406 and second signal contact pad 4408 are disposed in an opening in ground contact pad 4404. As will be discussed further with reference to FIG. 44B, the first signal contact pad 4406 and the second signal contact pad 4408 are concave so that the signal contact pads align contact tips of the midboard connector that engage the signal contact pads with the pads. When a pressure mount connection is made between a connector and substrate 4402, the contact tips are urged towards a low point of the recess. In the illustrated embodiment, the signal contact pads are formed with semi-circular depressions with centerlines that align with a center of the signal pads. As illustrated, the depth of the pads monotonically decreases towards the centerline of the pad. Such a configuration may center contact tips in the signal contact pads. Centering of contact tips may be further facilitated through the use of rounded contact tips.

Figure 44B:
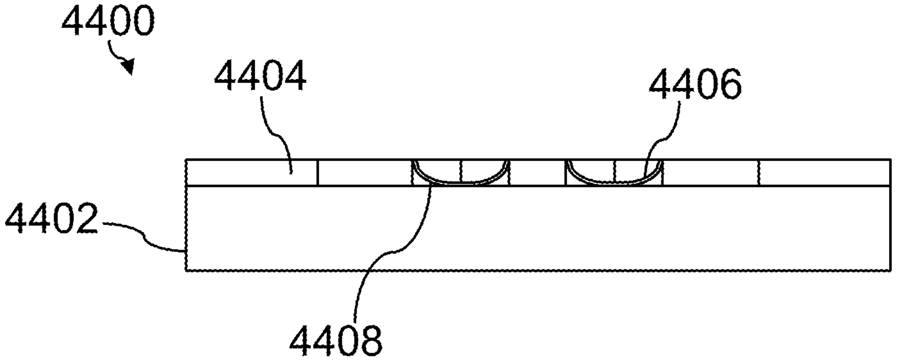
FIG. 44B is a cross-sectional view of the conductive pads of FIG. 44A taken along line 44B-44B.

FIG. 44B is a cross-sectional view of the contact region 4400 of FIG. 44A taken along line 44B-44B. As shown in FIG. 44B, the ground contact pad 4404 is formed as a flat conductive region disposed on the substrate 4402. The first signal contact pad 4406 and the second signal contact pad 4408 are also disposed on the substrate 4402 in the same plane as the ground contact pad 4404. The signal contact pads are shaped with semi-circular depressions such that the signal contact pads center contact tips on a longitudinal centerline of the signal contact pads 4406, 4408. The curvature of the signal contact pads urges signal contact tips toward the longitudinal centerline of the signal contact pads with normal force between the signal contact tips and signal contact pads. Of course, while in the embodiment of FIG. 44B the signal contact pads 4406, 4408 are semi-circular, in other embodiments the signal contact pads may take other recessed shapes. For example, in some embodiments the signal contacts pads may have a V-shaped groove, where the inclined walls of the V provide normal forces that urge a signal contact tip toward a longitudinal centerline of the signal contact pad. Accordingly, a signal contact pad may have any suitable recessed shape configured to generate normal forces that urge signal contact tips toward a longitudinal centerline or other location on the signal contact pads where contact is desired. It should also be appreciated that, though such a technique is illustrated with respect to positioning of signal contact tips, a similar approach may be used in connection with ground contact tips.

Such a configuration for example, may facilitate low tolerance in the relative positions of the signal contact tips and ground contact structures when a connector is pressure mounted to a substrate. As a result, the impedance of the signal path may be well controlled. Such impedance control may be particularly desirable for a connector carrying high speed signals, such as 56 Gbps (PAM4) or higher, including at 112 Gbps or higher. Such impedance control may be used, for example, with differential signals in which a contact region has a pair of signal pads surrounded by a ground pad. Reducing tolerance of the position of the signal contact tips may reduce changes in impedance within the connector to be less than 3 Ohms, and in some embodiments, less than 2 Ohms, less than 1 Ohm or less than 0.5 Ohms, in some embodiments.

It should be noted that the signal contact pads of FIGS. 44A-44B may be formed in any suitable manner. In some embodiments, the signal contact pads may be formed with a ball end-mill. The ball end-mill may be employed to machine the semi-circular shaped recesses in flat signal contact pads. In some other embodiments, the signal contact pads may be etched away in a wet process. Of course, any suitable process may be employed, as the present disclosure is not so limited.

Figure 45:
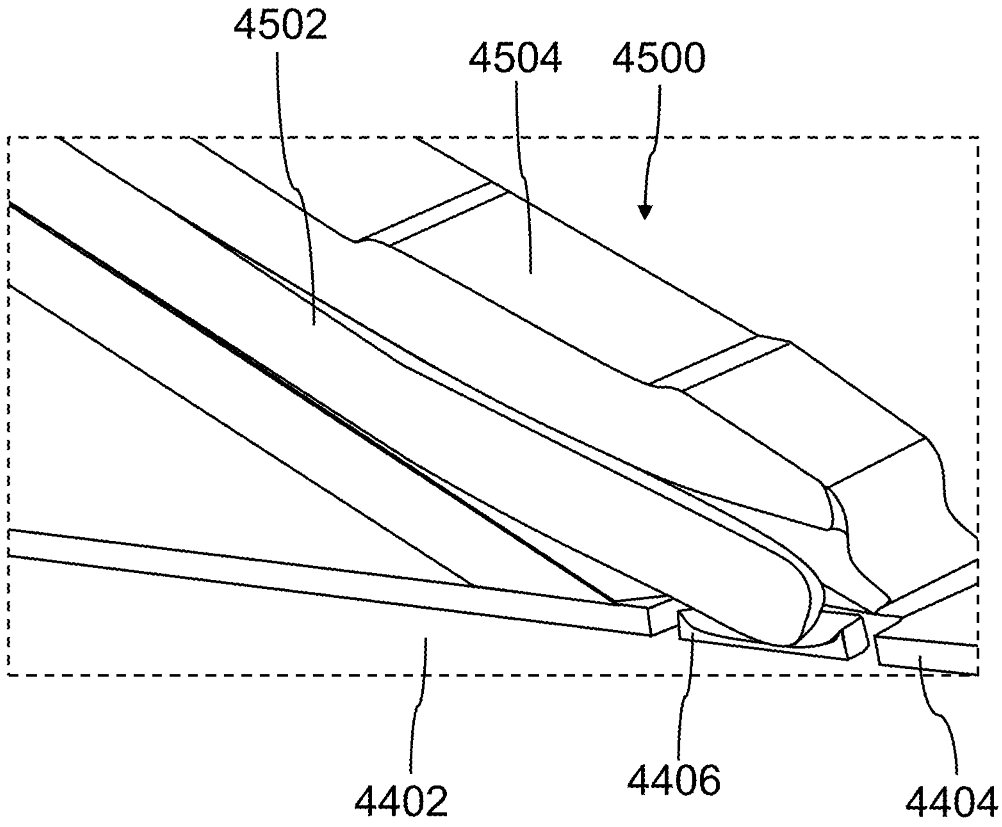
FIG. 45 is a cross-sectional view of one embodiment of a contact tip of a midboard connector mated with the conductive pad of FIGS. 44A-44B.

FIG. 45 is a cross-sectional view of one embodiment of a signal contact tip 4502 of a midboard connector 4500 connected with the contact pad of FIGS. 44A-44B. According to the embodiment of FIG. 45, the signal contact tip 4502 is supported by a dielectric insert 4504. As shown in FIG. 45, the signal contact tip is cylindrical with a rounded end. Similar to embodiments previously discussed herein, the signal contact tip may be configured to be pressed against the signal contact pad to apply a normal force to the signal contact pad. The signal contact pad 4406 is formed with a curved recess so that the normal force applied by the signal contact tip 4502 urges the signal contact tip into alignment with the signal contact pad. In this example, the signal contact pad 4406 urges the signal contact tip 4052 into alignment with a longitudinal centerline of the signal contact pad. In the embodiment of FIG. 45, the signal contact pad and the signal contact tip have corresponding shapes so that the signal contact tip is reliably moved into alignment with the signal contact pad. In this example, both the signal contact tip and the signal contact pad have curved shapes. Of course, a signal contact tip and signal contact pad may have any suitable shape that is the same or different from one another, as the present disclosure is not so limited. For example, the signal contact pad may have a V-shaped groove while the signal contact tip remains formed as a cylinder.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

For example, use of lossy material was described. Materials that conduct, but with some loss, or materials that by a non-conductive physical mechanism absorbs electromagnetic energy over the frequency range of interest may be referred to herein generally as "lossy" materials. Electrically lossy materials may be formed from lossy dielectric materials and/or poorly conductive materials and/or lossy magnetic materials.

Magnetically lossy materials may include, for example, materials traditionally regarded as ferromagnetic materials, such as those that have a magnetic loss tangent greater than approximately 0.05 in the frequency range of interest. The "magnetic loss tangent" is generally known to be the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest.

Electrically lossy materials may be formed from material traditionally regarded as dielectric materials, such as those that have an electric loss tangent greater than approximately 0.05 in the frequency range of interest. The "electric loss tangent" is generally known to be the ratio of the imaginary part to the real part of the complex electrical permittivity of the material. For example, an electrically lossy material may be formed of a dielectric material in which is embedded a conductive web that results in an electric loss tangent greater than approximately 0.05 in the frequency range of interest.

Electrically lossy materials may be formed from materials that are generally thought of as conductors, but are relatively poor conductors over the frequency range of interest, or contain conductive particles or regions that are sufficiently dispersed that they do not provide high conductivity, or are prepared with properties that lead to a relatively weak bulk conductivity compared to a good conductor (e.g., copper) over the frequency range of interest.

Electrically lossy materials typically have a bulk conductivity of about 1 siemen/meter to about 100,000 siemens/meter and preferably about 1 siemen/meter to about 10,000 siemens/meter. In some embodiments, material with a bulk conductivity of between about 10 siemens/meter and about 200 siemens/meter may be used. As a specific example, material with a conductivity of about 50 siemens/meter may be used. However, it should be appreciated that the conductivity of the material may be selected empirically or through electrical simulation using known simulation tools to determine a suitable conductivity that provides both a suitably low crosstalk with a suitably low signal path attenuation or insertion loss.

Electrically lossy materials may be partially conductive materials, such as those that have a surface resistivity between 1 Ω/square and 100,000 Ω/square. In some embodiments, the electrically lossy material may have a surface resistivity between 10 Ω/square and 1000 Ω/square. As a specific example, the electrically lossy material may have a surface resistivity of between about 20 Ω/square and 80 Ω/square.

In some embodiments, an electrically lossy material may be formed by adding to a binder a filler that contains conductive particles. In an embodiment, a lossy member may be formed by molding or otherwise shaping the binder with filler into a desired form. Examples of conductive particles that may be used as a filler to form an electrically lossy material include carbon or graphite formed as fibers, flakes, nanoparticles, or other types of particles. Metal in the form of powder, flakes, fibers, or other particles may also be used to provide suitable electrically lossy properties. Alternatively, combinations of fillers may be used. For example, metal-plated carbon particles may be used. Silver and nickel may be suitable metals for metal-plating fibers. Coated particles may be used alone or in combination with other fillers, such as carbon flakes. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

Also, although the binder materials discussed above may be used to create an electrically lossy material by forming a matrix around conductive particle fillers, the present technology described herein is not so limited. For example, conductive particles may be impregnated into a formed matrix material or may be coated onto a formed matrix material, such as by applying a conductive coating to a plastic component or a metal component. As used herein, the term "binder" may encompass a material that encapsulates the filler, is impregnated with the filler or otherwise serves as a substrate to hold the filler.

In some embodiments, the fillers may be present in a sufficient volume percentage to allow conducting paths to be created from particle to particle. For example, when metal fiber is used, the fiber may be present at about 3% to 40% by volume. The amount of filler may impact the conducting properties of the material.

Filled materials may be purchased commercially, such as materials sold under the trade name Celestran® by Celanese Corporation, which can be filled with carbon fibers or stainless steel filaments.

A lossy member may be formed from a lossy conductive-carbon-filled adhesive preform, which may be obtained from Techfilm of Billerica, Massachusetts, US, may be used as a lossy material. This preform may include an epoxy binder filled with carbon fibers and/or other carbon particles. The binder may surround carbon particles, which act as a reinforcement for the preform. Such a preform may be inserted in a connector lead frame subassembly to form all or part of the housing. In some embodiments, the preform may adhere through an adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated, may be used. For example, non-woven carbon fiber may be a suitable reinforcing fiber. As will be appreciated, other suitable reinforcing fibers may be used instead or in combination.

Alternatively, lossy member may be formed in other ways. In some embodiments, a lossy member may be formed by interleaving layers of lossy and conductive material such as metal foil. These layers may be rigidly attached to one another, such as through the use of epoxy or another adhesive, or may be held together in any other suitable way. The layers may be of the desired shape before being secured to one another or may be stamped or otherwise shaped after they are held together. Alternatively or additionally, a lossy material may be formed by depositing or otherwise forming a diffuse layer of conductive material, such as metal, over an insulative substrate, such as plastic, to provide a composite part with lossy characteristics, as described above.

In various example embodiments described herein, lossy regions may be formed of an electrically lossy material. In some specific examples, that lossy material may have a plastic matrix, such that members may be readily molded into a desired shape. The plastic matrix may be made partially conductive by the incorporation of conductive fillers, as described above, such that the matrix becomes lossy.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, although various embodiments described herein include one or more components including superelastic materials, it should be understood that the current disclosure is not limited in this regard. For example, in some instances, the components may include materials that are not technically superelastic, but may include one or more compliant materials which are operated below their yield stress (and thus do not undergo plastic deformation). In other embodiments, non-superelastic materials may be included and may be operated above their yield stresses, and therefore these components may not be re-usable.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. For example, connector assemblies of exemplary embodiments described herein may be employed in silicon to silicon application for data transmission rates greater than or equal to 28 Gbps and 56 Gbps. Additionally, connector assemblies may be employed where signal losses from trace signal transmissions are too great, such as in cases where signal frequencies exceed 10 GHz, 25 GHz, 56 GHz or 112 GHz.

As another example, embodiments were described in which metal sheets were positioned above and/or below multiple modules. The metal sheets may be solid metal or may, in some embodiments, be metal foils supported on a polymer film, such as an aluminum layer less than 5 mils thick on a mylar film.

Also, features described in connection with some embodiments may be applied in other embodiments. For example, coupling cable conductors and contact tips through capacitors may be used in embodiments other than those specifically described as including those options. As another example, various techniques to couple signal and/or ground conductors were described, and those techniques may similarly be applied in embodiments other than the ones for which they were expressly described. Likewise, lossy material and shields for a module that contact a substrate may be used in connection with embodiments other than the ones in which they were expressly described.

Accordingly, the foregoing description and drawings are by way of example only.

Examples

In some embodiments, interior surfaces of an opening are separated from a conductive coupler by a distance that provides an impedance through the conductive coupler that matches an impedance of a cable conductor within a cable. In some embodiments, the interior surfaces are at least partially coated with metal.

In some embodiments, a connector assembly according to exemplary embodiments described herein includes a compliant conductive member which at least partially surrounds the circumference of a shield, first ground conductor, second ground conductor, and electrically connects the first ground conductor and the second ground conductor to the shield.

In some embodiments, a metal stiffener plate is disposed on a surface of a housing which is perpendicular to a surface of the housing configured to be mounted adjacent a circuit board.

In some embodiments, a connector assembly includes a plurality of cables, each of the plurality of cables including at least one cable conductor having an end, a plurality of contact tips, where each of the plurality of contact tips includes an end abutting the end of a respective cable conductor and is made from a different material than the respective cable conductor, and a plurality of conductive couplers, where each of the plurality of conductive couplers including a first end with tines at least partially surrounding a contact tip of the plurality of contact tips and a second end with tines at least partially surrounding the end of the respective cable conductor. In some embodiments, each of the plurality of conductive couplers is welded to a respective contact tip of the plurality of contact tips and an end of a respective cable conductor of the plurality of cables. In some embodiments, each of the plurality of conductive couplers is soldered a respective contact tip of the plurality of contact tips and an end of a respective cable conductor of the plurality of cables. In some embodiments, each of the plurality of conductive couplers is crimped around a respective contact tip of the plurality of contact tips and an end of a respective cable conductor of the plurality of cables. In some embodiments, each of the plurality of contact tips includes a nickel titanium. In some embodiments, the plurality of cables are arranged in a first row and a second row separated from the first row. In some embodiments, the plurality of cables are arranged in a plurality of columns, where each of the plurality of columns includes a cable in the first row and a cable in the second row. In some embodiments, each of the plurality of cables includes a first cable conductor and a second cable conductor surrounded by a shield. In some embodiments, the plurality of cables includes 64 cables. In some embodiments, the plurality of cables includes 128 cables. In some embodiments, the connector assembly further includes a plurality of ground contact tips, where each of the plurality of cables includes a shield surrounding each of the at least one conductors, where each of the plurality of ground contact tips is electrically coupled to a shield of a cable of the plurality of cables within the connector assembly. In some embodiments, the connector assembly further includes a plurality of housing modules, where at least one of each of the cable conductors, plurality of contact tips, and plurality of ground contact tips is disposed in each of the plurality of housing modules. In some embodiments, each of the plurality of housing modules is interlocked with an adjacent housing module. In some embodiments, the ground contact tips of the plurality of housing modules pass through an opening formed in each of the respective adjacent housing modules.

In some embodiments, a connector assembly includes a housing including an opening, where the opening includes a first end defined by a first wall including a first hole there through and a second end defined by a second wall including a second hole there through, an elongated member passing through the first hole and the second hole, where the elongated member includes a first contact tip, a first cable conductor electrically and mechanically coupled to the contact tip, and a second member mechanically coupled to the elongated member, where the second member has a size larger than the first hole and of the second hole, and the second member is disposed in the opening. In some embodiments, the first contact tip includes a superelastic conductive material. In some embodiments, the second member is configured to contact the first wall and the second wall such that movement of the elongated member in the direction of the first wall or second wall is inhibited. In some embodiments, the connector assembly further includes a third elongated member including a second contact tip, a second cable conductor in electrical communication with the second contact tip, and a fourth member mechanically coupled to the third elongated member, where the fourth member is disposed in the housing, and where the fourth member is configured to contact the first wall and the second wall such that movement of the second third elongated member in the direction of the first wall or second wall is inhibited. In some embodiments, the second member and the fourth member are disposed in the opening, and where the second contact tip passes through the first wall, and the first cable conductor passes through the second wall. In some embodiments, the fourth member is disposed in a second opening having a first end defined by a first wall and second end defined by a second wall, where the second contact tip passes through the first wall of the second opening, and the first cable conductor passes through the second wall of the second opening. In some embodiments, the first opening is disposed in a first row and the second opening is disposed a second row offset from the first row. In some embodiments, the first row is separated from a second row in a direction perpendicular to the first row by a distance between 4 mm and 5 mm. In some embodiments, the first cable conductor and first contact tip are formed of metals of different types. In some embodiments, the opening is bounded by interior surfaces of the housing, and a portion of the interior surfaces are coated with a conductor. In some embodiments, the portion of the interior surfaces coated with a conductor are separated from the second member by a distance that provides an impedance through the second member that matches the impedance within the cable conductor. In some embodiments, the interior surfaces are at least partially coated with metal. In some embodiments, the cable conductor has a diameter of 30 AWG or smaller.

In some embodiments, an electrical connector includes a housing including a first surface, and a first side transverse to the first surface, an electrical contact tip projecting from the housing and exposed at the first surface, and at least one member configured as a receptacle sized to receive the housing therein, where the receptacle is bounded by a second side, where the first side includes a first portion with a second surface making an angle of greater than 0 degrees and less than 90 degrees with respect to the first surface, and where the second side includes a second portion with a third surface, parallel to the second surface and positioned to engage the second surface when the housing is received in the receptacle. In some embodiments, the receptacle is disposed on a circuit board, the first portion includes a wedge-shaped projection from the first surface, and the second portion includes a projection receptacle configured to receive the wedge-shaped projection when the housing is received in the receptacle. In some embodiments, the circuit board includes a signal contact disposed on the circuit board, and when the housing is received in the receptacle, the electrical contact tip is brought into electrical communication with the signal contact. In some embodiments, as the second surface is engaged by the third surface, the cable connector housing is moved closer to the circuit board. In some embodiments, as the housing is received in the receptacle, the electrical contact tip wipes the signal contact. In some embodiments, the receptacle includes a spring latch configured to releasably secure the housing in the receptacle. In some embodiments, the spring latch applies a force to the cable connector housing urging the housing into the receptacle. In some embodiments, the cable connector housing includes a first section and a second section, where the first section is angle relative to the second section by an angle between 15 and 60 degrees. In some embodiments, a thickness of the first section of the housing is between 3.5 and 4.5 mm. In some embodiments, a thickness of the housing is between 3.5 and 4.5 mm. In some embodiments, the electrical connector further includes a metal stabilization plate disposed on a front face of the cable connector housing, where the metal stabilization plate increases the stiffness of the cable connector housing. In some embodiments, the metal stabilization plate is perpendicular to the first surface. In some embodiments, the receptacle includes a fourth surface including features engaging the metal stabilization plate. In some embodiments, the electrical connector further includes a ground contact tip projecting from the cable connector housing, and a ground contact disposed on the circuit board, where, as the housing is moved into the receptacle and the second surface is in contact with the third surface, the ground contact tip is brought into electrical communication with the ground contact. In some embodiments, the housing and the receptacle are configured such that, as the housing moves into the receptacle and the second surface is in contact with the third surface, the ground contact tip is brought into electrical communication with the ground contact before the electrical contact tip is brought into electrical communication with a signal contact. In some embodiments, the electrical connector further includes a cable having a cable conductor in electrical communication with the electrical contact tip and shield in electrical communication with the ground contact tip. In some embodiments, the shield surrounds the cable conductor. In some embodiments, an electrical connector further includes a second electrical contact tip, where the cable includes a second cable conductor in electrical communication with the second electrical contact tip, and where the shield surrounds the cable conductor and second cable conductor. In some embodiments, the electrical connector further includes a compliant conductive member at which at least partially surrounds the shield and the ground contact tip, where the conductive gasket electrically couples the ground contact tip to the shield.

In some embodiments, a method of connecting a cable to a substrate includes positioning the housing with a first surface of the housing facing a surface of the substrate, applying a first force to the housing in a first direction, where the first direction is parallel to the surface of the substrate, engaging a second surface on the housing with a third surface attached to the substrate, such that a second force in a second direction, perpendicular to the first direction, is generated on the housing, urging, with the second force, at least one contact tip extending through the first surface against at least one contact disposed on the surface of the substrate. In some embodiments, the method further includes inhibiting bowing of the housing about a transverse axis of the housing with a metal stabilization plate. In some embodiments, the method further includes rotating a spring latch into engagement with a tab formed on the housing to secure the housing in the receptacle. In some embodiments, the method further includes applying a force to the housing in the first direction with the spring latch. In some embodiments, the method further includes wiping the contact with the at least one contact tip as the housing is moved in the first direction. In some embodiments, the at least one contact tip includes a plurality of signal contact tips and a plurality of ground contact tips, the at least one contact disposed on the surface of the substrate includes a plurality of signal contacts and a plurality of ground contacts, and the method further includes wiping the signal contacts with the signal contact tips as the housing is moved in the first direction, and wiping the ground contacts with the ground contact tips as the housing is moved in the first direction. In some embodiments, the second surface and/or the third surface are angled relative to the surface of the substrate by an angle of greater than 0 degrees and less than 90 degrees such that the second force is generated by camming the second surface against the third surface. In some embodiments, the method further includes urging the at least one contact tip against the at least one contact includes deflecting the first electrical contact tip from a resting position by at least 0.1 mm with a force that varies by less than 10% over the range of deflections from 0.05 mm to 0.1 mm. In some embodiments, elastically deflecting the first electrical contact tip includes transitioning the first electrical contact tip from an austenite to a martensite phase. In some embodiments, the method further includes electrically connecting a second electrical contact tip to a second signal contact disposed in the receptacle. In some embodiments, an electrical connector includes a first contact tip formed of a first material, a first cable conductor formed of a second material different from the first material and electrically connected to the first contact tip at a joint, and a housing including an opening therethrough, where the joint is disposed in the opening, where the opening is bounded by interior surfaces of the housing, and at least a portion of the interior surfaces is coated with a conductor. In some embodiments, the interior surfaces are separated from the joint by a distance that provides an impedance through the joint that matches the impedance within the cable conductor. In some embodiments, the at least a portion of the interior surfaces are coated with metal. In some embodiments, a cable conductor has a diameter of 30 AWG or smaller. In some embodiments, the first material is copper and the second material is nickel titanium.

In some embodiments, an electrical connector kit includes a contact tip, a conductive coupler including a first end configured to be mechanically coupled to the first contact tip and a second end configured to be mechanically coupled to a cable conductor, and a housing including an opening therethrough, where the opening includes a first end defined by a first wall and a second end defined by a second wall, where the housing is configured to receive the first contact tip through the first wall, where the housing is configured to receive the cable conductor through the second wall, and where the opening is configured to receive the conductive coupler. In some embodiments, the contact tip is formed of nickel titanium. In some embodiments, the kit includes a ground contact tip, where the housing is configured to receive the ground contact tip through the first wall.

In some embodiments, an electrical connector includes a housing, a first contact tip formed of a first material extending from the housing, a first cable conductor formed of a second material different from the first material extending from the housing, and a capacitor electrically connecting the first contact tip to the first cable conductor. In some embodiments, the first material is nickel titanium. In some embodiments, the capacitor is disposed within the housing and the electrical connector further includes a shield plate disposed on the housing and covering the capacitor. In some embodiments, at least a portion of the housing includes a semiconductive lossy material electrically connected to the shield plate. In some embodiments, the electrical connector further includes a ground contact tip disposed at least partially in the housing, where the ground contact tip is electrically connected to the shield plate. In some embodiments, at least a portion of the housing includes a lossy material electrically connected to the ground contact tip.

In some embodiments a connector assembly includes a plurality of cables, each of the plurality of cables including at least one conductor and shield, a plurality of cartridges, each cartridge including a housing, at least one tip coupled to the at least on one conductor of a respective cable of the plurality of cables and extending from the housing, and a conductive plate mounted to the housing and electrically coupled to the shield of the respective cable, where the conductive plate includes at least one compliant portion extending beyond the housing. In some embodiments, the connector assembly further includes a conductive gasket pressing against the shield of the respective cable and electrically connected to the conductive plate. In some embodiments, the housing includes an insulative portion and a lossy portion. In some embodiments, the cartridge further includes a ground tip extending from the housing and a portion of the ground tip is in contact with the lossy portion. In some embodiments, the at least one tip extends from the housing at a mating interface, and the connector assembly further includes a conductive elastomer with a portion pressing against the shield of the respective cable and portion at the mating interface. In some embodiments, the connector assembly further includes a support member, where the plurality of cartridges are attached to the support member in a row. In some embodiments, the connector assembly may be used in combination with a substrate including at least one signal pad and a ground plane, where the compliant portion of the conductive plate contacts the ground plane; the at least one tip contacts the at one signal pad.

In some embodiments, a connector assembly includes a circuit board including a first contact pad, where the first contact pad includes a recess, and a first contact tip including a superelastic conductive material configured to mate with the first contact pad, where the first contact pad is configured to align the first contact tip with respect to the recess when the first contact tip mates with the first contact pad. In some embodiments, the recess is a semi-circular depression. In some embodiments, the recess is a V-shaped groove. In some embodiments, the recess includes a longitudinal centerline and the first contact pad is configured to align the first contact tip with the longitudinal centerline when the contact tip mates with a pressure contact with the first contact pad.

In some embodiments, an electronic assembly includes a substrate including a first surface and a second, opposing surface, a semiconductor device on the first surface, and a first connector assembly configured to couple signals to the semiconductor device, where the first connector assembly includes a first plurality of cables with conductors configured to carry the signals and a first connector including a first plurality of superelastic contact tips electrically connected to the conductors of the first plurality of cables and pressure mounted to the first surface. In some embodiments, the first plurality of cables include pairs of conductors, the first plurality of superelastic contact tips are arranged in pairs coupled to pairs of conductors of respective cables of the first plurality of cables, and the pairs of superelastic contact tips are pressure mounted to the first surface in a linear array including more than 15 pairs per inch. In some embodiments, the first plurality of cables and the second plurality of cables include pairs of conductors, the first plurality of superelastic contact tips are arranged in first pairs coupled to pairs of conductors of respective cables of the first plurality of cables, the second plurality of superelastic contact tips are arranged in second pairs coupled to pairs of conductors of respective cables of the second plurality of cables, the first pairs of superelastic contact tips are pressure mounted to the first surface in a first linear array parallel to an edge of the substrate, the second pairs of superelastic contact tips are pressure mounted to the second surface in a second linear array parallel to the edge of the substrate, and the first pairs and second pairs include more than 30 pairs per inch adjacent the edge of the substrate. In some embodiments, the first pairs and second pairs include at least 40 pairs per inch adjacent the edge of the substrate. In some embodiments, the first plurality of superelastic contact tips have a diameter of 36 AWG or less. In some embodiments, the electronic assembly further includes a motherboard and the substrate includes a daughter card parallel to the mother board.

What is claimed is:

1. An electrical connector, comprising:

a housing comprising a first surface, and a first side transverse to the first surface;

an electrical contact tip projecting from the housing and exposed at the first surface; and at least one member configured as a receptacle sized to receive the housing therein, wherein the receptacle is bounded by a second side, wherein:

the first side comprises a first portion with a second surface making an angle of greater than 0 degrees and less than 90 degrees with respect to the first surface; and the second side comprises a second portion with a third surface, parallel to the second surface and positioned to engage the second surface when the housing is received in the receptacle.

2. The electrical connector of claim 1 in combination with a printed circuit board, wherein:

the receptacle is disposed on the circuit board;

the first portion comprises a wedge-shaped projection from the first surface; and the second portion comprises a projection receptacle configured to receive the wedge-shaped projection when the housing is received in the receptacle.

3. The electrical connector of claim 1 in combination with a circuit board, wherein:

the circuit board comprises a signal contact disposed on the circuit board, when the housing is received in the receptacle, the electrical contact tip is brought into electrical communication w-ith the signal contact.

4. The electrical connector of claim 3, wherein, as the second surface is engaged by the third surface, the housing is moved closer to the circuit board.

5. The electrical connector of claim 3, wherein, as the housing is received in the receptacle, the electrical contact tip wipes the signal contact.

6. The electrical connector of claim 1, wherein the receptacle includes a spring latch configured to releasably secure the housing in the receptacle.

7. The electrical connector of claim 6, wherein the spring latch applies a force to the housing urging the housing into the receptacle.

8. The electrical connector of claim 1, wherein the housing includes a first section and a second section, wherein the first section is angled relative to the second section by an angle between 15 and 60 degrees.

9. The electrical connector of claim 8, wherein a thickness of the first section of the housing is between 3.5 and 4.5 mm.

10. The electrical connector of claim 1, wherein a thickness of the housing is between 3.5 and 4.5 mm.

11. The electrical connector of claim 1, further comprising a metal stabilization plate disposed on a front face of the housing, wherein the metal stabilization plate increases the stiffness of the housing.

12. The electrical connector of claim 11, wherein the metal stabilization plate is perpendicular to the first surface.

13. The electrical connector of claim 12, wherein the receptacle comprises a fourth surface comprising features engaging the metal stabilization plate.

14. The electrical connector of claim 3, further comprising:

a ground contact tip projecting from the housing;

a ground contact disposed on the circuit board, wherein, as the housing is moved into the receptacle and the second surface is in contact with the third surface, the ground contact tip is brought into electrical communication with the ground contact.

15. The electrical connector of claim 14, wherein, the housing and the receptacle are configured such that, as the housing moves into the receptacle and the second surface is in contact with the third surface, the ground contact tip is brought into electrical communication with the ground contact before the electrical contact tip is brought into electrical communication with a signal contact.

16. The electrical connector of claim 14, further comprising a cable having a cable conductor in electrical communication with the electrical contact tip and shield in electrical communication with the ground contact tip.

17. The electrical connector of claim 16, wherein the shield surrounds the cable conductor.

18. The electrical connector of claim 16, further comprising a second electrical contact tip, wherein the cable includes a second cable conductor in electrical communication with the second electrical contact tip, and wherein the shield surrounds the cable conductor and second cable conductor.

19. The electrical connector of claim 16, further comprising a compliant conductive member which at least partially surrounds the shield and the ground contact tip, wherein the conductive member electrically couples the ground contact tip to the shield.

20. A method of connecting a cable to a substrate, comprising:

positioning a housing with a first surface of the housing facing a surface of the substrate;

applying a first force to the housing in a first direction, wherein the first direction is parallel to the surface of the substrate;

engaging a second surface on the housing with a third surface attached to the substrate, such that a second force in a second direction, perpendicular to the first direction, is generated on the housing; and urging, with the second force, at least one contact tip extending through the first surface against at least one contact disposed on the surface of the substrate.

21. The method of claim 20, further comprising inhibiting bowing of the housing about a transverse axis of the housing with a metal stabilization plate.

22. The method of claim 20, further comprising rotating a spring latch into engagement with a tab formed on the housing to secure the housing in a receptacle.

23. The method of claim 22, further comprising applying a force to the housing in the first direction with the spring latch.

24. The method of claim 20, further comprising wiping the contact with the at least one contact tip as the housing is moved in the first direction.

25. The method of claim 20, wherein:

the at least one contact tip comprises a plurality of signal contact tips and a plurality of ground contact tips;

the at least one contact disposed on the surface of the substrate comprises a plurality of signal contacts and a plurality of ground contacts;

the method further comprises:

wiping the signal contacts with the signal contact tips as the housing is moved in the first direction; and wiping the ground contacts with the ground contact tips as the housing is moved in the first direction.

26. The method of claim 20, wherein the second surface and/or the third surface are angled relative to the surface of the substrate by an angle of greater than 0 degrees and less than 90 degrees such that the second force is generated by camming the second surface against the third surface.

27. The method of claim 20, wherein:

urging the at least one contact tip against the at least one contact comprises deflecting a first electrical contact tip from a resting position by at least 0.1 mm with a force that varies by less than 10% over the range of deflections from 0.05 mm to 0.1 mm.

28. The method of claim 27, wherein elastically deflecting the first electrical contact tip comprises transitioning the first electrical contact tip from an austenite to a martensite phase.

29. The method of claim 20, further comprising electrically connecting a second electrical contact tip to a second signal contact disposed in a receptacle.

* * * * *